US007205257B2

(12) United States Patent
Tanaka et al.

(10) Patent No.: US 7,205,257 B2
(45) Date of Patent: Apr. 17, 2007

(54) CATALYST FOR CLARIFYING EXHAUST GAS

(75) Inventors: Hirohisa Tanaka, Shiga (JP); Isao Tan, Shiga (JP); Mari Uenishi, Shiga (JP); Nobuhiko Kajita, Shiga (JP); Masashi Taniguchi, Shiga (JP); Yasunori Sato, Shizuoka (JP); Keiichi Narita, Shizuoka (JP); Noboru Sato, Shizuoka (JP)

(73) Assignees: Daihatsu Motor Co., Ltd., Osaka (JP); Cataler Corporation, Shizuoka (JP)

( * ) Notice: Subject to any disclaimer, the term of this patent is extended or adjusted under 35 U.S.C. 154(b) by 0 days.

(21) Appl. No.: 10/520,823

(22) PCT Filed: Jul. 3, 2003

(86) PCT No.: PCT/JP03/08439

§ 371 (c)(1),
(2), (4) Date: Jan. 7, 2005

(87) PCT Pub. No.: WO2004/004898

PCT Pub. Date: Jan. 15, 2004

(65) Prior Publication Data

US 2005/0266986 A1  Dec. 1, 2005

(30) Foreign Application Priority Data

| Jul. 9, 2002 | (JP) | ............................ 2002-200590 |
| Jul. 9, 2002 | (JP) | ............................ 2002-200591 |
| Jul. 9, 2002 | (JP) | ............................ 2002-200592 |
| Oct. 11, 2002 | (JP) | ............................ 2002-299552 |
| Oct. 11, 2002 | (JP) | ............................ 2002-299553 |
| Oct. 11, 2002 | (JP) | ............................ 2002-299555 |
| Dec. 17, 2002 | (JP) | ............................ 2002-364616 |
| Dec. 20, 2002 | (JP) | ............................ 2002-370475 |
| Dec. 20, 2002 | (JP) | ............................ 2002-370476 |

(51) Int. Cl.
*B01J 23/00* (2006.01)
*B01J 21/00* (2006.01)
*B01J 20/00* (2006.01)

(52) U.S. Cl. ...................... 502/327; 502/302; 502/303; 502/304; 502/328; 502/329; 502/330; 502/331; 502/332; 502/333; 502/334; 502/335; 502/336; 502/337; 502/338; 502/339; 502/349; 502/415; 502/439; 502/525; 502/527.12; 502/527.13

(58) Field of Classification Search ................ 502/302, 502/303, 304, 324, 327–339, 349, 415, 439, 502/525, 527.12, 527.13
See application file for complete search history.

(56) References Cited

U.S. PATENT DOCUMENTS

| 4,182,694 A | * | 1/1980 | Lauder ........................ 502/303 |
| 4,200,554 A | * | 4/1980 | Lauder ........................ 502/326 |
| 4,294,726 A |   | 10/1981 | Bozon et al. |
| 5,139,992 A | * | 8/1992 | Tauster et al. ............... 502/304 |
| 5,212,142 A | * | 5/1993 | Dettling ...................... 502/304 |
| 5,254,519 A | * | 10/1993 | Wan et al. ................... 502/252 |
| 5,380,692 A |   | 1/1995 | Nakatsuji |
| 5,439,865 A | * | 8/1995 | Abe et al. .................... 502/333 |
| 5,447,705 A | * | 9/1995 | Petit et al. ................ 423/418.2 |
| 5,462,907 A | * | 10/1995 | Farrauto et al. ............. 502/304 |
| 5,491,120 A | * | 2/1996 | Voss et al. ................... 502/304 |
| 5,622,680 A | * | 4/1997 | Monceaux et al. ........ 423/213.5 |
| 5,814,576 A | * | 9/1998 | Yamamoto ................... 502/303 |
| 5,837,642 A | * | 11/1998 | Tanaka et al. ............... 502/304 |
| 5,849,659 A | * | 12/1998 | Tanaka et al. ............... 502/324 |
| 5,990,038 A | * | 11/1999 | Suga et al. .................. 502/303 |
| 6,033,632 A | * | 3/2000 | Schwartz et al. ........... 422/190 |
| 6,261,989 B1 | * | 7/2001 | Tanaka et al. ............... 502/217 |
| 6,352,955 B1 |   | 3/2002 | Golden |
| 6,464,946 B1 | * | 10/2002 | Yamada et al. ............. 422/177 |
| 6,531,425 B2 |   | 3/2003 | Golden |
| 6,534,031 B2 |   | 3/2003 | Bedard |
| 6,569,803 B2 | * | 5/2003 | Takeuchi ..................... 502/328 |

(Continued)

FOREIGN PATENT DOCUMENTS

EP  0 525 677 A1  2/1993

(Continued)

OTHER PUBLICATIONS

Hirohisa Tanaka et al., An Intelligent Catalyst, Reprint: Advanced Catalytic Converters & Substrates for Gas Emission Syst. (SP-1573), SAE World Congress 2001.

(Continued)

*Primary Examiner*—Cam N. Nguyen
(74) *Attorney, Agent, or Firm*—Akerman Senterfit; Jean C. Edwards, Esq.

(57) ABSTRACT

To provide an exhaust gas purifying catalyst which can maintain the catalytic activity at a high level over a long time and can achieve satisfactory emission control performance, an exhaust gas purifying catalyst is prepared so as to contain a noble metal, a perovskite-type composite oxide represented by the following general formula (3), and theta-alumina and/or alpha-alumina:

$$AB_{1-m}N_mO_3 \quad (3)$$

wherein A represents at least one element selected from rare-earth elements and alkaline earth metals; B represents at least one element selected from Al and transition elements excluding rare-earth elements and noble metals; N represents a noble metal; and m represents an atomic ratio of N satisfying the following relation: $0<m<0.5$.

21 Claims, No Drawings

U.S. PATENT DOCUMENTS

| | | | |
|---|---|---|---|
| 6,576,200 B1 * | 6/2003 | Yamamoto et al. | 422/177 |
| 6,602,479 B2 * | 8/2003 | Taniguchi et al. | 423/239.1 |
| 6,620,762 B2 * | 9/2003 | Tan et al. | 502/304 |
| 6,682,706 B1 * | 1/2004 | Yamamoto et al. | 422/180 |
| 6,800,388 B2 * | 10/2004 | Kaneko et al. | 429/19 |
| 6,808,687 B1 * | 10/2004 | Uenishi et al. | 422/177 |
| 6,864,214 B2 * | 3/2005 | Uenishi et al. | 502/304 |
| 6,881,384 B1 * | 4/2005 | Uenishi et al. | 422/177 |
| 2001/0053467 A1 | 12/2001 | Kaneko et al. | |

FOREIGN PATENT DOCUMENTS

| | | |
|---|---|---|
| EP | 1 035 074 A | 9/2000 |
| FR | 2 665 089 | 1/1992 |
| FR | 2 665089 | 1/1992 |
| JP | S51-91890 | 8/1976 |
| JP | 60-025544 | 2/1985 |
| JP | 61-191518 | 8/1986 |
| JP | 61-232217 | 10/1986 |
| JP | S62-106845 | 5/1987 |
| JP | 62-241552 | 10/1987 |
| JP | S62-262745 | 11/1987 |
| JP | 63-302950 | 12/1988 |
| JP | H01-011643 | 1/1989 |
| JP | H01011643 | 1/1989 |
| JP | 02-265648 | 10/1990 |
| JP | H3-068451 | 3/1991 |
| JP | H03-186346 | 8/1991 |
| JP | 05-031367 | 2/1993 |
| JP | 05-076762 | 3/1993 |
| JP | 05-200395 | 8/1993 |
| JP | 05-245372 | 9/1993 |
| JP | 05-253484 | 10/1993 |
| JP | H5-509033 | 12/1993 |
| JP | 06-100319 | 4/1994 |
| JP | 06-210175 | 8/1994 |
| JP | 06-304449 | 11/1994 |
| JP | 07-068175 | 3/1995 |
| JP | 07-080311 | 3/1995 |
| JP | 07-116519 | 5/1995 |
| JP | 07-299360 | 11/1995 |
| JP | H7-308578 | 11/1995 |
| JP | 08-217461 | 8/1996 |
| JP | 08-224446 | 9/1996 |
| JP | H10-277389 | 10/1998 |
| JP | H11-57471 | 3/1999 |
| JP | 11-207183 | 8/1999 |
| JP | H11-262663 | 9/1999 |
| JP | 2000-015097 | 1/2000 |
| JP | 2000-042368 | 2/2000 |
| JP | 2000-143251 | 5/2000 |
| JP | 2000-256017 | 9/2000 |
| JP | 2001-224963 | 8/2001 |
| WO | WO 2004-004899 A1 | 1/2004 |

OTHER PUBLICATIONS

Hirohisa Tanaka et al., Regen. of Palladium Subsequent to Solid Solution & Segregation in a Perovskite Catalyst: An Intelligent Catalyst, vol. 16/17, Nos. 1-4, Sep. 2001.

T. Motohiro et al., Time-resolved time-of-flight mass spectrometry with molecular-pulse-probes for analysis . . . ,(I), Reprint from Applied Science, 121/122 (1997), pp. 319-322.

T. Motohiro et al., Time-resolved time-of-flight mass spectrometry with molecular-pulse-probes for analysis . . . ,(II), Reprint from Applied Science, 121/122 (1997), pp. 323-326.

Nobuhiko Kajita et al., Regeneration of Precious Metals in Various Designed . . . , Reprint: New Emmissions Tech. from SAE 2002 World Congress (SP-1703) Detroit MI Mar. 4-7, 2002.

Nolven Guilhaume and Michael Primet, "Three-Way Catalytic Activity and Oxygen Storage Capacity of Perovskite LaMn0.976Rh0.024O3+$\delta$", 1997, p. 197-204, vol. 165.

Hirohisa Tanaka et al. "Perovskite Shokubai eno Kikinzou Tanji Koka" Shokubai Totonkai Toronkai A Yokoshu, vol. 88, 2001, p. 112.

Nabuhiko Kajita et al. "Regenaration of Precious Metals in Various Designed . . . " SAE Technical Paper Series, SAE World Congress, Detroit Michigan, Mar. 4-7, 2002.

Iseki Yoshikazu et al., "Analysis of Solid Solution Formation and Precipitation Phenomena of Pd in Pd Perovskite Catalyst", Catalysts & Catalysts, 2002, Vol.44, No. 2 2002.

Catalysis Society of Japan, Tokyo-to, Japan.

* cited by examiner

CATALYST FOR CLARIFYING EXHAUST GAS

TECHNICAL FIELD

The present invention relates to an exhaust gas purifying catalyst. More specifically, it relates to an exhaust gas purifying catalyst containing a perovskite-type composite oxide for use as an exhaust gas purifying catalyst.

BACKGROUND ART

Perovskite-type composite oxides each supporting a noble metal such as Pt (platinum), Rh (rhodium), or Pd (palladium) have been known as three-way catalysts which can simultaneously clean up carbon monoxide (CO), hydrocarbons (HC), and nitrogen oxides (NOx) contained in emissions. Such perovskite-type composite oxides are represented by a general formula: $ABO_3$ and enable the supported noble metal to satisfactorily exhibit its catalytic activity.

These perovskite-type composite oxides, however, undergo grain growth thereby to have a decreased specific surface area in an atmosphere of high temperature. The resulting catalysts can only contact with exhaust gas components in a shorter time and exhibit remarkably decreased catalytic performance in an operating environment at a high space velocity as in the case of exhaust gas purifying catalysts for automobiles.

Accordingly, various attempts have been proposed to increase their thermostability by allowing such a perovskite-type composite oxide to be supported by a thermostable composite oxide containing Ce (cerium) and/or Zr (zirconium) (for example, Japanese Laid-open (Unexamined) Patent Publications No. Hei 5-31367, No. Hei 5-220395, No. Hei 5-253484, No. Hei 6-210175, No. Hei 7-68175, and No. Hei 7-80311).

Even the perovskite-type composite oxide supported by the thermostable composite oxide containing Ce and/or Zr, however, shows remarkably decreased catalytic performance in an atmosphere of high temperature exceeding 900° C. to 1000° C.

SUMMARY OF THE INVENTION

Accordingly, an object of the present invention is to provide an exhaust gas purifying catalyst which can maintain its catalytic performance at a high level over a long time and can achieve satisfactory emission control performance even in an atmosphere of high temperature.

The present invention provides an exhaust gas purifying catalyst containing a noble metal, a perovskite-type composite oxide, and at least one of theta-alumina and alpha-alumina.

The exhaust gas purifying catalyst of the present invention preferably contains at least one of theta-alumina and alpha-alumina, and a perovskite-type composite oxide containing a noble metal.

The perovskite-type composite oxide containing a noble metal is preferably supported by theta-alumina and/or alpha-alumina.

It is also preferred in the present invention that the perovskite-type composite oxide containing a noble metal is supported by at least one thermostable oxide selected from the group consisting of zirconia composite oxides represented by the following general formula (1), ceria composite oxides represented by the following general formula (2), $SrZrO_3$ and $LaAlO_3$:

$$Zr_{1-(a+b)}Ce_aR_bO_{2-c} \quad (1)$$

wherein R represents at least one of alkaline earth metals and rare-earth elements excluding Ce; a represents an atomic ratio of Ce satisfying the following relation: $0.1 \leq a \leq 0.65$; b represents an atomic ratio of R satisfying the following relation: $0 \leq b \leq 0.55$; $[1-(a+b)]$ represents an atomic ratio of Zr satisfying the following relation: $0.35 \leq [1-(a+b)] \leq 0.9$; and c represents an oxygen defect, $$Ce_{1-(d+e)}Zr_dL_eO_{2-f} \quad (2)$$

wherein L represents at least one of alkaline earth metals and rare-earth elements excluding Ce; d represents an atomic ratio of Zr satisfying the following relation: $0.2 \leq d \leq 0.7$; e represents an atomic ratio of L satisfying the following relation: $0 \leq e \leq 0.2$; $[1-(d+e)]$ represents an atomic ratio of Ce satisfying the following relation: $0.3 \leq [1-(d+e)] \leq 0.8$; and f represents an oxygen defect.

In the present invention, at least one of theta-alumina and alpha-alumina supporting the perovskite-type composite oxide containing a noble metal, or the thermostable oxide supporting the perovskite-type composite oxide containing a noble metal is preferably prepared by incorporating at least one of theta-alumina and alpha-alumina, or a thermostable oxide into a pre-crystallization composition before the crystallization of the perovskite-type composite oxide containing a noble metal, in the production of the perovskite-type composite oxide containing a noble metal.

In such supporting, the catalyst preferably further comprises at least one thermostable oxide selected from the group consisting of zirconia composite oxides represented by the following general formula (1), ceria composite oxides represented by the following general formula (2), theta-alumina, alpha-alumina, gamma-alumina, $SrZrO_3$ and $LaAlO_3$:

$$Zr_{1-(a+b)}Ce_aR_bO_{2-c} \quad (1)$$

wherein R represents at least one of alkaline earth metals and rare-earth elements excluding Ce; a represents an atomic ratio of Ce satisfying the following relation: $0.1 \leq a \leq 0.65$; b represents an atomic ratio of R satisfying the following relation: $0 \leq b \leq 0.55$; $[1-(a+b)]$ represents an atomic ratio of Zr satisfying the following relation: $0.35 \leq [1-(a+b)] \leq 0.9$; and c represents an oxygen defect, $$Ce_{1-(d+e)}Zr_dL_eO_{2-f} \quad (2)$$

wherein L represents at least one of alkaline earth metals and rare-earth elements excluding Ce; d represents an atomic ratio of Zr satisfying the following relation: $0.2 \leq d \leq 0.7$; e represents an atomic ratio of L satisfying the following relation: $0 \leq e \leq 0.2$; $[1-(d+e)]$ represents an atomic ratio of Ce satisfying the following relation: $0.3 \leq [1-(d+e)] \leq 0.8$; and f represents an oxygen defect.

It is also preferred in the present invention that the perovskite-type composite oxide containing a noble metal is mixed with at least one of theta-alumina and/or alpha-alumina.

In such mixing, at least one thermostable oxide selected from the group consisting of zirconia composite oxides represented by the following general formula (1), ceria composite oxides represented by the following general formula (2), gamma-alumina, $SrZrO_3$ and $LaAlO_3$ is preferably further mixed:

$$Zr_{1-(a+b)}Ce_aR_bO_{2-c} \quad (1)$$

wherein R represents at least one of alkaline earth metals and rare-earth elements excluding Ce; a represents an atomic ratio of Ce satisfying the following relation: $0.1 \leq a \leq 0.65$; b represents an atomic ratio of R satisfying the following relation: $0 \leq b \leq 0.55$; $[1-(a+b)]$ represents an atomic ratio of Zr satisfying the following relation: $0.35 \leq [1-(a+b)] \leq 0.9$; and c represents an oxygen defect, $$Ce_{1-(d+e)}Zr_dL_eO_{2-f} \qquad (2)$$

wherein L represents at least one of alkaline earth metals and rare-earth elements excluding Ce; d represents an atomic ratio of Zr satisfying the following relation: $0.2 \leq d \leq 0.7$; e represents an atomic ratio of L satisfying the following relation: $0 \leq e \leq 0.2$; $[1-(d+e)]$ represents an atomic ratio of Ce satisfying the following relation: $0.3 \leq [1-(d+e)] \leq 0.8$; and f represents an oxygen defect.

The perovskite-type composite oxide containing a noble metal in the present invention is preferably represented by the general formula (3):

$$AB_{1-m}N_mO_3 \qquad (3)$$

wherein A represents at least one element selected from rare-earth elements and alkaline earth metals; B represents at least one element selected from Al and transition elements excluding rare-earth elements and noble metals; N represents a noble metal; and m represents an atomic ratio of N satisfying the following relation: $0<m<0.5$.

N in general formula (3) is preferably at least one selected from the group consisting of Rh, Pd, and Pt.

The perovskite-type composite oxide represented by the general formula (3) is preferably at least one selected from the group consisting of Rh-containing perovskite-type composite oxides represented by the following general formula (4), Pd-containing perovskite-type composite oxides represented by the following general formula (5), and Pt-containing perovskite-type composite oxides represented by the following general formula (6):

$$A_{1-p}A'_pB_{1-q}Rh_qO_3 \qquad (4)$$

wherein A represents at least one element selected from La, Nd, and Y; A' represents Ce and/or Pr; B represents at least one element selected from Fe, Mn, and Al; p represents an atomic ratio of A' satisfying the following relation: $0 \leq p < 0.5$; and q represents an atomic ratio of Rh satisfying the following relation: $0 < q \leq 0.8$, $$AB_{1-r}Pd_rO_3 \qquad (5)$$

wherein A represents at least one element selected from La, Nd, and Y; B represents at least one element selected from Fe, Mn, and Al; and r represents an atomic ratio of Pd satisfying the following relation: $0 < r \leq 0.5$, $$A_{1-s}A'_sB_{1-t-u}B'_tPt_uO_3 \qquad (6)$$

wherein A represents at least one element selected from La, Nd, and Y; A' represents at least one element selected from Mg, Ca, Sr, Ba, and Ag; B represents at least one element selected from Fe, Mn, and Al; B' represents at least one element selected from Rh and Ru; s represents an atomic ratio of A' satisfying the following relation: $0 < s \leq 0.5$; t represents an atomic ratio of B' satisfying the following relation: $0 \leq t < 0.5$; and u represents an atomic ratio of Pt satisfying the following relation: $0 < u \leq 0.5$.

In the present invention, at least one of theta-alumina and alpha-alumina is preferably represented by the following general formula (7):

$$(Al_{1-g}D_g)_2O_3 \qquad (7)$$

wherein D represents La and/or Ba; and g represents an atomic ratio of D satisfying the following relation: $0 \leq g \leq 0.5$.

It is preferred in the present invention that the zirconia composite oxide comprises a zirconia composite oxide supporting Pt and/or Rh, the ceria composite oxide comprises a ceria composite oxide supporting Pt, the theta-alumina comprises a theta-alumina supporting Pt and/or Rh, and the gamma-alumina comprises a gamma-alumina supporting Pt and/or Rh.

The catalyst of the present invention preferably comprises a coating layer supported by a catalyst carrier, in which the coating layer includes an outer layer constituting its surface layer, and an inner layer arranged inside the outer layer, and at least one of the outer layer and the inner layer comprises both at least one of theta-alumina and alpha-alumina, and the perovskite-type composite oxide containing a noble metal.

The inner layer preferably comprises at least one of theta-alumina and alpha-alumina each supporting the perovskite-type composite oxide containing a noble metal.

The inner layer preferably comprises the thermostable oxide supporting the perovskite-type composite oxide containing a noble metal.

Preferably, the inner layer comprises the Pd containing perovskite-type composite oxide.

The outer layer preferably comprises the Rh-containing perovskite-type composite oxide.

The Pt containing perovskite-type composite oxide is preferably contained in the inner layer and/or the outer layer.

Preferably, the noble metal contained in the outer layer is Rh and/or Pt, and the noble metal contained in the inner layer is at least Pd.

Preferably, the inner layer comprises the ceria composite oxide supporting theta-alumina and Pt, and the outer layer comprises at least one thermostable oxide selected from the group consisting of the zirconia composite oxide supporting Pt and Rh, the ceria composite oxide supporting Pt, and theta-alumina supporting Pt and Rh.

The exhaust gas purifying catalyst of the present invention preferably further comprises at least one of sulfates, carbonates, nitrates, and acetates of Ba, Ca, Sr, Mg, or La.

The present invention provides a catalyst composition containing a noble metal, a perovskite-type composite oxide, and at least one of theta-alumina and alpha-alumina.

The exhaust gas purifying catalyst of the present invention allows the noble metal to maintain its catalytic activity at a high level over a long time and can achieve satisfactory emission control performance even in an atmosphere of high temperature exceeding 900° C. to 1000° C.

DESCRIPTION OF THE INVENTION

The exhaust gas purifying catalyst of the present invention comprises a noble metal, perovskite-type composite oxides and at least one of theta-alumina and alpha-alumina.

The exhaust gas purifying catalyst of the present invention has only to comprise these components, i.e., the noble metal, the perovskite-type composite oxide, and at least one of theta-alumina and alpha-alumina. These components may be mixed. Alternatively, the noble metal may be supported by the perovskite-type composite oxide and/or at least one of theta-alumina and alpha-alumina. Preferably, the catalyst comprises at least one of theta-alumina and alpha-alumina, and a perovskite-type composite oxide containing a noble metal.

The perovskite-type composite oxide containing a noble metal for use in the present invention are composite oxides each having a perovskite structure represented by the general formula: $ABO_3$ and include, for example, perovskite-type composite oxides each comprising a noble metal as a constituent and perovskite-type composite oxides each supporting a noble metal.

The perovskite-type composite oxide each comprising a noble metal as a constituent are represented by, for example, the following general formula (3):

$$AB_{1-m}N_mO_3 \qquad (3)$$

wherein A represents at least one element selected from rare-earth elements and alkaline earth metals; B represents at least one element selected from Al and transition elements excluding rare-earth elements and noble metals; N represents one or more noble metals; and m represents an atomic ratio of N satisfying the following relation: $0<m<0.5$.

In general formula (3), examples of the rare-earth elements represented by A include Sc (scandium), Y (yttrium), La (lanthanum), Ce (cerium), Pr (praseodymium), Nd (neodymium), Pm (promethium), Sm (samarium), Eu (europium), Gd (gadolinium), Tb (terbium), Dy (dysprosium), Ho (holmium), Er (erbium), Tm (thulium), Yb (ytterbium), and Lu (lutetium).

Examples of the alkaline earth metals represented by A include Be (beryllium), Mg (magnesium), Ca (calcium), Sr (strontium), Ba (barium), and Ra (radium). These alkaline earth metals can be used alone or in combination.

Examples of the transition elements represented by B excluding the rare-earth elements and the noble metals in general formula (3) include elements having atomic numbers of 22 (Ti) through 30 (Zn), atomic numbers of 40 (Zr) through 48 (Cd), and atomic numbers of 72 (Hf) through 80 (Hg) in the Periodic Table of Elements (IUPAC, 1990) except for the noble metals having atomic numbers of 44 through 47 and 76 through 78. These transition elements can be used alone or in combination.

Preferred examples of B, i.e., Al and the transition elements excluding the rare-earth elements and the noble metals, include Ti (titanium), Cr (chromium), Mn (manganese), Fe (iron), Co (cobalt), Ni (nickel), Cu (copper), Zn (zinc), and Al (aluminum).

Examples of the noble metal represented by N in general formula (3) include Ru (ruthenium), Rh (rhodium), Pd (palladium), Ag (silver), Os (osmium), Ir (iridium), and Pt (platinum), of which Rh, Pd, and Pt are preferred. These noble metals can be used alone or in combination.

The atomic ratio m satisfies the relation: $0<m<0.5$. Namely, N is an essential component, the atomic ratio of N is less than 0.5, and the atomic ratio of B is 0.5 or more.

These perovskite-type composite oxides can be prepared according to any suitable procedure for the production of composite oxides. Examples thereof include a coprecipitation process, a citrate complex process, and an alkoxide process, without being limited to any particular process.

In the coprecipitation process, for example, an aqueous mixed salt solution containing salts of the above-mentioned elements in a predetermined stoichiometric ratio is initially prepared. The aqueous mixed salt solution is coprecipitated by the addition of a neutralizing agent, and the resulting coprecipitate is dried and heat-treated.

Examples of the salts of the elements include inorganic salts such as sulfates, nitrates, chlorides, and phosphates; and organic salts such as acetates and oxalates. The aqueous mixed salt solution can be prepared, for example, by adding the salts of the elements to water in such proportions as to establish a predetermined stoichiometric ratio and mixing them with stirring.

Subsequently, the aqueous mixed salt solution is coprecipitated by adding the neutralizing agent thereto. The neutralizing agent includes, for example, ammonia; organic bases including amines such as triethylamine and pyridine; and inorganic bases such as sodium hydroxide, potassium hydroxide, potassium carbonate, and ammonium carbonate. The neutralizing agent is added dropwise to the aqueous mixed salt solution so that the solution after the addition of the neutralizing agent has a pH of about 6 to 10.

The resulting coprecipitate is, where necessary, washed with water, is dried typically by vacuum drying or forced-air drying and is then heat-treated at about 500° C. to 1000° C., and preferably at about 600° C. to about 950° C., for example. The perovskite-type composite oxide can thus be prepared.

In the citrate complex process, for example, an aqueous citric acid solution in a slightly excess amount with respect to the stoichiometric ratio of the respective elements is added to the salts of the respective elements to prepare an aqueous citrate mixed salt solution, the aqueous citrate mixed salt solution is evaporated to dryness to form a citrate complex of the respective elements, and the resulting citrate complex is provisionally baked and is heat-treated.

The same as listed above can be used as the salts of the elements herein. The aqueous citrate mixed salt solution can be prepared by initially preparing an aqueous mixed salt solution by the above procedure and adding an aqueous solution of citric acid to the aqueous mixed salt solution.

Then, the aqueous citrate mixed salt solution is evaporated to dryness to form a citrate complex of the respective elements. The evaporation to dryness is carried out at such a temperature at which the formed citrate complex is not decomposed, for example, at room temperature to about 150° C., thereby to remove the fluid immediately. The citrate complex of the elements is thus obtained.

The formed citrate complex is then provisionally baked and is then heat-treated. The provisional baking may be carried out by heating at 250° C. to 350° C. in vacuum or in an inert atmosphere. The provisionally baked article is then heat-treated, for example, at about 500° C. to 1000° C., and preferably at about 600° C. to 950° C. to obtain the perovskite-type composite oxide comprising a noble metal as a constituent.

In the alkoxide process, for example, a mixed alkoxide solution containing alkoxides of the respective elements excluding the noble metals in the stoichiometric ratio is prepared, and the mixed alkoxide solution is precipitated on hydrolysis by adding an aqueous solution containing salts of the noble metals thereto, and the resulting precipitate is dried and is heat-treated.

Examples of the alkoxides of the respective elements include alcholates each comprising the element and an alkoxy such as methoxy, ethoxy, propoxy, isopropoxy, or butoxy; and alkoxyalcholates of the respective elements represented by the following general formula (8):

$$E[OCH(R^1)-(CH_2)_i-OR^2]_j \qquad (8)$$

wherein E represents the element; $R^1$ represents a hydrogen atom or an alkyl group having 1 to 4 carbon atoms; $R^2$ represents an alkyl group having 1 to 4 carbon atoms; i represents an integer of 1 to 3; and j represents an integer of 2 to 4.

More specific examples of the alkoxyalcholates include methoxyethylate, methoxypropylate, methoxybutylate, ethoxyethylate, ethoxypropylate, propoxyethylate, and butoxyethylate.

The mixed alkoxide solution can be prepared, for example, by adding the alkoxides of the respective elements to an organic solvent so as to establish the stoichiometric ratio and mixing them with stirring. The organic solvent is not specifically limited, as long as it can dissolve the alkoxides of the respective elements. Examples of such organic solvents include aromatic hydrocarbons, aliphatic hydrocarbons, alcohols, ketones, and esters. Among these organic solvents, aromatic hydrocarbons such as benzene, toluene, and xylene are preferred.

Subsequently, the mixed alkoxide solution is precipitated by adding an aqueous solution containing salts of the noble metals in a predetermined stoichiometric ratio. Examples of the aqueous solution containing salts of the noble metals include aqueous nitrate solution, aqueous chloride solution, aqueous hexaammine chloride solution, aqueous dinitrodiammine nitrate solution, hexachloro acid hydrate, and potassium cyanide salt.

The resulting precipitate is then dried typically by vacuum drying or forced-air drying and is heat-treated, for example, at about 500° C. to 1000° C., and preferably at about 500° C. to 850° C. Thus, the perovskite-type composite oxide comprising a noble metal as a constituent can be prepared.

In the alkoxide process, the perovskite-type composite oxide comprising a noble metal as a constituent may be alternatively prepared in the following manner. A solution containing organometal salts of the noble metals is added to the mixed alkoxide solution to obtain a homogenous mixed solution. The homogenous mixed solution is precipitated by adding water thereto. The resulting precipitate is dried and is heat-treated.

Examples of the organometal salts of the noble metals include carboxylic acid salts of the noble metals derived from, for example, acetates or propionates; and metal chelate complexes of the noble metals derived from, for example, β-diketone compounds or β-ketoester compounds represented by the following general formula (9) and/or β-dicarboxylic ester compounds represented by the following general formula (10).

$$R^3COCHR^5COR^4 \quad (9)$$

wherein $R^3$ represents an alkyl group having 1 to 6 carbon atoms, a fluoroalkyl group having 1 to 6 carbon atoms or an aryl group; $R^4$ represents an alkyl group having 1 to 6 carbon atoms, a fluoroalkyl group having 1 to 6 carbon atoms, an aryl group or an alkyloxy group having 1 to 4 carbon atoms; and $R^5$ represents a hydrogen atom or an alkyl group having 1 to 4 carbon atoms, $$R^7CH(COOR^6)_2 \quad (10)$$

wherein $R^6$ represents an alkyl group having 1 to 6 carbon atoms; and $R^7$ represents a hydrogen atom or an alkyl group having 1 to 4 carbon atoms.

In the above-mentioned general formulas (9) and (10), examples of the alkyl groups each having 1 to 6 carbon atoms as $R^3$, $R^4$, and $R^6$ include methyl, ethyl, propyl, isopropyl, n-butyl, s-butyl, t-butyl, t-amyl, and t-hexyl. Examples of the alkyl groups each having 1 to 4 carbon atoms as $R^5$ and $R^7$ include methyl, ethyl, propyl, isopropyl, n-butyl, s-butyl, and t-butyl. The fluoroalkyl groups each having 1 to 6 carbon atoms as $R^3$ and $R^4$ include, for example, trifluoromethyl. The aryl groups as $R^3$ and $R^4$ include, for example, phenyl. The alkyloxy group having 1 to 4 carbon atoms as $R^4$ includes, for example, methoxy, ethoxy, propoxy, isopropoxy, n-butoxy, s-butoxy, and t-butoxy.

More specific examples of the β-diketone compounds include 2,4-pentanedione, 2,4-hexanedione, 2,2-dimethyl-3,5-hexanedione, 1-phenyl-1,3-butanedione, 1-trifluoromethyl-1,3-butanedione, hexafluoroacetylacetone, 1,3-diphenyl-1,3-propanedione, and dipivaloylmethane. Examples of the β-ketoester compounds include methyl acetoacetate, ethyl acetoacetate, and t-butyl acetoacetate. Examples of the β-dicarboxylic ester compounds include dimethyl malonate and diethyl malonate.

The solution containing the organometal salts of the noble metals can be prepared, for example, by adding the organometal salts of the noble metals to an organic solvent so as to establish the stoichiometric ratio and mixing them with stirring. The same as listed above can be used as the organic solvent herein.

Thus-prepared solution containing the organometal salts of the noble metals is mixed with the mixed alkoxide solution to prepare the homogenous mixed solution, and the homogenous mixed solution is precipitated by adding water thereto. The resulting precipitate is dried typically by vacuum drying or forced-air drying and is then heat-treated at about 400° C. to 1000° C., and preferably at about 500° C. to 850° C. Thus, the perovskite-type composite oxide can be prepared.

Examples of the perovskite-type composite oxide supporting a noble metal include perovskite-type composite oxides represented by the following general formula (3-1) each of which supports a noble metal.

$$ABO_3 \quad (3-1)$$

wherein A represents at least one element selected from rare-earth elements and alkaline earth metals; and B represents at least one element selected from Al and transition elements excluding the rare-earth elements and the noble metals.

The same as listed above can be used as the rare-earth elements and the alkaline earth metals represented by A, and Al and the transition elements represented by B excluding the rare-earth elements and the noble metals in the general formula (3-1).

These perovskite-type composite oxides can be prepared by a suitable process for the production of composite oxides such as a coprecipitation process, a citrate complex process, or an alkoxide process, as in the above processes. In the alkoxide process, the mixed alkoxide solution may be hydrolyzed by adding water thereto.

The noble metal can be supported by the resulting perovskite-type composite oxide according to any known process, without being limited to a particular process. The noble metal can be supported, for example, by preparing a salt solution containing the noble metals, impregnating the perovskite-type composite oxide with the salt-containing solution and then baking the impregnated composite oxide. The amount of the noble metals to the perovskite-type composite oxide is, for example, 20 parts by weight or less, and preferably 0.5 parts to 5 parts by weight to 100 parts by weight of the perovskite-type composite oxide.

Of the perovskite-type composite oxides each containing a noble metal, the perovskite-type composite oxides each comprising a noble metal as a constituent are preferably used. When the noble metal is Rh, a Rh-containing perovskite-type composite oxide represented by the following general formula (4) is typically preferably used as the perovskite-type composite oxide containing a noble metal in the present invention:

$$A_{1-p}A'_pB_{1-q}Rh_qO_3 \quad (4)$$

wherein A represents at least one element selected from La, Nd, and Y; A' represents Ce and/or Pr; B represents at least one element selected from Fe, Mn, and Al; p represents an atomic ratio of A' satisfying the following relation: $0 \leq p < 0.5$; and q represents an atomic ratio of Rh satisfying the following relation: $0 < q \leq 0.8$.

When the noble metal is Pd, a Pd containing perovskite-type composite oxide represented by the following general formula (5) is preferably used:

$$AB_{1-r}Pd_rO_3 \quad (5)$$

wherein A represents at least one element selected from La, Nd, and Y; B represents at least one element selected from Fe, Mn, and Al; and r represents an atomic ratio of Pd satisfying the following relation: $0 < r < 0.5$.

When the noble metal is Pt, a Pt containing perovskite-type composite oxide represented by the following general formula (6) is preferably used:

$$A_{1-s}A'_sB_{1-t-u}B'_tPt_uO_3 \quad (6)$$

wherein A represents at least one element selected from La, Nd, and Y; A' represents at least one element selected from Mg, Ca, Sr, Ba, and Ag; B represents at least one element selected from Fe, Mn, and Al; B' represents at least one element selected from Rh and Ru; s represents an atomic ratio of A' satisfying the following relation: $0 < s \leq 0.5$; t represents an atomic ratio of B' satisfying the following relation: $0 \leq t < 0.5$; and u represents an atomic ratio of Pt satisfying the following relation: $0 < u \leq 0.5$.

The theta-alumina for use in the present invention is a kind of intermediate (transitional) alumina until it is transferred to alpha-alumina, and has a theta phase as its crystal phase. The theta-alumina can be prepared, for example, by heat-treating a commercially available active alumina (gamma-alumina) at 900° C. to 1100° C. in the air for 1 to 10 hours.

The theta-alumina is available, for example, by heat-treating SPHERALITE 531P (a trade name of a gamma-alumina produced by PROCATALYSE) at 1000° C. in the air for 1 to 10 hours.

The alpha-alumina for use in the present invention has an alpha phase as its crystal phase and includes, for example, AKP-53 (a trade name of a high-purity alumina produced by Sumitomo Chemical Industries Co., Ltd.).

Such an alpha-alumina can be prepared, for example, by an alkoxide process, a sol-gel process, or a coprecipitation process.

At least one of theta-alumina and alpha-alumina for use in the present invention may comprise La and/or Ba. Namely, one represented by the following general formula (7) is preferably used:

$$(Al_{1-g}D_g)_2O_3 \quad (7)$$

wherein D represents La and/or Ba; and g represents an atomic ratio of D satisfying the following relation: $0 \leq g \leq 0.5$.

D represents La and/or Ba, and the atomic ratio of D represented by g ranges from 0 to 0.5. Namely, La and/or Ba is not an essential component but is an optional component which may be contained optionally, and the atomic ratio thereof is, if contained, 0.5 or less. If the atomic ratio of La and/or Ba exceeds 0.5, the crystal phase may not maintain its theta phase and/or alpha phase.

The theta-alumina and/or alpha-alumina is allowed to comprise La and/or Ba, for example, by appropriately controlling a baking temperature in a production process using aluminum oxide and a salt or alkoxide of La and/or Ba as in a production method of the zirconia composite oxide described later. Alternatively, the theta-alumina and/or alpha-alumina comprising La and/or Ba can be obtained, for example, by impregnating theta-alumina and/or alpha-alumina with a solution of a salt of La and/or Ba, followed by drying and baking.

At least one of theta-alumina and alpha-alumina has a specific surface area of preferably 5 $m^2/g$ or more, or more preferably 10 $m^2/g$ or more. In particular, theta-alumina has a specific surface area of preferably 50 $m^2/g$ to 150 $m^2/g$, or more preferably 100 $m^2/g$ to 150 $m^2/g$. A plurality of theta-alumina and/or alpha-alumina having different atomic ratios of La and/or Ba can be used in combination.

As is described above, the exhaust gas purifying catalyst of the present invention is not specifically limited, as long as it comprises the noble metal, the perovskite-type composite oxide and at least one of theta-alumina and alpha-alumina. In a preferred embodiment, the exhaust gas purifying catalyst comprises at least one of theta-alumina and alpha-alumina, and the perovskite-type composite oxide containing a noble metal. This embodiment can be any of an embodiment in which the perovskite-type composite oxide containing a noble metal is supported by at least one of theta-alumina and alpha-alumina, and an embodiment in which the perovskite-type composite oxide containing a noble metal is mixed with at least one of theta-alumina and alpha-alumina.

In the embodiment in which the perovskite-type composite oxide containing a noble metal is supported by at least one of theta-alumina and alpha-alumina (hereinafter referred to as "supporting embodiment"), the amount of at least one of theta-alumina and alpha-alumina to support the perovskite-type composite oxide containing a noble metal is not specifically limited and is, for example, 0.5 parts to 20 parts by weight, and preferably 0.5 parts to 10 parts by weight, to 1 part by weight of the perovskite-type composite oxide containing a noble metal. If the amount of at least one of theta-alumina and alpha-alumina is less than the above-specified range, the perovskite-type composite oxide containing a noble metal may not be sufficiently effectively dispersed and may fail to prevent grain growth in an atmosphere of high temperature. A proportion of at least one of theta-alumina and alpha-alumina exceeding the above-specified range may invite disadvantages in cost and production.

The perovskite-type composite oxide containing a noble metal may be supported by at least one of theta-alumina and alpha-alumina in the following manner, without being limited to a particular process. Specifically, at least one of theta-alumina and alpha-alumina is incorporated into a pre-crystallization composition in the course of the production of the perovskite-type composite oxide containing a noble metal before the crystallization thereof, and the resulting mixture is heat-treated. This allows the pre-crystallization composition to crystallize thereby to allow at least one of theta-alumina and alpha-alumina to support the perovskite-type composite oxide containing a noble metal.

More specifically, a powder of at least one of theta-alumina and alpha-alumina may be mixed, for example, with a mixed solution (pre-crystallization composition) containing elementary components constituting the perovskite-type composite oxide containing a noble metal or with the resulting precipitate (pre-crystallization composition), and the resulting mixture is heat-treated.

When the perovskite-type composite oxide comprising a noble metal as a constituent is prepared by the coprecipitation process, the powder of at least one of theta-alumina and alpha-alumina may be added, for example, to the prepared aqueous mixed salt solution (pre-crystallization composition), the resulting coprecipitate (pre-crystallization composition), or a dried product thereof (pre-crystallization composition) and then heat-treated.

When the perovskite-type composite oxide comprising a noble metal as a constituent is prepared by the citrate complex process, the powder of at least one of theta-alumina and alpha-alumina may be added, for example, to the prepared aqueous citrate mixed salt solution (pre-crystallization composition), the resulting citrate complex (pre-crystallization composition), or a provisionally baked product thereof (pre-crystallization composition) and then heat-treated.

When the perovskite-type composite oxide comprising a noble metal as a constituent is prepared by the alkoxide process, the powder of at least one of theta-alumina and alpha-alumina may be added, for example, to the prepared mixed alkoxide solution (pre-crystallization composition) or homogenous mixed solution (pre-crystallization composition), the resulting precipitate (pre-crystallization composition), or a dried product thereof (pre-crystallization composition) and then heat-treated.

Among the above-mentioned processes, preferred is the process in which the powder of at least one of theta-alumina and alpha-alumina is added by the alkoxide process in the course of the production of the perovskite-type composite oxide comprising a noble metal as a constituent and is heat-treated.

The exhaust gas purifying catalyst of the present invention according to the supporting embodiment may further be mixed with at least one thermostable oxide selected from the group consisting of zirconia composite oxides, ceria composite oxides, theta-alumina, alpha-alumina, gamma-alumina, $SrZrO_3$ and $LaAlO_3$. By mixing with any of these thermostable oxides, the perovskite-type composite oxide containing a noble metal can have further improved thermostability. This easily enables the exhaust gas purifying catalyst of the present invention to be used in a very severe atmosphere of high temperature such as in manifold converters.

The zirconia composite oxides are represented by the following general formula (1):

$$Zr_{1-(a+b)}Ce_aR_bO_{2-c} \quad (1)$$

wherein R represents at least one of alkaline earth metals and rare-earth elements excluding Ce; a represents an atomic ratio of Ce satisfying the following relation: $0.1 \leq a \leq 0.65$; b represents an atomic ratio of R satisfying the following relation: $0 \leq b \leq 0.55$; $[1-(a+b)]$ represents an atomic ratio of Zr satisfying the following relation: $0.35 \leq [1-(a+b)] \leq 0.9$; and c represents an oxygen defect.

Examples of the alkaline earth metals represented by R include Be, Mg, Ca, Sr, Ba, and Ra, of which Mg, Ca, Sr, and Ba are preferred. The rare-earth elements represented by R are rare-earth elements excluding Ce, and examples thereof include Sc, Y, La, Pr, Nd, Pm, Sm, Eu, Gd, Tb, Dy, Ho, Er, Tm, Yb, and Lu. Among them, Sc, Y, La, Pr, and Nd are preferred. These alkaline earth metals and rare-earth elements can be used alone or in combination.

The atomic ratio of Ce represented by a ranges from 0.1 to 0.65. If the atomic ratio is less than 0.1, the crystal phase may become unstable to decompose in oxidative-reducing atmospheres at high temperatures thereby to decrease the catalytic performance. If it exceeds 0.65, the catalyst may have a decreased specific surface area thereby to fail to exhibit satisfactory catalytic performance. The atomic ratio of R represented by b ranges from 0 to 0.55. Namely, R is not an essential component but is an optional component to be contained optionally. The atomic ratio thereof is, if contained, 0.55 or less. An atomic ratio of R exceeding 0.55 may invite phase separation or formation of other composite oxide phases.

The atomic ratio of Zr represented by $[1-(a+b)]$ ranges from 0.35 to 0.9. The atomic ratio of Zr is preferably ranges from 0.5 to 0.9 and more preferably ranges from 0.6 to 0.9.

The zirconia composite oxide represented by the general formula (1) preferably has an atomic ratio of Ce of 0.5 or less. When the exhaust gas purifying catalyst comprises the zirconia composite oxide represented by the general formula (1) in combination with the ceria composite oxide represented by the general formula (2) mentioned below, the atomic ratio of Zr in the zirconia composite oxide represented by the general formula (1) is preferably greater than the atomic ratio of Zr in the ceria composite oxide represented by the general formula (2).

The amount c represents an oxygen defect which in turn means a ratio of vacancies formed in a fluorite-like crystal lattice generally composed of oxides of Zr, Ce, and R.

These zirconia composite oxides can be prepared according to any of known processes without being limited to a particular process.

The zirconia composite oxides can be prepared, for example, by adding water to a zirconium oxide powder and/or a zirconia hydroxide powder to obtain a slurry, adding an aqueous solution containing a cerium salt, an alkaline earth metal salt and/or a rare-earth element excluding Ce (hereinafter briefly referred to as "rare-earth element") salt in a predetermined stoichiometric ratio to the slurry, stirring them sufficiently and heat-treating the resulting mixture.

Commercially available zirconium oxide powders and/or zirconia hydroxide powders can be used herein. Those each having a large specific surface area are preferred. The slurry is prepared by adding about 10 parts to about 50 parts by weight of water to 1 part by weight of the zirconium oxide powder and/or the zirconia hydroxide powder.

Examples of the salts as the cerium salt, alkaline earth metal salt and/or rare-earth element salt include inorganic salts such as sulfates, nitrate, hydrochlorides and phosphates; and organic salts such as acetates and oxalates, of which nitrates are preferred. These zirconium salt, alkaline earth metal salt and/or rare-earth element salt is dissolved in water to obtain an aqueous mixed solution. The ratio of water is 0.1 to 10 by weight to 1 part by weight of the salt in such proportions within the predetermined atomic ratio as to establish a stoichiometric ratio.

The aqueous mixed solution is then added to the slurry, the mixture is fully stirred and then heat-treated. The heat treatment is carried out in the following manner. The mixture is initially subjected to drying under reduced pressure typically using a vacuum drying apparatus and is then further dried preferably at 50° C. to 200° C. for 1 to 48 hours to obtain a dried product. The resulting dried product is baked at 400° C. to 1000° C., and preferably at 650° C. to 1000° C. for 1 to 12 hours, and preferably 2 to 4 hours.

The baking procedure is preferably carried out so that at least part of the zirconia composite oxide constitutes a solid-solution, for higher thermostability of the zirconia composite oxide. The suitable baking relations for forming the solid-solution are appropriately set depending on the composition and proportion of the zirconia composite oxide.

Alternatively, the zirconia composite oxide may be prepared in the following manner. Initially, a salt solution containing zirconium, cerium, the alkaline earth metal, and/or the rare-earth element is prepared so as to establish a predetermined stoichiometric ratio. The solution is added to an alkaline aqueous solution or an aqueous solution of an organic acid thereby to coprecipitate a salt containing zirconium, cerium, the alkaline earth metal and/or the rare-earth element, and the coprecipitate is heat-treated.

In this case, water-soluble zirconium oxychloride (zirconyl oxychloride) is preferably used as the zirconium salt. Examples of the salts as the cerium salt, alkaline earth metal salt, and/or rare-earth element salt include inorganic salts such as sulfates, nitrates, hydrochlorides, and phosphates; and organic salts such as acetates and oxalates, of which nitrates are preferred. Examples of the alkaline aqueous solution include aqueous solutions of salts of alkaline metals such as sodium and potassium; aqueous solutions of such as ammonia and ammonium carbonate; and any suitable buffers. The alkaline aqueous solution is prepared, if used, so that the solution after addition of the alkaline aqueous solution has a pH of about 8 to 11. Examples of the aqueous solution of an organic acid include aqueous solutions of oxalic acid or citric acid.

The heat treatment can be carried out by the above-mentioned procedure after filtrating and rinsing the coprecipitate.

The zirconia composite oxide may also be prepared in the following manner. Initially, a mixed alkoxide solution containing zirconium, cerium, the alkaline earth metal, and/or the rare-earth element is prepared so as to establish a predetermined stoichiometric ratio. The mixed alkoxide solution is coprecipitated or hydrolyzed by adding the same to deionized water, and the resulting coprecipitate or hydrolysate is heat-treated.

In this case, the mixed alkoxide solution may be prepared by mixing alkoxides of zirconium, cerium, the alkaline earth metal and/or the rare-earth element alkoxide in an organic solvent. Examples of alkoxy moieties constituting the respective alkoxides include alkoxy such as methoxy, ethoxy, propoxy, isopropoxy and butoxy; and alkoxyalcholates such as methoxyethylate, methoxypropylate, methoxybutylate, ethoxyethylate, ethoxypropylate, propoxyethylate and butoxyethylate.

Examples of the organic solvent include aromatic hydrocarbons, aliphatic hydrocarbons, alcohols, ketones and esters, of which aromatic hydrocarbons such as benzene, toluene and xylenes are preferred.

The heat treatment can be carried out by the above-mentioned procedure after filtrating and rinsing the coprecipitate or hydrolysate.

The ceria composite oxides are represented by the following general formula (2):

$$Ce_{1-(d+e)}Zr_dL_eO_{2-f} \tag{2}$$

wherein L represents at least one of alkaline earth metals and rare-earth elements excluding Ce; d represents an atomic ratio of Zr satisfying the following relation: $0.2 \leq d \leq 0.7$; e represents an atomic ratio of L satisfying the following relation: $0 \leq e \leq 0.2$; $[1-(d+e)]$ represents an atomic ratio of Ce satisfying the following relation: $0.3 \leq [1-(d+e)] \leq 0.8$; and f represents an oxygen defect.

The same as the alkaline earth metals and rare-earth elements represented by R can be used as the alkaline earth metals and/or rare-earth elements represented by L. Preferred examples of the alkaline earth metals include Mg, Ca, Sr, and Ba, and preferred examples of the rare-earth elements include Sc, Y, La, Pr, and Nd. These alkaline earth metals and rare-earth elements can be used alone or in combination.

The atomic ratio of Zr represented by d ranges from 0.2 to 0.7. If the atomic ratio is less than 0.2, the resulting catalyst may have a decreased specific surface area thereby to fail to exhibit sufficient catalytic performance. If it exceeds 0.7, the catalyst may have decreased oxygen occlusion capability to fail to exhibit sufficient catalytic performance. The atomic ratio of L represented by e ranges from 0 to 0.2. Namely, L is not an essential component but an optional component to be contained optionally in an atomic ratio of, if contained, 0.2 or less. An atomic ratio of L exceeding 0.2 may invite phase separation or formation of other composite oxide phases.

The atomic ratio of Ce represented by $[1-(d+e)]$ ranges from 0.3 to 0.8, and preferably ranges from 0.4 to 0.6.

The ceria composite oxides represented by the general formula (2) each preferably have an atomic ratio of Zr of 0.5 or less. When used in combination with the zirconia composite oxide represented by the general formula (1) in the exhaust gas purifying catalyst, the atomic ratio of Ce in the ceria composite oxide represented by the general formula (2) is preferably greater than the atomic ratio of Ce in the zirconia composite oxide represented by the general formula (1).

The amount f represents an oxygen defect which in turn means a ratio of vacancies formed in a fluorite-like crystal lattice generally composed of oxides of Ce, Zr, and L.

These ceria composite oxides can be prepared by the same procedures as in the production of the zirconia composite oxides.

When the zirconia composite oxide or the ceria composite oxide actually used has an atomic ratio falling both within the atomic ratios of the respective elements of the zirconia composite oxides represented by the general formula (1) and within the atomic ratios of the respective elements of the ceria composite oxides represented by the general formula (2), it can be classified as any of these composite oxides without being limited to a particular category. The category, for example, is appropriately set according to the formulation to be incorporated (to be supported or mixed) when a plurality of the zirconia composite oxides and/or the ceria composite oxides are used. When the noble metals are supported, for example, the ceria composite oxide can be distinguished from the zirconia composite oxide by allowing the ceria composite oxide to support not Rh but Pt alone.

The same as listed above can be used as the theta-alumina herein.

Likewise, the same as listed above can be used as the alpha-alumina herein.

The gamma-alumina includes, but is not specifically limited to, known gamma-alumina used as an exhaust gas purifying catalyst.

The theta-alumina and/or alpha-alumina to be mixed in these supporting embodiments may comprise La and/or Ba, as is described above. Namely, one represented by the following general formula (7) is preferably used:

$$(Al_{1-g}D_g)_2O_3 \tag{7}$$

wherein D represents La and/or Ba; and g represents an atomic ratio of D satisfying the following relation: $0 \leq g \leq 0.5$.

D represents La and/or Ba, and the atomic ratio of D represented by g ranges from 0 to 0.5. Namely, La and/or Ba is not an essential component but an optional component to be contained optionally in an atomic ratio of, if contained, 0.5 or less.

$SrZrO_3$ can be prepared, for example, by the procedure of the production method of the zirconia composite oxides using a zirconium salt and a strontium salt, or an alkoxide of zirconium and an alkoxide of strontium.

$LaAlO_3$ can be prepared, for example, by the procedure of the production method of the zirconia composite oxides using a lanthanum salt and an aluminum salt, or an alkoxide of lanthanum and an alkoxide of aluminum.

The amount of the thermostable oxides is not specifically limited and is, for example, such that the total amount of the thermostable oxides falls within a range of 0.5 parts to 30 parts by weight, and preferably 0.5 parts to 10 parts by weight, to 1 part by weight of at least one of theta-alumina and alpha-alumina which supports the perovskite-type composite oxide containing a noble metal. If the amount of the thermostable oxides is less than the above-specified range, the catalyst may not have sufficiently improved thermostability. If it is more than the above-specified range, the catalyst may comprise an excess amount of thermostable oxides, which may invite disadvantages in cost and production.

The mixing procedure of the thermostable oxides is not specifically limited, as long as it can physically mix the thermostable oxides with at least one of theta-alumina and alpha-alumina supporting the perovskite-type composite oxide. For example, a powder of at least one of theta-alumina and alpha-alumina supporting the perovskite-type composite oxide containing a noble metal may be mixed with a powder of the thermostable oxides by dry-mixing or wet-mixing.

The thermostable oxide preferably comprises a thermostable oxide supporting a noble metal. By incorporating the thermostable oxide supporting a noble metal, the resulting catalyst can have a further increased catalytic activity and further improved catalytic performance, in addition to the action of the noble metal contained in the perovskite-type composite oxide containing a noble metal.

Examples of the noble metal herein include Pd, Rh, and Pt, of which Rh and Pt are preferred. These noble metals can be used alone or in combination.

The noble metal can be supported by the thermostable oxide according to a known procedure not specifically limited. It can be supported, for example, by preparing a salt-containing solution comprising the noble metal, impregnating the thermostable oxide with the salt-containing solution and baking the resulting article.

The same as listed above can be used as the salt-containing solution. Practical examples thereof include aqueous nitrate solution, dinitrodiammine nitrate solution, and aqueous chloride solution. More specifically, examples of the palladium salt solution include aqueous palladium nitrate solution, dinitrodiammine palladium nitrate solution, and palladium tetraammine nitrate solution. Examples of the rhodium salt solution include rhodium nitrate solution and rhodium chloride solution. Examples of the platinum salt solution include dinitrodiammine platinum nitrate solution, chloroplatinic acid solution, and platinum tetraammine solution.

After impregnating the thermostable oxide with the noble metal, the resulting article is dried, for example, at 50° C. to 200° C. for 1 to 48 hours and is baked at 350° C. to 1000° C. for 1 to 12 hours.

Alternatively, the noble metal can be supported by the thermostable oxide, for example, in the following manner. When the thermostable oxide is the zirconia composite oxide or the ceria composite oxide, the noble metal is coprecipitated with the respective components of the zirconia composite oxide or the ceria composite oxide by adding a solution of the noble metal salt during coprecipitation or hydrolysis of the salt solution or mixed alkoxide solution containing zirconium, cerium, and the alkaline earth metal and/or the rare-earth element, and the coprecipitate is then baked.

Another example of a method for allowing the thermostable oxide to support the noble metal is as follows. When the thermostable oxide is one of the theta-alumina, alpha-alumina, and gamma-alumina, the noble metal is coprecipitated with the theta-alumina, alpha-alumina, or gamma-alumina by adding a solution of the noble metal salt during precipitation of the theta-alumina, alpha-alumina, or gamma-alumina from an aqueous aluminum salt solution typically using ammonia in its production process, and the coprecipitate is baked.

When two or more different noble metals are supported, these noble metals may be supported simultaneously in one step or sequentially in plural steps.

The amount of the noble metals is set according to the purpose and the use thereof and is, for example, 0.01% to 3.0% by weight, and preferably 0.05% to 1.0% by weight of the total amount of the thermostable oxides.

Examples of the thermostable oxide supporting a noble metal thus prepared include a zirconia composite oxide supporting a noble metal, a ceria composite oxide supporting a noble metal, a theta-alumina supporting a noble metal, and a gamma-alumina supporting a noble metal.

The zirconia composite oxide supporting a noble metal is preferably a zirconia composite oxide supporting Pt and/or Rh. In this case, the amount of Pt and/or Rh is 0.01% to 2.0% by weight, and preferably 0.05% to 1.0% by weight of the amount of the zirconia composite oxide.

The ceria composite oxide supporting a noble metal is preferably a ceria composite oxide supporting Pt. In this case, the amount of Pt is 0.01% to 2.0% by weight, and preferably 0.05% to 1.0% by weight of the amount of the ceria composite oxide.

The theta-alumina supporting a noble metal is preferably a theta-alumina supporting Pt and/or Rh. In this case, the amount of Pt and/or Rh is 0.01% to 2.0% by weight, and preferably 0.05% to 1.0% by weight of the amount of the theta-alumina.

The gamma-alumina supporting a noble metal is preferably a gamma-alumina supporting Pt and/or Rh. In this case, the amount of Pt and/or Rh is 0.01% to 2.0% by weight, and preferably 0.05% to 1.0% by weight of the amount of the gamma-alumina.

Of these thermostable oxides each supporting a noble metal, the ceria composite oxide supporting a noble metal is preferred. The use of the ceria composite oxide supporting a noble metal can improve the oxygen storage performance.

The entire thermostable oxide may support the noble metal. Alternatively, the thermostable oxide may comprise both a thermostable oxide supporting the noble metal and a thermostable oxide not supporting the noble metal.

In an embodiment in which the perovskite-type composite oxide containing a noble metal is mixed with at least one of theta-alumina and alpha-alumina (hereinafter referred to as "mixing embodiment"), the amount of at least one of theta-alumina and alpha-alumina with respect to the perovskite-type composite oxide containing a noble metal is not specifically limited and is, for example, 0.5 parts to 20 parts by weight, and preferably 0.5 parts to 10 parts by weight to 1 part by weight of the perovskite-type composite oxide containing a noble metal. An amount of at least one of theta-alumina and alpha-alumina less than the above-specified range may invite insufficient dispersion of the perovskite-type composite oxide containing a noble metal and may fail to prevent grain growth in an atmosphere of high temperature. An amount of at least one of theta-alumina and alpha-alumina exceeding the above-specified range may invite disadvantages in cost and production.

The mixing procedure of the perovskite-type composite oxide containing a noble metal with at least one of theta-alumina and alpha-alumina is not specifically limited, as long as it can physically mix the perovskite-type composite oxide containing a noble metal with at least one of theta-alumina and alpha-alumina. For example, a powder of the perovskite-type composite oxide containing a noble metal is mixed with a powder of at least one of theta-alumina and alpha-alumina by dry-mixing or wet-mixing.

The exhaust gas purifying catalyst of the present invention according to the mixing embodiment may further be mixed with at least one thermostable oxide selected from the group consisting of zirconia composite oxides (the zirconia composite oxides represented by the general formula (1)), ceria composite oxides (the ceria composite oxides represented by the general formula (2)), gamma-alumina, $SrZrO_3$ and $LaAlO_3$. By mixing these thermostable oxides, the perovskite-type composite oxide containing a noble metal can exhibit further improved thermostability. This easily enables the exhaust gas purifying catalyst of the present invention to be used in a very severe atmosphere of high temperature such as in manifold converters.

The same as listed above can be used as the zirconia composite oxides (the zirconia composite oxides represented by the general formula (1)), the ceria composite oxides (the ceria composite oxides represented by the general formula (2)), gamma-alumina, $SrZrO_3$ and $LaAlO_3$ herein.

The mixing ratio of these thermostable oxides (excluding the theta-alumina and alpha-alumina; this is to be repeated in the following) is not specifically limited and is, for example, such that the total amount of the thermostable oxides excluding the theta-alumina and alpha-alumina is 0.5 parts to 30 parts by weight, and preferably 0.5 parts to 10 parts by weight to 1 part by weight of the perovskite-type composite oxide containing a noble metal. If the amount of the thermostable oxides is less than the above-specified range, the thermostability may not be sufficiently improved. If it exceeds the above-specified range, the resulting catalyst may contain excess amounts of the thermostable oxides, which may invite disadvantages in cost and production.

The mixing procedure of the thermostable oxide is not specifically limited, as long as it can physically mix the thermostable oxides with the perovskite-type composite oxide containing a noble metal together with at least one of theta-alumina and alpha-alumina. For example, a powder of at least one of theta-alumina and alpha-alumina and a powder of the thermostable oxides are mixed with the perovskite-type composite oxide containing a noble metal by dry-mixing or wet-mixing.

The thermostable oxide preferably comprises the thermostable oxide supporting a noble metal, as described above. By incorporating the thermostable oxide supporting a noble metal, the resulting catalyst can exhibit further increased catalytic activity and further improved catalytic performance, in addition to the action of the noble metal contained in the perovskite-type composite oxide containing a noble metal.

Examples of the noble metal herein include Pd, Rh and Pt, of which Rh and Pt are preferred. These noble metals can be used alone or in combination. The amount of the noble metal is, for example, 0.01% to 3.0% by weight, and preferably 0.05% to 1.0% by weight of the total amount of the thermostable oxides, as described above.

Examples of the thermostable oxide supporting a noble metal include zirconia composite oxides each supporting a noble metal (preferably the above-mentioned zirconia composite oxide supporting Pt and/or Rh), ceria composite oxides each supporting a noble metal (preferably the above-mentioned ceria composite oxide supporting Pt), theta-alumina supporting a noble metal (preferably the above-mentioned theta-alumina supporting Pt and/or Rh), and gamma-alumina supporting a noble metal (preferably the above-mentioned gamma-alumina supporting Pt and/or Rh).

In the exhaust gas purifying catalyst of the present invention according to the mixing embodiment, the perovskite-type composite oxide containing a noble metal may be supported not by the theta-alumina and/or alpha-alumina but by any of other thermostable oxides (preferably, zirconia composite oxides (the zirconia composite oxides represented by the general formula (1)), ceria composite oxides (the ceria composite oxides represented by the general formula (2)), $SrZrO_3$ and $LaAlO_3$) and then mixed with at least one of the theta-alumina and alpha-alumina.

The perovskite-type composite oxide containing a noble metal can be supported by the procedure in the supporting of the perovskite-type composite oxide containing a noble metal by at least one of theta-alumina and alpha-alumina. Specifically, the supporting procedure can be carried out by incorporating the thermostable oxide into a pre-crystallization composition before the crystallization of the perovskite-type composite oxide containing a noble metal and heat-treating the resulting mixture in the course of production of the perovskite-type composite oxide containing a noble metal.

More specifically, the supporting can be carried out by mixing a powder of the thermostable oxide typically with a mixed solution (pre-crystallization composition) of elementary components constituting the perovskite-type composite oxide containing a noble metal or with the resulting precipitate (pre-crystallization composition), and heat-treating the resulting mixture.

When the perovskite-type composite oxide comprising a noble metal as a constituent is prepared by the coprecipitation process, for example, the powder of the thermostable oxide is added typically to the prepared aqueous mixed salt solution (pre-crystallization composition), the resulting coprecipitate (pre-crystallization composition) or a dried product thereof (pre-crystallization composition), and the resulting mixture is then heat-treated.

When the perovskite-type composite oxide comprising a noble metal as a constituent is prepared by the citrate complex process, for example, the powder of the thermostable oxide is added typically to the prepared aqueous citrate mixed salt solution (pre-crystallization composition), the resulting citrate complex (pre-crystallization composition), or a provisionally baked product thereof (pre-crystallization composition), and the resulting mixture is then heat-treated.

When the perovskite-type composite oxide comprising a noble metal as a constituent is prepared by the alkoxide process, the powder of the thermostable oxide is added typically to the prepared mixed alkoxide solution (pre-crystallization composition) or homogenous mixed solution (pre-crystallization composition), the resulting precipitate (pre-crystallization composition), or a dried product thereof (pre-crystallization composition), and the resulting mixture is then heat-treated.

Among the above-mentioned methods, preferred is the method in which the powder of the thermostable oxide is added during the course of the production of the perovskite-type composite oxide comprising a noble metal as a constituent and the mixture is heat-treated.

When the perovskite-type composite oxide containing a noble metal is supported by the thermostable oxide and is then mixed with at least one of theta-alumina and alpha-alumina, the amount of at least one of theta-alumina and alpha-alumina with respect to the thermostable oxide supporting the perovskite-type composite oxide containing a noble metal is not specifically limited and is, for example, 0.5 parts to 30 parts by weight, and preferably 0.5 parts to 10 parts by weight to 1 part by weight of the thermostable oxide supporting the perovskite-type composite oxide containing a noble metal. If the amount of at least one of theta-alumina and alpha-alumina is less than the above-specified range, the resulting catalyst may not satisfactorily maintain as a coating layer on a catalyst carrier mentioned later. In contrast, an amount of at least one of theta-alumina and alpha-alumina exceeding the above-specified range may invite disadvantages in cost and production.

When the perovskite-type composite oxide containing a noble metal is supported by the thermostable oxide and is then mixed with at least one of theta-alumina and alpha-alumina, the resulting article can also be mixed with the same or another thermostable oxide (preferably, any of the zirconia composite oxides, the ceria composite oxides, $SrZrO_3$ and $LaAlO_3$) in the above-mentioned proportions by the above-described procedure.

The exhaust gas purifying catalyst of the present invention can constitute, for example, a coating layer on a catalyst carrier. The catalyst carrier can be any of known catalyst carriers such as honeycomb monolith carriers derived from cordierite, without being limited to a particular catalyst carrier.

The coating layer can be formed on the catalyst carrier, for example, in the following manner. Initially, water is added to the perovskite-type composite oxide containing a noble metal and at least one of theta-alumina and alpha-alumina (any of the supporting embodiments and the mixing embodiments will do) as well as the thermostable oxide added according to necessity to obtain a slurry. The optionally added thermostable oxide is at least one thermostable oxide selected from the zirconia composite oxides, the ceria composite oxides, theta-alumina, alpha-alumina, gamma-alumina, $SrZrO_3$ and $LaAlO_3$ in the supporting embodiments and is at least one thermostable oxide selected from the zirconia composite oxides, the ceria composite oxides, gamma-alumina, $SrZrO_3$ and $LaAlO_3$ in the mixing embodiments (this is to be repeated in the following). The slurry is then applied to the catalyst carrier, is dried at 50° C. to 200° C. for 1 to 48 hours and is baked at 350° C. to 1000° C. for 1 to 12 hours. Alternatively, the coating layer can be formed by adding water to each of the respective components to obtain slurries, mixing these slurries, applying the resulting slurry mixture to the catalyst carrier, drying at 50° C. to 200° C. for 1 to 48 hours and then baking at 350° C. to 1000° C. for 1 to 12 hours.

The exhaust gas purifying catalyst of the present invention can also be arranged as a multilayer coating layer on the catalyst carrier. The multilayer coating layer comprises an outer layer constituting its surface and an inner layer arranged inside the outer layer.

When the coating layer comprises multiple layers, the perovskite-type composite oxide containing a noble metal and at least one of theta-alumina and alpha-alumina may be contained in different layers but are preferably contained in the same layer(s). These components may be contained in two or more layers, as long as they are contained in the same layer(s). The layer(s) which will contain these components are appropriately decided depending on the purpose and the use of the catalyst.

The inner layer can be prepared by applying the slurry containing the respective components to the catalyst carrier, drying and baking the resulting article, as described above. The outer layer can be prepared by applying the slurry containing the respective components to the inner layer formed on the catalyst carrier, drying and baking the resulting article, as described above.

When the exhaust gas purifying catalyst of the present invention comprises multiple layers, it is preferred that the inner layer comprises the theta-alumina and/or theta-alumina supporting the perovskite-type composite oxide containing a noble metal, and/or, the thermostable oxide supporting the perovskite-type composite oxide containing a noble metal.

By incorporating at least one of theta-alumina and alpha-alumina supporting the perovskite-type composite oxide containing a noble metal, and/or, the thermostable oxide supporting the perovskite-type composite oxide containing a noble metal into the inner layer, the catalyst can be prevented from poisoning and thermal degradation and can exhibit further improved catalytic performance.

When the exhaust gas purifying catalyst of the present invention comprises the multiple layers as above, each of the perovskite-type composite oxides each containing a noble metal can be used alone or in combination. Specifically, for example, the perovskite-type composite oxide containing a noble metal can be contained in the inner layer alone or the outer layer alone. In addition, perovskite-type composite oxides each containing the same or different types of plural noble metals may be contained in either one of the inner layer and outer layer or in both of the inner layer and outer layer.

When the exhaust gas purifying catalyst of the present invention comprises the multiple layers, the Pd containing perovskite-type composite oxide is preferably contained in the inner layer. By incorporating the Pd containing perovskite-type composite oxide into the inner layer, the poisoning and thermal degradation of Pd contained in the perovskite-type composite oxide can be prevented thereby to improve the durability.

When the exhaust gas purifying catalyst of the present invention comprises the multiple layers, the Rh-containing perovskite-type composite oxide is preferably contained in the outer layer. By incorporating the Rh-containing perovskite-type composite oxide into the outer layer, alloying with Pd can be prevented typically in the case where the Pd containing perovskite-type composite oxide is contained in the inner layer.

When the exhaust gas purifying catalyst of the present invention comprises the multiple layers, the Pt containing perovskite-type composite oxide is preferably contained in the inner layer and/or the outer layer.

When the exhaust gas purifying catalyst of the present invention comprises the multiple layers, it is preferred that the noble metal contained in the outer layer (including the noble metal contained in the perovskite-type composite oxide, and the noble metal supported by the thermostable oxide) is Rh and/or Pt and that the noble metal contained in the inner layer (including the noble metal contained in the perovskite-type composite oxide, and the noble metal supported by the thermostable oxide) is at least Pd. This configuration can prevent the poisoning and thermal degradation of the catalyst by incorporating Pd into the inner layer and can further improve the catalytic performance by the action of Rh and/or Pt contained in the outer layer.

When the exhaust gas purifying catalyst of the present invention comprises the multiple layers, it is preferred that the ceria composite oxide and/or theta-alumina each supporting a noble metal is contained in the inner layer, and that at least two different thermostable oxides selected from the zirconium composite oxide supporting a noble metal, the ceria composite oxide supporting a noble metal, the theta-alumina supporting a noble metal, and the gamma-alumina supporting a noble metal are contained in the outer layer.

More specifically, it is preferred that the inner layer comprises the theta-alumina and the ceria composite oxide supporting Pt and that the outer layer comprises at least one thermostable oxide selected from the group consisting of the zirconia composite oxide supporting Pt and Rh, the ceria composite oxide supporting Pt, and the theta-alumina supporting Pt and Rh.

The exhaust gas purifying catalyst of the present invention may further comprise any of sulfates, carbonates, nitrates, and acetates of Ba, Ca, Sr, Mg, and La. Any of these sulfates, carbonates, nitrates, and acetates is preferably contained in a layer containing Pd, when the catalyst comprises the multiple layers. By incorporating any of the sulfates, carbonates, nitrates, and acetates, the poisoning of Pd typically by the action of hydrocarbons (HC) can be prevented thereby to avoid decrease in catalytic activity. Of these salts, $BaSO_4$ is preferably used.

The amount of any of these sulfates, carbonates, nitrates, and acetates may be appropriately set depending on the purpose and the use thereof. The sulfate, carbonate, nitrate and/or acetate can be incorporated into the inner layer and/or the outer layer, for example, by adding the sulfate, carbonate, nitrate, and/or acetate into the slurry for forming the inner layer and/or the outer layer.

The inner layer may comprise multiple layers, according to the purpose and the use thereof. The same procedure as above can be applied to form the inner layer as multiple layers.

The exhaust gas purifying catalyst of the present invention thus obtained can allow a noble metal to be stably contained in a perovskite-type composite oxide and, in addition, remarkably increase the thermostability of the perovskite-type composite oxide by the action of at least one of theta-alumina and alpha-alumina.

In each perovskite-type composite oxide, the noble metal is finely and highly dispersed thereby to maintain its high catalytic activity even in long-term use in an atmosphere of high temperature. This is because of the self-regenerative function in which the noble metal repetitively undergoes solid-solution under an oxidative atmosphere and deposition under a reducing atmosphere with respect to the perovskite structure. This self-regenerative function also enables the resulting catalyst to achieve satisfactory catalytic activity even if the amount of the noble metal is significantly reduced.

The perovskite-type composite oxide containing a noble metal exhibits increased thermostability by the action of at least one of theta-alumina and alpha-alumina. This prevents the perovskite-type composite oxide from grain growth and a decreased specific surface area in an atmosphere of high temperature of, for example, 900° C. to 1000° C., or further exceeding 1050° C.

Thus, the exhaust gas purifying catalyst of the present invention can maintain the catalytic activity of the noble metal at a high level over a long time and achieve satisfactory exhaust gas purifying performance, even in an atmosphere of high temperature exceeding 900° C. to 1000° C. It can be advantageously used as an automobile exhaust gas purifying catalyst.

EXAMPLES

The present invention will be illustrated in further detail with reference to several examples and comparative examples below, which are never intended to limit the scope of the invention.

(1) Production of Zirconia Composite Oxide

| Production Example A1 | |
|---|---|
| Zirconium oxychloride (corresponding to 36.56% by mass of $ZrO_2$, the same is true hereinafter) | 26.6 g (0.079 mol) |
| Cerium nitrate | 6.9 g (0.016 mol) |
| Lanthanum nitrate | 0.4 g (0.001 mol) |
| Neodymium nitrate | 1.8 g (0.004 mol) |

The above listed components were dissolved in 100 mL of deionized water to obtain an aqueous mixed salt solution. Separately, 25.0 g of sodium carbonate was dissolved in 200 mL of deionized water to obtain an alkaline aqueous solution, and the aqueous mixed salt solution was gradually added dropwise thereto to form a coprecipitate. After being fully washed with water and filtrated, the coprecipitate was fully dried at 80° C. in vacuum. The coprecipitate was then heat treated (calcined) at 800° C. for one hour to obtain a powdery zirconia composite oxide (Production Example A1) comprising a $Zr_{0.79}Ce_{0.16}La_{0.01}Nd_{0.04}$ oxide, in which cerium and lanthanum constitute a solid solution.

The powdery zirconia composite oxide was impregnated with a rhodium nitrate solution, dried at 100° C. and baked at 500° C. to obtain a powdery Rh supporting zirconia composite oxide (Production Example A1-1) supporting 0.5% by weight of Rh. The powdery zirconia composite oxide was impregnated with a dinitrodiammine platinum nitrate solution, dried at 100° C., impregnated with a rhodium nitrate solution, dried at 100° C. and baked at 500° C. to obtain a powdery Pt—Rh supporting zirconia composite oxide (Production Example A1-2) supporting 0.15% by weight of Pt and 0.15% by weight of Rh.

| Production Example A2 | |
|---|---|
| Zirconium oxychloride | 20.2 g (0.060 mol) |
| Cerium nitrate | 13.0 g (0.030 mol) |

-continued

| Production Example A2 | |
|---|---|
| Lanthanum nitrate | 2.2 g (0.005 mol) |
| Yttrium nitrate | 1.9 g (0.005 mol) |

The above listed components were dissolved in 100 mL of deionized water to obtain an aqueous mixed salt solution. Separately, 25.0 g of sodium carbonate was dissolved in 200 mL of deionized water to obtain an alkaline aqueous solution, and the aqueous mixed salt solution was gradually added dropwise thereto to form a coprecipitate. After being fully washed with water and filtrated, the coprecipitate was fully dried at 80° C. in vacuum. The coprecipitate was then heat treated (calcined) at 800° C. for one hour to obtain a powdery zirconia composite oxide (Production Example A2) comprising a $Zr_{0.60}Ce_{0.30}La_{0.05}Y_{0.05}$ oxide in which cerium and lanthanum constitute a solid solution.

| Production Example A3 | |
|---|---|
| Zirconium oxychloride | 16.9 g (0.050 mol) |
| Cerium nitrate | 17.4 g (0.040 mol) |
| Lanthanum nitrate | 2.2 g (0.005 mol) |
| Neodymium nitrate | 2.2 g (0.005 mol) |

The above listed components were dissolved in 100 mL of deionized water to obtain an aqueous mixed salt solution. Separately, 25.0 g of sodium carbonate was dissolved in 200 mL of deionized water to obtain an alkaline aqueous solution, and the aqueous mixed salt solution was gradually added dropwise thereto to form a coprecipitate. After being fully washed with water and filtrated, the coprecipitate was fully dried at 80° C. in vacuum. The coprecipitate was then heat treated (calcined) at 800° C. for one hour to obtain a powdery zirconia composite oxide (Production Example A3) comprising a $Zr_{0.50}Ce_{0.40}La_{0.05}Nd_{0.05}$ oxide, in which cerium and lanthanum constitute a solid solution.

The powdery zirconia composite oxide was impregnated with a dinitrodiammine platinum nitrate solution, dried at 100° C., impregnated with a rhodium nitrate solution, dried at 100° C. and baked at 500° C. to obtain a powdery Pt—Rh supporting zirconia composite oxide (Production Example A3-1) supporting 0.27% by weight of Pt and 1.33% by weight of Rh.

| Production Example A4 | |
|---|---|
| Zirconium oxychloride | 21.9 g (0.065 mol) |
| Cerium nitrate | 13.0 g (0.030 mol) |
| Lanthanum nitrate | 0.9 g (0.002 mol) |
| Yttrium nitrate | 1.1 g (0.003 mol) |

The above listed components were dissolved in 100 mL of deionized water to obtain an aqueous mixed salt solution. Separately, 25.0 g of sodium carbonate was dissolved in 200 mL of deionized water to obtain an alkaline aqueous solution, and the aqueous mixed salt solution was gradually added dropwise thereto to form a coprecipitate. After being fully washed with water and filtrated, the coprecipitate was fully dried at 80° C. in vacuum. The coprecipitate was then heat treated (calcined) at 800° C. for one hour to obtain a powdery zirconia composite oxide (Production Example A4) comprising a $Zr_{0.65}Ce_{0.30}La_{0.02}Y_{0.03}$ oxide in which cerium and lanthanum constitute a solid solution.

| Production Example A5 | |
|---|---|
| Zirconium oxychloride | 23.6 g (0.070 mol) |
| Cerium nitrate | 8.1 g (0.020 mol) |
| Lanthanum nitrate | 2.2 g (0.005 mol) |
| Yttrium nitrate | 1.9 g (0.005 mol) |

The above listed components were dissolved in 100 mL of deionized water to obtain an aqueous mixed salt solution. Separately, 25.0 g of sodium carbonate was dissolved in 200 mL of deionized water to obtain an alkaline aqueous solution, and the aqueous mixed salt solution was gradually added dropwise thereto to form a coprecipitate. After being fully washed with water and filtrated, the coprecipitate was fully dried at 80° C. in vacuum. The coprecipitate was then heat treated (calcined) at 800° C. for one hour to obtain a powdery zirconia composite oxide (Production Example A5) comprising a $Zr_{0.70}Ce_{0.20}La_{0.05}Y_{0.05}$ oxide in which cerium and lanthanum constitute a solid solution.

| Production Example A6 | |
|---|---|
| Zirconium oxychloride | 25.6 g (0.076 mol) |
| Cerium nitrate | 7.8 g (0.018 mol) |
| Lanthanum nitrate | 1.7 g (0.002 mol) |
| Neodymium nitrate | 1.8 g (0.004 mol) |

The above listed components were dissolved in 100 mL of deionized water to obtain an aqueous mixed salt solution. Separately, 25.0 g of sodium carbonate was dissolved in 200 mL of deionized water to obtain an alkaline aqueous solution, and the aqueous mixed salt solution was gradually added dropwise thereto to form a coprecipitate. After being fully washed with water and filtrated, the coprecipitate was fully dried at 80° C. in vacuum. The coprecipitate was then heat treated (calcined) at 800° C. for one hour to obtain a powdery zirconia composite oxide (Production Example A6) comprising a $Zr_{0.76}Ce_{0.18}La_{0.02}Nd_{0.04}$ oxide, in which cerium and lanthanum constitute a solid solution.

The powdery zirconia composite oxide was impregnated with a dinitrodiammine platinum nitrate solution, dried at 100° C., impregnated with a rhodium nitrate solution, dried at 100° C. and baked at 500° C. to obtain a powdery Pt—Rh supporting zirconia composite oxide (Production Example A6-1) supporting 0.20% by weight of Pt and 0.30% by weight of Rh; a powdery Pt—Rh supporting zirconia composite oxide (Production Example A6-2) supporting 1.00% by weight of Pt and 1.00% by weight of Rh; a powdery Pt—Rh supporting zirconia composite oxide (Production Example A6-3) supporting 0.30% by weight of Pt and 1.40% by weight of Rh; or a powdery Pt—Rh supporting zirconia composite oxide (Production Example A6-4) supporting 0.27% by weight of Pt and 1.33% by weight of Rh.

| Production Example A7 | |
|---|---|
| Zirconium oxychloride | 20.2 g (0.060 mol) |
| Cerium nitrate | 13.0 g (0.030 mol) |

-continued

| Production Example A7 | |
| --- | --- |
| Lanthanum nitrate | 2.2 g (0.005 mol) |
| Yttrium nitrate | 1.9 g (0.005 mol) |

The above listed components were dissolved in 100 mL of pure water, followed by homogeneous mixing to obtain an aqueous mixed salt solution. Separately, 50.4 g (0.24 mol) of citric acid was dissolved in pure water, and the solution was added to the aqueous mixed salt solution to obtain an aqueous solution of citric acid and salts.

The aqueous solution of citric acid and salts was evaporated to dryness in a hot water bath at 60° C. to 80° C. with evacuation using a rotary evaporator. After passage of about three hours and when the solution came into a starch-syrup-like state, the temperature of the hot water bath was gradually raised, followed by drying at 250° C. in vacuum for one hour to obtain a citrate complex.

The above-prepared citrate complex was baked at 300° C. in the air for three hours, pulverized in a mortar and baked again at 700° C. in the air for three hours to obtain a powdery zirconia composite oxide (Production Example A7) comprising a $Zr_{0.60}Ce_{0.30}La_{0.05}Y_{0.05}$ oxide.

| Production Example A8 | |
| --- | --- |
| Zirconium oxychloride | 21.9 g (0.065 mol) |
| Cerium nitrate | 13.0 g (0.030 mol) |
| Lanthanum nitrate | 0.9 g (0.002 mol) |
| Yttrium nitrate | 1.1 g (0.003 mol) |

The above listed components were dissolved in 100 mL of pure water, followed by homogeneous mixing to obtain an aqueous mixed salt solution. Separately, 50.4 g (0.24 mol) of citric acid was dissolved in pure water, and the solution was added to the aqueous mixed salt solution to obtain an aqueous solution of citric acid and salts.

The aqueous solution of citric acid and salts was evaporated to dryness in a hot water bath at 60° C. to 80° C. with evacuation using a rotary evaporator. After passage of about three hours and when the solution came into a starch-syrup-like state, the temperature of the hot water bath was gradually raised, followed by drying at 250° C. in vacuum for one hour to obtain a citrate complex.

The above-prepared citrate complex was baked at 300° C. in the air for three hours, pulverized in a mortar and baked again at 700° C. in the air for three hours to obtain a powdery zirconia composite oxide (Production Example A8) comprising a $Zr_{0.65}Ce_{0.30}La_{0.02}Y_{0.03}$ oxide.

| Production Example A9 | |
| --- | --- |
| Zirconium oxychloride | 27.0 g (0.080 mol) |
| Cerium nitrate | 6.5 g (0.015 mol) |
| Lanthanum nitrate | 0.9 g (0.002 mol) |
| Neodymium nitrate | 1.3 g (0.003 mol) |

The above listed components were dissolved in 100 mL of deionized water to obtain an aqueous mixed salt solution. Separately, 25.0 g of sodium carbonate was dissolved in 200 mL of deionized water to obtain an alkaline aqueous solution, and the aqueous mixed salt solution was gradually added dropwise thereto to form a coprecipitate. After being fully washed with water and filtrated, the coprecipitate was fully dried at 80° C. in vacuum. The coprecipitate was then heat treated (calcined) at 800° C. for one hour to obtain a powdery zirconia composite oxide (Production Example A9) comprising a $Zr_{0.80}Ce_{0.15}La_{0.02}Nd_{0.03}$ oxide, in which cerium and lanthanum constitute a solid solution.

The powdery zirconia composite oxide was impregnated with a dinitrodiammine platinum nitrate solution, dried at 100° C., impregnated with a rhodium nitrate solution, dried at 100° C. and baked at 500° C. to obtain a powdery Pt—Rh supporting zirconia composite oxide (Production Example A9-1) supporting 0.27% by weight of Pt and 1.33% by weight of Rh. Separately, the powdery zirconia composite oxide was impregnated with a rhodium nitrate solution, dried at 100° C. and baked at 500° C. to obtain a powdery Rh supporting zirconia composite oxide (Production Example A9-2) supporting 0.83% by weight of Rh.

| Production Example A10 | |
| --- | --- |
| Zirconium oxychloride | 16.9 g (0.050 mol) |
| Cerium nitrate | 17.4 g (0.040 mol) |
| Lanthanum nitrate | 2.2 g (0.005 mol) |
| Yttrium nitrate | 1.9 g (0.005 mol) |

The above listed components were dissolved in 100 mL of deionized water to obtain an aqueous mixed salt solution. Separately, 25.0 g of sodium carbonate was dissolved in 200 mL of deionized water to obtain an alkaline aqueous solution, and the aqueous mixed salt solution was gradually added dropwise thereto to form a coprecipitate. After being fully washed with water and filtrated, the coprecipitate was fully dried at 80° C. in vacuum. The coprecipitate was then heat treated (calcined) at 800° C. for one hour to obtain a powdery zirconia composite oxide (Production Example A10) comprising a $Zr_{0.50}Ce_{0.40}La_{0.05}Y_{0.05}$ oxide, in which cerium and lanthanum constitute a solid solution.

| Production Example A11 | |
| --- | --- |
| Zirconium oxychloride | 20.2 g (0.060 mol) |
| Cerium nitrate | 13.0 g (0.030 mol) |
| Lanthanum nitrate | 2.2 g (0.005 mol) |
| Neodymium nitrate | 2.2 g (0.005 mol) |

The above listed components were dissolved in 100 mL of pure water, followed by homogeneous mixing to obtain an aqueous mixed salt solution. Separately, 50.4 g (0.24 mol) of citric acid was dissolved in pure water, and the solution was added to the aqueous mixed salt solution to obtain an aqueous solution of citric acid and salts.

The aqueous solution of citric acid and salts was evaporated to dryness in a hot water bath at 60° C. to 80° C. with evacuation using a rotary evaporator. After passage of about three hours and when the solution came into a starch-syrup-like state, the temperature of the hot water bath was gradually raised, followed by drying at 250° C. in vacuum for one hour to obtain a citrate complex.

The above-prepared citrate complex was baked at 300° C. in the air for three hours, pulverized in a mortar and baked again at 700° C. in the air for three hours to obtain a powdery zirconia composite oxide (Production Example A11) comprising a $Zr_{0.60}Ce_{0.30}La_{0.05}Nd_{0.05}$ oxide.

| Production Example A12 | |
| --- | --- |
| Zirconium oxychloride | 23.6 g (0.070 mol) |
| Cerium nitrate | 10.8 g (0.025 mol) |
| Lanthanum nitrate | 1.7 g (0.002 mol) |
| Neodymium nitrate | 1.3 g (0.003 mol) |

The above listed components were dissolved in 100 mL of deionized water to obtain an aqueous mixed salt solution. Separately, 25.0 g of sodium carbonate was dissolved in 200 mL of deionized water to obtain an alkaline aqueous solution, and the aqueous mixed salt solution was gradually added dropwise thereto to form a coprecipitate. After being fully washed with water and filtrated, the coprecipitate was fully dried at 80° C. in vacuum. The coprecipitate was then heat treated (calcined) at 800° C. for one hour to obtain a powdery zirconia composite oxide (Production Example A12) comprising a $Zr_{0.70}Ce_{0.25}La_{0.02}Nd_{0.03}$ oxide, in which cerium and lanthanum constitute a solid solution.

The powdery zirconia composite oxide was impregnated with a dinitrodiammine platinum nitrate solution, dried at 100° C., impregnated with a rhodium nitrate solution, dried at 100° C. and baked at 500° C. to obtain a powdery Pt—Rh supporting zirconia composite oxide (Production Example A12-1) supporting 0.75% by weight of Pt and 1.25% by weight of Rh.

| Production Example A13 | |
| --- | --- |
| Zirconium oxychloride | 23.6 g (0.070 mol) |
| Cerium nitrate | 10.8 g (0.025 mol) |
| Lanthanum nitrate | 1.7 g (0.002 mol) |
| Yttrium nitrate | 1.1 g (0.003 mol) |

The above listed components were dissolved in 100 mL of deionized water to obtain an aqueous mixed salt solution. Separately, 25.0 g of sodium carbonate was dissolved in 200 mL of deionized water to obtain an alkaline aqueous solution, and the aqueous mixed salt solution was gradually added dropwise thereto to form a coprecipitate. After being fully washed with water and filtrated, the coprecipitate was fully dried at 80° C. in vacuum. The coprecipitate was then heat treated (calcined) at 800° C. for one hour to obtain a powdery zirconia composite oxide (Production Example A13) comprising $Zr_{0.70}Ce_{0.25}La_{0.02}Y_{0.03}$ oxide, in which cerium and lanthanum constitute a solid solution.

| Production Example A14 | |
| --- | --- |
| Zirconium ethoxyethylate | 31.4 g (0.070 mol) |
| Cerium ethoxyethylate | 10.2 g (0.025 mol) |
| Praseodymium ethoxyethylate | 0.8 g (0.002 mol) |
| Neodymium ethoxyethylate | 1.2 g (0.003 mol) |

The above listed components were dissolved in 200 mL of toluene with stirring to obtain a mixed alkoxide solution. The alkoxides were hydrolyzed by adding the mixed alkoxide solution dropwise to 600 mL of deionized water over about ten minutes. The toluene and deionized water were distilled off from the hydrolyzed solution to dryness to obtain a pre-crystallization composition. After being subjected to forced air drying at 60° C. for twenty four hours, the dried product heat treated (baked) in an electric furnace at 800° C. for one hour to obtain a powdery zirconia composite oxide (Production Example A14) comprising a $Zr_{0.70}Ce_{0.25}Pr_{0.02}Nd_{0.03}$ oxide.

(2) Production of Ceria Composite Oxide

| Production Example B1 | |
| --- | --- |
| Cerium methoxypropylate | 24.4 g (0.060 mol) |
| Zirconium methoxypropylate | 13.4 g (0.030 mol) |
| Yttrium methoxypropylate | 3.6 g (0.010 mol) |

The above listed components were dissolved in 200 mL of toluene with stirring to obtain a mixed alkoxide solution. The alkoxides were hydrolyzed by adding 80 mL of deionized water dropwise to the solution. The toluene and deionized water were distilled off from the hydrolyzed solution to dryness to obtain a pre-crystallization composition. After being subjected to forced air drying at 60° C. for twenty four hours, the dried product was baked in an electric furnace at 450° C. for three hours to obtain a powdery ceria composite oxide (Production Example B1) comprising a $Ce_{0.60}Zr_{0.30}Y_{0.10}$ oxide.

The powdery ceria composite oxide was impregnated with a dinitrodiammine platinum nitrate solution, dried at 100° C. and baked at 500° C. to obtain a powdery Pt supporting ceria composite oxide (Production Example B1-1) supporting 0.25% by weight of Pt; a powdery Pt supporting ceria composite oxide (Production Example B1-2) supporting 0.50% by weight of Pt; a powdery Pt supporting ceria composite oxide (Production Example B1-3) supporting 1.00% by weight of Pt; a powdery Pt supporting ceria composite oxide (Production Example B1-4) supporting 0.30% by weight of Pt; a powdery Pt supporting ceria composite oxide (Production Example B1-5) supporting 0.80% by weight of Pt; a powdery Pt supporting ceria composite oxide (Production Example B1-6) supporting 0.10% by weight of Pt; a powdery Pt supporting ceria composite oxide (Production Example B1-7) supporting 0.33% by weight of Pt; a powdery Pt supporting ceria composite oxide (Production Example B1-8) supporting 0.67% by weight of Pt; a powdery Pt supporting ceria composite oxide (Production Example B1-9) supporting 1.38% by weight of Pt; or a powdery Pt supporting ceria composite oxide (Production Example B1-10) supporting 1.50% by weight of Pt.

| Production Example B2 | |
| --- | --- |
| Cerium nitrate | 17.4 g (0.040 mol) |
| Zirconium oxychloride | 16.9 g (0.050 mol) |
| Yttrium nitrate | 3.8 g (0.010 mol) |

The above listed components were dissolved in 100 mL of deionized water to obtain an aqueous mixed salt solution. Separately, 25.0 g of sodium carbonate was dissolved in 200 mL of deionized water to obtain an alkaline aqueous solution, and the aqueous mixed salt solution was gradually added dropwise thereto to form a coprecipitate. After being fully washed with water and filtrated, the coprecipitate was fully dried at 80° C. in vacuum. The coprecipitate was then heat treated (calcined) at 800° C. for one hour to obtain a powdery ceria composite oxide (Production Example B2) comprising a $Ce_{0.40}Zr_{0.50}Y_{0.10}$ oxide.

The powdery ceria composite oxide was impregnated with a dinitrodiammine platinum nitrate solution, dried at 100° C. and baked at 500° C. to obtain a powdery Pt supporting ceria composite oxide (Production Example B2-1) supporting 0.20% by weight of Pt.

| Production Example B3 | |
| --- | --- |
| Cerium nitrate | 26.1 g (0.060 mol) |
| Zirconium oxychloride | 20.2 g (0.030 mol) |
| Yttrium nitrate | 3.8 g (0.010 mol) |

The above listed components were dissolved in 100 mL of pure water, followed by homogeneous mixing to obtain an aqueous mixed salt solution. Separately, 50.4 g (0.24 mol) of citric acid was dissolved in pure water, and the solution was added to the aqueous mixed salt solution to obtain an aqueous solution of citric acid and salts.

The aqueous solution of citric acid and salts was evaporated to dryness in a hot water bath at 60° C. to 80° C. with evacuation using a rotary evaporator. After passage of about three hours and when the solution came into a starch-syrup-like state, the temperature of the hot water bath was gradually raised, followed by drying at 250° C. in vacuum for one hour to obtain a citrate complex.

The above-prepared citrate complex was baked at 300° C. in the air for three hours, pulverized in a mortar and baked again at 700° C. in the air for three hours to obtain a powdery ceria composite oxide (Production Example B3) comprising a $Ce_{0.60}Zr_{0.30}Y_{0.10}$ oxide.

The powdery ceria composite oxide was impregnated with a dinitrodiammine platinum nitrate solution, dried at 100° C. and baked at 500° C. to obtain a powdery Pt supporting ceria composite oxide (Production Example B3-1) supporting 1.33% by weight of Pt; a powdery Pt supporting ceria composite oxide (Production Example B3-2) supporting 0.33% by weight of Pt; a powdery Pt supporting ceria composite oxide (Production Example B3-3) supporting 0.10% by weight of Pt; or a powdery Pt supporting ceria composite oxide (Production Example B3-4) supporting 0.67% by weight of Pt.

| Production Example B4 | |
| --- | --- |
| Cerium methoxypropylate | 32.6 g (0.080 mol) |
| Zirconium methoxypropylate | 9.0 g (0.020 mol) |

The above listed components were dissolved in 200 mL of toluene with stirring to obtain a mixed alkoxide solution. The alkoxides were hydrolyzed by adding 80 mL of deionized water dropwise to the solution. The toluene and deionized water were distilled off from the hydrolyzed solution to dryness to obtain a pre-crystallization composition. After being subjected to forced air drying at 60° C. for twenty four hours, the dried product was baked in an electric furnace at 300° C. for three hours to obtain a powdery ceria composite oxide (Production Example B4) comprising $Ce_{0.80}Zr_{0.20}O_2$.

The powdery ceria composite oxide was impregnated with a palladium nitrate solution, dried at 100° C. and baked at 300° C. to obtain a powdery Pd supporting ceria composite oxide (Production Example B4-1) supporting 3.30% by weight of Pd.

| Production Example B5 | |
| --- | --- |
| Cerium methoxypropylate | 12.2 g (0.030 mol) |
| Zirconium methoxypropylate | 31.5 g (0.070 mol) |

The above listed components were dissolved in 200 mL of toluene with stirring to obtain a mixed alkoxide solution. The alkoxides were hydrolyzed by adding 80 mL of deionized water dropwise to the solution. The toluene and deionized water were distilled off from the hydrolyzed solution to dryness to obtain a pre-crystallization composition. After being subjected to forced air drying at 60° C. for twenty four hours, the dried product was baked in an electric furnace at 300° C. for three hours to obtain a powdery ceria composite oxide (Production Example B5) comprising $Ce_{0.30}Zr_{0.70}O_2$.

The powdery ceria composite oxide was impregnated with a dinitrodiammine platinum nitrate solution, dried at 100° C., impregnated with a rhodium nitrate solution, dried at 100° C. and baked at 500° C. to obtain a powdery Pt—Rh supporting ceria composite oxide (Production Example B5-1) supporting 2.00% by weight of Pt and 1.70% by weight of Rh; or a powdery Pt—Rh supporting ceria composite oxide (Production Example B5-2) supporting 2.00% by weight of Pt and 1.00% by weight of Rh.

(3) Production of Theta-Alumina

| Production Example C2 | |
| --- | --- |
| Aluminum methoxyethylate | 60.6 g (0.240 mol) |
| Lanthanum methoxyethylate | 0.55 g (0.0015 mol) |

The above listed components were charged in a 500 mL round bottomed flask and dissolved in 300 mL of toluene with stirring to obtain a homogeneous AlLa mixed alkoxide solution. Next, 200 mL of deionized water was added dropwise to the mixture over about fifteen minutes. Then, a gray viscous precipitate was formed upon hydrolysis.

After stirring at room temperature for two hours, the toluene and water were distilled off under reduced pressure to obtain a pre-crystallization composition of AlLa composite oxides. Next, the pre-crystallization composition was placed on a petri dish, subjected to forced air drying at 60° C. for twenty four hours and heat treated in an electric furnace at 1000° C. in the air for four hours to obtain a powdery lanthanum containing theta-alumina (Production Example C2) containing 2.0% by weight of lanthanum in terms of $La_2O_3$.

| Production Example C3 | |
| --- | --- |
| Aluminum methoxyethylate | 59.4 g (0.236 mol) |
| Lanthanum methoxyethylate | 1.1 g (0.003 mol) |

The above listed components were charged in a 500 mL round bottomed flask and dissolved in 300 mL of toluene with stirring to obtain a homogeneous AlLa mixed alkoxide solution. Next, 200 mL of deionized water was added dropwise to the mixture over about fifteen minutes. Then, a gray viscous precipitate was formed upon hydrolysis.

After stirring at room temperature for two hours, the toluene and water were distilled off under reduced pressure to obtain a pre-crystallization composition of AlLa composite oxides. Next, the pre-crystallization composition was placed on a petri dish, subjected to forced air drying at 60° C. for twenty four hours and heat treated in an electric furnace at 1000° C. in the air for four hours to obtain a powdery lanthanum containing theta-alumina (Production Example C3) containing 4.0% by weight of lanthanum in terms of $La_2O_3$.

The powdery lanthanum containing theta-alumina was impregnated with a dinitrodiammine platinum nitrate solution, dried at 100° C., impregnated with a rhodium nitrate solution, dried at 100° C. and baked at 500° C. to obtain a powdery Pt—Rh supporting theta-alumina (Production Example C3-1) supporting 1.00% by weight of Pt and 0.17% by weight of Rh.

| Production Example C4 | |
|---|---|
| Aluminum methoxyethylate | 44.6 g (0.177 mol) |
| Lanthanum methoxyethylate | 2.2 g (0.006 mol) |

The above listed components were charged in a 500 mL round bottomed flask and dissolved in 300 mL of toluene with stirring to obtain a homogeneous AlLa mixed alkoxide solution. Next, 200 mL of deionized water was added dropwise to the mixture over about fifteen minutes. Then, a gray viscous precipitate was formed upon hydrolysis.

After stirring at room temperature for two hours, the toluene and water were distilled off under reduced pressure to obtain a pre-crystallization composition of AlLa composite oxides. Next, the pre-crystallization composition was placed on a petri dish, subjected to forced air drying at 60° C. for twenty four hours and heat treated in an electric furnace at 1000° C. in the air for four hours to obtain a powdery lanthanum containing theta-alumina (Production Example C4) containing 10.0% by weight of lanthanum in terms of $La_2O_3$.

| Production Example C5 | |
|---|---|
| Aluminum methoxyethylate | 59.4 g (0.236 mol) |
| Barium methoxyethylate | 0.95 g (0.0033 mol) |

The above listed components were charged in a 500 mL round bottomed flask and dissolved in 300 mL of toluene with stirring to obtain a homogeneous AlBa mixed alkoxide solution. Next, 200 mL of deionized water was added dropwise to the mixture over about fifteen minutes. Then, a gray viscous precipitate was formed upon hydrolysis.

After stirring at room temperature for two hours, the toluene and water were distilled off under reduced pressure to obtain a pre-crystallization composition of AlBa composite oxides. Next, the pre-crystallization composition was placed on a petri dish, subjected to forced air drying at 60° C. for twenty four hours and heat treated in an electric furnace at 1000° C. in the air for four hours to obtain a powdery barium containing theta-alumina (Production Example C5) containing 4.0% by weight of barium in terms of BaO.

Production Example C6

A powdery theta-alumina (having a specific surface area of 98.4 m²/g, the same is true hereinafter) was impregnated with dinitrodiammine platinum nitrate solution, dried at 100° C. and baked at 500° C. to obtain a Pt supporting theta-alumina (Production Example C6) supporting 0.31% by weight of Pt.

Production Example C7

The powdery theta-alumina was impregnated with a rhodium nitrate solution, dried at 100° C. and baked at 500° C. to obtain a powdery Rh supporting theta-alumina (Production Example C7) supporting 0.188% by weight of Rh.

Production Example C8

The powdery theta-alumina was impregnated with a dinitrodiammine platinum nitrate solution, dried at 100° C., impregnated with a rhodium nitrate solution, dried at 100° C. and baked at 500° C. to obtain a powdery Pt—Rh supporting theta-alumina (Production Example C8-1) supporting 0.40% by weight of Pt and 0.10% by weight of Rh; a powdery Pt—Rh supporting theta-alumina (Production Example C8-2) supporting 0.50% by weight of Pt and 0.10% by weight of Rh; a powdery Pt—Rh supporting theta-alumina (Production Example C8-3) supporting 0.50% by weight of Pt and 0.17% by weight of Rh; a powdery Pt—Rh supporting theta-alumina (Production Example C8-4) supporting 0.57% by weight of Pt and 0.14% by weight of Rh; a powdery Pt—Rh supporting theta-alumina (Production Example C8-5) supporting 0.43% by weight of Pt and 0.21% by weight of Rh; a powdery Pt—Rh supporting theta-alumina (Production Example C8-6) supporting 0.33% by weight of Pt and 1.33% by weight of Rh; or a powdery Pt—Rh supporting theta-alumina (Production Example C8-7) supporting 1.50% by weight of Pt and 0.67% by weight of Rh.

Production Example C9

The powdery theta-alumina was impregnated with a palladium nitrate solution, dried at 100° C. and baked at 500° C. to obtain a powdery Pd supporting theta-alumina (Production Example C9-1) supporting 0.40% by weight of Pd; or a powdery Pd supporting theta-alumina (Production Example C9-2) supporting 1.10% by weight of Pd.

(4) Production of Gamma-Alumina

| Production Example C10 | |
|---|---|
| Aluminum methoxyethylate | 59.4 g (0.236 mol) |
| Lanthanum methoxyethylate | 1.1 g (0.003 mol) |

The above listed components were charged in a 500 mL round bottomed flask and dissolved in 300 mL of toluene with stirring to obtain a homogeneous AlLa mixed alkoxide solution. Next, 200 mL of deionized water was added dropwise to the mixture over about fifteen minutes. Then, a gray viscous precipitate was formed upon hydrolysis.

After stirring at room temperature for two hours, the toluene and water were distilled off under reduced pressure to obtain a pre-crystallization composition of AlLa composite oxides. Next, the pre-crystallization composition was placed on a petri dish, subjected to forced air drying at 60° C. for twenty four hours and heat treated in an electric furnace at 850° C. in the air for two hours to obtain a powdery lanthanum containing gamma-alumina (Production Example C10) containing 4.0% by weight of lanthanum in terms of $La_2O_3$.

The powdery lanthanum containing gamma-alumina was impregnated with a dinitrodiammine platinum nitrate solution, dried at 100° C., impregnated with a rhodium nitrate solution, dried at 100° C. and baked at 500° C. to obtain a powdery Pt—Rh supporting lanthanum containing gamma-alumina (Production Example C10-1) supporting 0.33% by weight of Pt and 0.25% by weight of Rh; or a powdery Pt—Rh supporting lanthanum containing gamma-alumina (Production Example C10-2) supporting 2.00% by weight of Pt and 0.20% by weight of Rh.

Production Example C11

A powdery gamma-alumina (having a specific surface area of 200 m²/g, the same is true hereinafter) was impregnated with a palladium nitrate solution, dried at 100° C. and baked at 500° C. to obtain a powdery Pd supporting gamma-alumina (Production Example C11-1) supporting 1.60% by weight of Pd; a powdery Pd supporting gamma-alumina (Production Example C11-2) supporting 1.63% by weight of Pd; or a powdery Pd supporting gamma-alumina (Production Example C11-3) supporting 0.44% by weight of Pd.

Production Example C12

A powdery gamma-alumina was impregnated with a rhodium nitrate solution, dried at 100° C. and baked at 500° C. to obtain a powdery Rh supporting gamma-alumina (Production Example C12) supporting 1.58% by weight of Rh.

Production Example C13

A powdery gamma-alumina was impregnated with a dinitrodiammine platinum nitrate solution, dried at 100° C., impregnated with a rhodium nitrate solution, dried at 100° C. and baked at 500° C. to obtain a powdery Pt—Rh supporting gamma-alumina (Production Example C13-1) supporting 1.00% by weight of Pt and 0.57% by weight of Rh; a powdery Pt—Rh supporting gamma-alumina (Production Example C13-2) supporting 2.00% by weight of Pt and 0.20% by weight of Rh; or a powdery Pt—Rh supporting gamma-alumina (Production Example C13-3) supporting 0.67% by weight of Pt and 0.42% by weight of Rh.

(5) Production of $SrZrO_3$

| Production Example D1 | |
| --- | --- |
| Zirconium oxychloride | 33.7 g (0.100 mol) |
| Strontium nitrate | 28.4 g (0.100 mol) |

The above listed components were dissolved in 100 mL of deionized water to obtain an aqueous mixed salt solution. Separately, 25.0 g of sodium carbonate was dissolved in 200 mL of deionized water to obtain an alkaline aqueous solution, and the aqueous mixed salt solution was gradually added dropwise thereto to form a coprecipitate. After being fully washed with water and filtrated, the coprecipitate was fully dried at 80° C. in vacuum. The coprecipitate was then baked at 1200° C. for three hours and dry-pulverized in an attrition mill for forty eight hours to obtain a powdery $SrZrO_3$ (Production Example D1).

(6) Production of $LaAlO_3$

| Production Example E1 | |
| --- | --- |
| Lanthanum nitrate | 43.3 g (0.100 mol) |
| Aluminum nitrate | 37.5 g (0.100 mol) |

The above listed components were dissolved in 100 mL of deionized water to obtain an aqueous mixed salt solution. Separately, 25.0 g of sodium carbonate was dissolved in 200 mL of deionized water to obtain an alkaline aqueous solution, and the aqueous mixed salt solution was gradually added dropwise thereto to form a coprecipitate. After being fully washed with water and filtrated, the coprecipitate was fully dried at 80° C. in vacuum. The coprecipitate was then calcined at 800° C. for one hour to obtain a powdery $LaAlO_3$ (Production Example E1).

Example PA-1

1) Production of Palladium Containing Perovskite-Type Composite Oxide

| | |
| --- | --- |
| Lanthanum ethoxyethylate | 40.6 g (0.100 mol) |
| Iron ethoxyethylate | 18.4 g (0.057 mol) |
| Manganese ethoxyethylate | 8.9 g (0.038 mol) |

The above listed components were charged in a 500 mL round bottomed flask and dissolved in 200 mL of toluene with stirring to obtain a mixed alkoxide solution. Separately, 1.52 g (0.005 mol) of palladium acetylacetonate was dissolved in 100 mL of toluene, and the resulting solution was added to the mixed alkoxide solution in the round bottomed flask to obtain a LaFeMnPd containing homogeneous mixed solution.

Next, 200 mL of deionized water was added dropwise in the round bottomed flask. As a result, a brown viscous precipitate was formed upon hydrolysis.

After stirring at room temperature for two hours, the toluene and water were distilled off under reduced pressure to obtain a pre-crystallization composition of a LaFeMnPd composite oxide. Next, the pre-crystallization composition was placed on a petri dish, subjected to forced air drying at 60° C. for twenty four hours and heat treated in an electric furnace at 650° C. in the air for two hours to obtain a powdery perovskite-type composite oxide comprising $La_{1.00}Fe_{0.57}Mn_{0.38}Pd_{0.05}O_3$.

2) Mixing of Perovskite-Type Composite Oxide with Thermostable Oxide and Production of Exhaust Gas Purifying Catalyst To the above prepared powdery perovskite-type composite oxide was added the powdery theta-alumina. The mixture was mixed with deionized water and further mixed with alumina sol to obtain a slurry. The slurry was injected into a honeycomb cordierite carrier having a size of 6 mil per 400 cells, a diameter of 80 mm and a length of 95 mm so as to homogeneously apply 150 g of the perovskite-type composite oxide and 50 g of theta-alumina per one liter of the honeycomb carrier. The resulting article dried at 100° C. and baked at 500° C. to obtain an exhaust gas purifying catalyst. The resulting exhaust gas purifying catalyst contained 3.26 g of Pd per one liter of the honeycomb carrier.

Example PA-2

1) Supporting of Palladium Containing Perovskite-Type Composite Oxide by Thermostable Oxide

| | |
|---|---|
| Lanthanum ethoxyethylate | 40.6 g (0.100 mol) |
| Iron ethoxyethylate | 30.7 g (0.095 mol) |

The above listed components were charged in a 500 mL round bottomed flask and dissolved in 200 mL of toluene with stirring to obtain a mixed alkoxide solution. Separately, 1.52 g (0.005 mol) of palladium acetylacetonate was dissolved in 100 mL of toluene, and the resulting solution was added to the mixed alkoxide solution in the round bottomed flask to obtain a LaFePd containing homogeneous mixed solution.

Separately, the powdery theta-alumina was dispersed in 200 mL of toluene and the homogeneous mixed solution in the round bottomed flask was added, followed by stirring.

Next, 200 mL of deionized water was added dropwise to the solution over about fifteen minutes. Then, a brown viscous precipitate was formed upon hydrolysis.

After stirring at room temperature for two hours, the toluene and water were distilled off under reduced pressure to obtain theta-alumina containing a pre-crystallization composition of a LaFePd composite oxide dispersed therein. Next, the theta-alumina containing the pre-crystallization composition dispersed therein was placed on a petri dish, subjected to forced air drying at 60° C. for twenty four hours and heat treated in an electric furnace at 650° C. in the air for one hour to obtain a powdery theta-alumina supporting a $La_{1.00}Fe_{0.95}Pd_{0.05}O_3$ perovskite-type composite oxide.

The resulting powder was prepared so as to have a weight ratio of the perovskite-type composite oxide to alumina of 3:1.

2) Production of Exhaust Gas Purifying Catalyst

The resulting mixture was mixed with deionized water and then mixed with alumina sol to form a slurry. The slurry was injected into a honeycomb cordierite carrier having a size of 6 mil per 400 cells, a diameter of 80 mm and a length of 95 mm so as to homogeneously apply 200 g of the theta-alumina supporting the perovskite-type composite oxide per one liter of the honeycomb carrier. The resulting article was dried at 100° C. and baked at 500° C. to obtain an exhaust gas purifying catalyst. The resulting exhaust gas purifying catalyst contained 3.26 g of Pd per one liter of the honeycomb carrier.

Example PA-3

1) Production of Rhodium Containing Perovskite-Type Composite Oxide

| | |
|---|---|
| Lanthanum ethoxyethylate | 40.6 g (0.100 mol) |
| Iron ethoxyethylate | 18.4 g (0.057 mol) |
| Manganese ethoxyethylate | 8.9 g (0.038 mol) |

The above listed components were charged in a 500 mL round bottomed flask and dissolved in 200 mL of toluene with stirring to obtain a mixed alkoxide solution. Separately, 2.00 g (0.005 mol) of rhodium acetylacetonate was dissolved in 100 mL of toluene, and the resulting solution was added to the mixed alkoxide solution in the round bottomed flask to obtain a LaFeMnRh containing homogeneous mixed solution.

Next, 200 mL of deionized water was added dropwise to the solution over about fifteen minutes. Then, a brown viscous precipitate was formed upon hydrolysis.

After stirring at room temperature for two hours, the toluene and water were distilled off under reduced pressure to obtain a pre-crystallization composition of a LaFeMnRh composite oxide. Next, the pre-crystallization composition was placed on a petri dish, subjected to forced air drying at 60° C. for twenty four hours and heat treated in an electric furnace at 650° C. in the air for two hours to obtain a powdery perovskite-type composite oxide comprising $La_{1.00}Fe_{0.57}Mn_{0.38}Rh_{0.05}O_3$.

2) Mixing of Perovskite-Type Composite Oxide with Thermostable Oxide and Production of Exhaust Gas Purifying Catalyst To the above prepared powdery perovskite-type composite oxide was added the powdery theta-alumina. The mixture was mixed with deionized water and further mixed with alumina sol to obtain a slurry. The slurry was injected into a honeycomb cordierite carrier having a size of 6 mil per 400 cells, a diameter of 80 mm and a length of 95 mm so as to homogeneously apply 150 g of the perovskite-type composite oxide and 50 g of the theta-alumina per one liter of the honeycomb carrier. The resulting article was dried at 100° C. and baked at 500° C. to obtain an exhaust gas purifying catalyst. The resulting exhaust gas purifying catalyst contained 3.15 g of Rh per one liter of the honeycomb carrier.

Example PA-4

1) Supporting of Rhodium Containing Perovskite-Type Composite Oxide by Thermostable Oxide

| | |
|---|---|
| Lanthanum ethoxyethylate | 32.5 g (0.080 mol) |
| Praseodymium ethoxyethylate | 8.2 g (0.020 mol) |
| Iron ethoxyethylate | 24.2 g (0.075 mol) |
| Titanium ethoxyethylate | 8.1 g (0.020 mol) |

The above listed components were charged in a 500 mL round bottomed flask and dissolved in 200 mL of toluene with stirring to obtain a mixed alkoxide solution. Separately, 2.00 g (0.005 mol) of rhodium acetylacetonate was dissolved in 100 mL of toluene, and the resulting solution was added to the mixed alkoxide solution in the round bottomed flask to obtain a LaPrFeTiRh containing homogeneous mixed solution.

The powdery theta-alumina was dispersed in 200 mL of toluene and the above prepared homogeneous mixed solution was added, followed by stirring.

Next, 200 mL of deionized water was added dropwise to the solution over about fifteen minutes. Then, a brown viscous precipitate was formed upon hydrolysis.

After stirring at room temperature for two hours, the toluene and water were distilled off under reduced pressure to obtain theta-alumina containing a dispersed pre-crystallization composition of a LaPrFeTiRh composite oxide. Next, the theta-alumina with the dispersed pre-crystallization composition was placed on a petri dish, subjected to forced air drying at 60° C. for twenty four hours and heat treated in an electric furnace at 650° C. in the air for one hour to obtain a powdery theta-alumina supporting a $La_{0.80}Pr_{0.20}Fe_{0.75}Ti_{0.20}Rh_{0.05}O_3$ perovskite-type composite oxide.

The resulting powder was prepared so as to have a weight ratio of the perovskite-type composite oxide to theta-alumina of 3:1.

2) Production of Exhaust Gas Purifying Catalyst

The resulting powder was mixed with deionized water and further mixed with alumina sol to obtain a slurry. The slurry was injected into a honeycomb cordierite carrier having a size of 6 mil per 400 cells, a diameter of 80 mm and a length of 95 mm so as to homogeneously apply 200 g of the theta-alumina supporting the perovskite-type composite oxide per one liter of the honeycomb carrier. The resulting article was dried at 100° C. and baked at 500° C. to obtain an exhaust gas purifying catalyst. The resulting exhaust gas purifying catalyst contained 3.16 g of Rh per one liter of the honeycomb carrier.

Example PA-5

1) Production of Rhodium Containing Perovskite-Type Composite Oxide

| | |
|---|---|
| Lanthanum nitrate | 43.3 g (0.100 mol) |
| Iron nitrate | 38.4 g (0.095 mol) |
| Aqueous rhodium nitrate solution having a Rh content of 4.478% by mass | 11.5 g (corresponding to 0.51 g (0.005 mol) of Rh) |

The above listed components were dissolved in 100 mL of pure water, followed by homogeneous mixing to obtain an aqueous mixed salt solution. Separately, 50.4 g (0.24 mol) of citric acid was dissolved in pure water, and the solution was added to the aqueous mixed salt solution to obtain an aqueous solution of citric acid and salts.

The aqueous solution of citric acid and salts was evaporated to dryness in a hot water bath at 60° C. to 80° C. with evacuation using a rotary evaporator. After passage of about three hours and when the solution came into a starch-syrup-like state, the temperature of the hot water bath was gradually raised, followed by drying at 250° C. in vacuum for one hour to obtain a citrate complex.

The above-prepared citrate complex was baked at 300° C. in the air for three hours, pulverized in a mortar and baked again at 700° C. in the air for three hours to obtain a powdery perovskite-type composite oxide comprising $La_{1.00}Fe_{0.95}Rh_{0.05}O_3$.

The powdery perovskite-type composite oxide was impregnated with a dinitrodiammine platinum nitrate solution, dried at 100° C. and baked at 500° C. to obtain a Pt supporting perovskite-type composite oxide. The amount of Pt supported by the Pt supporting perovskite-type composite oxide was 1.00% by mass.

2) Mixing of Perovskite-Type Composite Oxide with Thermostable Oxide and Production of Exhaust Gas Purifying Catalyst To the above prepared powdery perovskite-type composite oxide was added the powdery theta-alumina. The mixture was mixed with deionized water and further mixed with alumina sol to obtain a slurry. The slurry was injected into a honeycomb cordierite carrier having a size of 6 mil per 400 cells, a diameter of 80 mm and a length of 95 mm so as to homogeneously apply 150 g of the perovskite-type composite oxide and 50 g of theta-alumina per one liter of the honeycomb carrier. The resulting article dried at 100° C. and baked at 500° C. to obtain an exhaust gas purifying catalyst. The exhaust gas purifying catalyst contained 3.15 g of Rh and 1.50 g of Pt per one liter of the honeycomb carrier.

Example PA-6

1) Production of Platinum Containing Perovskite-Type Composite Oxide

| | |
|---|---|
| Lanthanum nitrate | 39.0 g (0.090 mol) |
| Strontium nitrate | 2.8 g (0.010 mol) |
| Iron nitrate | 23.0 g (0.057 mol) |
| Manganese nitrate | 10.9 g (0.038 mol) |
| Dinitrodiammine platinum nitrate solution having a Pt content of 8.50% by mass | 11.48 g (corresponding to 0.975 g (0.005 mol) of Pt) |

The above listed components were dissolved in 100 mL of pure water, followed by homogeneous mixing to obtain an aqueous mixed salt solution. Separately, 50.4 g (0.24 mol) of citric acid was dissolved in pure water, and the solution was added to the aqueous mixed salt solution to obtain an aqueous solution of citric acid and salts.

The aqueous solution of citric acid and salts was evaporated to dryness in a hot water bath at 60° C. to 80° C. with evacuation using a rotary evaporator. After passage of about three hours and when the solution came into a starch-syrup-like state, the temperature of the hot water bath was gradually raised, followed by drying at 250° C. in vacuum for one hour to obtain a citrate complex.

The above-prepared citrate complex was baked at 300° C. in the air for three hours, pulverized in a mortar and baked again at 700° C. in the air for three hours to obtain a powdery perovskite-type composite oxide comprising $La_{0.90}Sr_{0.10}Fe_{0.57}Mn_{0.38}Pt_{0.05}O_3$.

2) Mixing of Perovskite-Type Composite Oxide with Thermostable Oxide and Production of exhaust gas purifying Catalyst To the above prepared powdery perovskite-type composite oxide was added the powdery theta-alumina. The mixture was mixed with deionized water and further mixed with alumina sol to obtain a slurry. The slurry was injected into a honeycomb cordierite carrier having a size of 6 mil per 400 cells, a diameter of 80 mm and a length of 95 mm so as to homogeneously apply 60 g of the perovskite-type composite oxide and 50 g of theta-alumina per one liter of the honeycomb carrier. The resulting article dried at 100° C. and baked at 500° C. to obtain an exhaust gas purifying catalyst. The resulting exhaust gas purifying catalyst contained 2.39 g of Pt per one liter of the honeycomb carrier.

Example PA-7

1) Supporting of Platinum Containing Perovskite-Type Composite Oxide by Thermostable Oxide

| | |
|---|---|
| Lanthanum methoxyethylate | 34.6 g (0.095 mol) |
| Aluminum methoxyethylate | 21.4 g (0.085 mol) |
| Manganese methoxyethylate | 2.0 g (0.010 mol) |

The above listed components were charged in a 500 mL round bottomed flask and dissolved in 200 mL of toluene with stirring to obtain a mixed alkoxide solution. Separately, 1.04 g (0.005 mol) of silver acetylacetonate and 1.965 g (0.005 mol) of platinum acetylacetonate were dissolved in 200 mL of toluene, and the resulting solution was added to the mixed alkoxide solution in the round bottomed flask to obtain a LaAgAlMnPt containing homogeneous mixed solution.

Separately, the powdery theta-alumina was dispersed in 200 mL of toluene and the above prepared homogeneous mixed solution was added, followed by stirring.

Next, 200 mL of deionized water was added dropwise to the solution over about fifteen minutes. Then, a brown viscous precipitate was formed upon hydrolysis.

After stirring at room temperature for two hours, the toluene and water were distilled off under reduced pressure to obtain theta-alumina containing a dispersed pre-crystallization composition of a LaAgAlMnPt composite oxide. Next, the theta-alumina with the dispersed pre-crystallization composition was placed on a petri dish, subjected to forced air drying at 60° C. for twenty four hours and heat treated in an electric furnace at 650° C. in the air for one hour to obtain a powdery theta-alumina supporting a $La_{0.95}Ag_{0.05}Al_{0.85}Mn_{0.10}Pt_{0.05}O_3$ perovskite-type composite oxide.

The resulting powder was prepared so as to have a weight ratio of the perovskite-type composite oxide to theta-alumina of 54:50.

2) Production of Exhaust Gas Purifying Catalyst

The resulting powder was mixed with deionized water and further mixed with alumina sol to obtain a slurry. The slurry was injected into a honeycomb cordierite carrier having a size of 6 mil per 400 cells, a diameter of 80 mm and a length of 95 mm so as to homogeneously apply 104 g of the theta-alumina supporting the perovskite-type composite oxide per one liter of the honeycomb carrier. The resulting article was dried at 100° C. and baked at 500° C. to obtain an exhaust gas purifying catalyst. The resulting exhaust gas purifying catalyst contained 2.41 g of Pt per one liter of the honeycomb carrier.

Example PA-8

1) Production of Platinum Containing Perovskite-Type Composite Oxide

| Neodymium methoxypropylate | 32.9 g (0.080 mol) |
| Barium methoxypropylate | 3.2 g (0.001 mol) |
| Magnesium methoxypropylate | 2.0 g (0.010 mol) |
| Aluminum methoxypropylate | 25.0 g (0.085 mol) |

The above listed components were charged in a 500 mL round bottomed flask and dissolved in 200 mL of toluene with stirring to obtain a mixed alkoxide solution. Separately, 3.93 g (0.010 mol) of platinum acetylacetonate and 2.00 g (0.005 mol) of rhodium acetylacetonate were dissolved in 200 mL of toluene, and the resulting solution was added to the mixed alkoxide solution in the round bottomed flask to obtain a NdBaMgAlPtRh containing homogeneous mixed solution.

Next, 200 mL of deionized water was added dropwise to the solution in the round bottomed flask over about fifteen minutes. Then, a brown viscous precipitate was formed upon hydrolysis.

After stirring at room temperature for two hours, the toluene and water were distilled off under reduced pressure to obtain a pre-crystallization composition of a NdBaMgAlPtRh composite oxide. Next, the pre-crystallization composition was placed on a petri dish, subjected to forced air drying at 60° C. for twenty four hours and heat treated in an electric furnace at 650° C. in the air for two hours to obtain a powdery perovskite-type composite oxide comprising $Nd_{0.80}Ba_{0.10}Mg_{0.10}Al_{0.85}Pt_{0.10}Rh_{0.05}O_3$.

2) Mixing of Perovskite-Type Composite Oxide with Thermostable Oxide and Production of Exhaust Gas Purifying Catalyst To the above prepared powdery perovskite-type composite oxide was added the powdery theta-alumina. The mixture was mixed with deionized water and further mixed with alumina sol to obtain a slurry. The slurry was injected into a honeycomb cordierite carrier having a size of 6 mil per 400 cells, a diameter of 80 mm and a length of 95 mm so as to homogeneously apply 28 g of the perovskite-type composite oxide and 50 g of the theta-alumina per one liter of the honeycomb carrier. The resulting article was dried at 100° C. and baked at 500° C. to obtain an exhaust gas purifying catalyst. The resulting exhaust gas purifying catalyst contained 2.41 g of Pt and 0.66 g of Rh per one liter of the honeycomb carrier.

Example PA-9

1) Production of Platinum Containing Perovskite-Type Composite Oxide

| Lanthanum nitrate | 39.0 g (0.090 mol) |
| Srontium nitrate | 2.8 g (0.010 mol) |
| Iron nitrate | 23.0 g (0.057 mol) |
| Manganese nitrate | 10.9 g (0.038 mol) |
| Dinitrodiammine platinum nitrate solution having a Pt content of 8.50% by mass | 11.48 g (corresponding to 0.975 g (0.005 mol) of Pt) |

The above listed components were dissolved in 100 mL of pure water, followed by homogeneous mixing to obtain an aqueous mixed salt solution. Separately, 50.4 g (0.24 mol) of citric acid was dissolved in pure water, and the solution was added to the aqueous mixed salt solution to obtain an aqueous solution of citric acid and salts.

The aqueous solution of citric acid and salts was evaporated to dryness in a hot water bath at 60° C. to 80° C. with evacuation using a rotary evaporator. After passage of about three hours and when the solution came into a starch-syrup-like state, the temperature of the hot water bath was gradually raised, followed by drying at 250° C. in vacuum for one hour to obtain a citrate complex.

The above-prepared citrate complex was baked at 300° C. in the air for three hours, pulverized in a mortar and baked again at 700° C. in the air for three hours to obtain a powdery perovskite-type composite oxide comprising $La_{0.90}Sr_{0.10}Fe_{0.57}Mn_{0.38}Pt_{0.05}O_3$.

2) Production of Rhodium Containing Perovskite-Type Composite Oxide

| Lanthanum ethoxyethylate | 40.6 g (0.100 mol) |
| Iron ethoxyethylate | 18.4 g (0.057 mol) |
| Manganese ethoxyethylate | 8.9 g (0.038 mol) |

The above listed components were charged in a 500 mL round bottomed flask and dissolved in 200 mL of toluene with stirring to obtain a mixed alkoxide solution. Separately, 2.00 g (0.005 mol) of rhodium acetylacetonate was dissolved in 100 mL of toluene, and the resulting solution was added to the mixed alkoxide solution in the round bottomed flask to obtain a LaFeMnRh containing homogeneous mixed solution.

Next, 200 mL of deionized water was added dropwise to the solution over about fifteen minutes. Then, a brown viscous precipitate was formed upon hydrolysis.

After stirring at room temperature for two hours, the toluene and water were distilled off under reduced pressure to obtain a pre-crystallization composition of a LaFeMnRh composite oxide. Next, the pre-crystallization composition was placed on a petri dish, subjected to forced air drying at 60° C. for twenty four hours and heat treated in an electric furnace at 650° C. in the air for two hours to obtain a powdery perovskite-type composite oxide comprising $La_{1.00}Fe_{0.57}Mn_{0.38}Rh_{0.05}O_3$.

3) Mixing of Perovskite-Type Composite Oxide with Thermostable Oxide and Production of Exhaust Gas Purifying Catalyst To each of the above prepared powdery perovskite-type composite oxides was added the powdery lanthanum containing theta-alumina (Production Example C3) containing 4.0% by weight of lanthanum. The mixture was mixed with deionized water and further mixed with alumina sol to obtain a slurry. The slurry was injected into a honeycomb cordierite carrier having a size of 6 mil per 400 cells, a diameter of 80 mm and a length of 95 mm so as to homogeneously apply 60 g of the platinum containing perovskite-type composite oxide, 90 g of the rhodium containing perovskite-type composite oxide, and 100 g of the lanthanum containing theta-alumina per one liter of the honeycomb carrier. The resulting article dried at 100° C. and baked at 500° C. to obtain an exhaust gas purifying catalyst. The resulting exhaust gas purifying catalyst contained 2.39 g of Pt and 0.19 g of Rh per one liter of the honeycomb carrier.

Example PA-10

1) Production of Palladium Containing Perovskite-Type Composite Oxide

| Lanthanum ethoxyethylate | 40.6 g (0.100 mol) |
|---|---|
| Iron ethoxyethylate | 30.7 g (0.095 mol) |

The above listed components were charged in a 500 mL round bottomed flask and dissolved in 200 mL of toluene with stirring to obtain a mixed alkoxide solution. Separately, 1.52 g (0.005 mol) of palladium acetylacetonate was dissolved in 100 mL of toluene, and the resulting solution was added to the mixed alkoxide solution in the round bottomed flask to obtain a LaFePd containing homogeneous mixed solution.

Next, 200 mL of deionized water was added dropwise to the solution over about fifteen minutes. Then, a brown viscous precipitate was formed upon hydrolysis.

After stirring at room temperature for two hours, the toluene and water were distilled off under reduced pressure to obtain a pre-crystallization composition of a LaFePd composite oxide. Next, the pre-crystallization composition was placed on a petri dish, subjected to forced air drying at 60° C. for twenty four hours and heat treated in an electric furnace at 650° C. in the air for one hour to obtain a powdery perovskite-type composite oxide comprising $La_{1.00}Fe_{0.95}Pd_{0.05}O_3$.

2) Production of Rhodium Containing Perovskite-Type Composite Oxide

| Lanthanum nitrate | 43.3 g (0.100 mol) |
|---|---|
| Iron nitrate | 38.4 g (0.095 mol) |
| Rhodium nitrate solution having a Rh content of 4.478% by mass | 11.5 g (corresponding to 0.51 g (0.005 mol) of Rh) |

The above listed components were dissolved in 100 mL of pure water, followed by homogeneous mixing to obtain an aqueous mixed salt solution. Separately, 50.4 g (0.24 mol) of citric acid was dissolved in pure water, and the solution was added to the aqueous mixed salt solution to obtain an aqueous solution of citric acid and salts.

The aqueous solution of citric acid and salts was evaporated to dryness in a hot water bath at 60° C. to 80° C. with evacuation using a rotary evaporator. After passage of about three hours and when the solution came into a starch-syrup-like state, the temperature of the hot water bath was gradually raised, followed by drying at 250° C. in vacuum for one hour to obtain a citrate complex.

The above-prepared citrate complex was baked at 300° C. in the air for three hours, pulverized in a mortar and baked again at 700° C. in the air for three hours to obtain a powdery perovskite-type composite oxide comprising $La_{1.00}Fe_{0.95}Rh_{0.05}O_3$.

3) Production of Exhaust Gas Purifying Catalyst

To each of the above prepared powdery perovskite-type composite oxides was added the powdery lanthanum containing theta-alumina (Production Example C3) containing 4.0% by weight of lanthanum. The mixture was mixed with deionized water and further mixed with alumina sol to obtain a slurry. The slurry was injected into a honeycomb cordierite carrier having a size of 6 mil per 400 cells, a diameter of 80 mm and a length of 95 mm so as to homogeneously apply 138 g of the palladium containing perovskite-type composite oxide, 9 g of the rhodium containing perovskite-type composite oxide, and 100 g of the lanthanum containing theta-alumina per one liter of the honeycomb carrier. The resulting resulting article dried at 100° C. and baked at 500° C. to obtain an exhaust gas purifying catalyst. The resulting exhaust gas purifying catalyst contained 2.41 g of Pd and 0.19 g of Rh per one liter of the honeycomb carrier.

Example PA-11

1) Production of Palladium Containing Perovskite-Type Composite Oxide

| Lanthanum ethoxyethylate | 40.6 g (0.100 mol) |
|---|---|
| Iron ethoxyethylate | 30.7 g (0.095 mol) |

The above listed components were charged in a 500 mL round bottomed flask and dissolved in 200 mL of toluene with stirring to obtain a mixed alkoxide solution. Separately, 1.52 g (0.005 mol) of palladium acetylacetonate was dissolved in 100 mL of toluene, and the resulting solution was added to the mixed alkoxide solution in the round bottomed flask to obtain a LaFePd containing homogeneous mixed solution.

Next, 200 mL of deionized water was added dropwise to the solution over about fifteen minutes. Then, a brown viscous precipitate was formed upon hydrolysis.

After stirring at room temperature for two hours, the toluene and water were distilled off under reduced pressure to obtain a pre-crystallization composition of a LaFePd composite oxide. Next, the pre-crystallization composition was placed on a petri dish, subjected to forced air drying at 60° C. for twenty four hours and heat treated in an electric furnace at 650° C. in the air for one hour to obtain a powdery perovskite-type composite oxide comprising $La_{1.00}Fe_{0.95}Pd_{0.05}O_3$.

2) Production of Platinum Containing Perovskite-Type Composite Oxide

| Lanthanum methoxyethylate | 34.6 g (0.095 mol) |
|---|---|
| Aluminum methoxyethylate | 21.4 g (0.085 mol) |
| Manganese methoxyethylate | 2.0 g (0.010 mol) |

The above listed components were charged in a 500 mL round bottomed flask and dissolved in 200 mL of toluene with stirring to obtain a mixed alkoxide solution. Separately, 1.04 g (0.005 mol) of silver acetylacetonate and 1.965 g (0.005 mol) of platinum acetylacetonate were dissolved in 200 mL of toluene, and the resulting solution was added to the mixed alkoxide solution in the round bottomed flask to obtain a LaAgAlMnPt containing homogeneous mixed solution.

Next, 200 mL of deionized water was added dropwise to the solution over about fifteen minutes. Then, a brown viscous precipitate was formed upon hydrolysis.

After stirring at room temperature for two hours, the toluene and water were distilled off under reduced pressure to obtain a pre-crystallization composition of a LaAgAlMnPt composite oxide. Next, the pre-crystallization composition was placed on a petri dish, subjected to forced air drying at 60° C. for twenty four hours and heat treated in an electric furnace at 650° C. in the air for one hour to obtain a powdery perovskite-type composite oxide comprising $La_{0.95}Ag_{0.05}Al_{0.85}Mn_{0.10}Pt_{0.05}O_3$.

3) Production of Exhaust Gas Purifying Catalyst

To each of the above prepared powdery perovskite-type composite oxides were added the powdery Rh supporting zirconia composite oxide (Production Example A1-1) comprising a $Zr_{0.79}Ce_{0.16}La_{0.01}Nd_{0.04}$ oxide supporting 0.50% by weight of Rh and the powdery lanthanum containing theta-alumina (Production Example C3) containing 4.0% by weight of lanthanum. The mixture was mixed with deionized water and further mixed with alumina sol to obtain a slurry. The slurry was injected into a honeycomb cordierite carrier having a size of 6 mil per 400 cells, a diameter of 80 mm and a length of 95 mm so as to homogeneously apply 92 g of the palladium containing perovskite-type composite oxide, 11.2 g of the platinum containing perovskite-type composite oxide, 40 g of the Rh supporting zirconia composite oxide and 100 g of the theta-alumina per one liter of the honeycomb carrier. The resulting article dried at 100° C. and baked at 500° C. to obtain an exhaust gas purifying catalyst. The resulting exhaust gas purifying catalyst contained 0.50 g of Pt, 2.00 g of Pd, and 0.20 g of Rh per one liter of the honeycomb carrier.

Example QA-12

1) Production of Palladium Containing Perovskite-Type Composite Oxide

| Lanthanum nitrate | 43.3 g (0.100 mol) |
|---|---|
| Iron nitrate | 36.4 g (0.090 mol) |
| Aqueous palladium nitrate solution having a Pd content of 4.399% by mass | 24.5 g (corresponding to 1.06 g (0.010 mol) of Pd) |

The above listed components were dissolved in 100 mL of pure water, followed by homogeneous mixing to obtain an aqueous mixed salt solution. Separately, 50.4 g (0.24 mol) of citric acid was dissolved in pure water, and the solution was added to the aqueous mixed salt solution to obtain an aqueous solution of citric acid and salts.

The aqueous solution of citric acid and salts was evaporated to dryness in a hot water bath at 60° C. to 80° C. with evacuation using a rotary evaporator. After passage of about three hours and when the solution came into a starch-syrup-like state, the temperature of the hot water bath was gradually raised, followed by drying at 250° C. in vacuum for one hour to obtain a citrate complex.

The above-prepared citrate complex was baked at 300° C. in the air for three hours, pulverized in a mortar and baked again at 700° C. in the air for three hours to obtain a powdery perovskite-type composite oxide comprising $La_{1.00}Fe_{0.90}Pd_{0.10}O_3$.

2) Mixing of Perovskite-Type Composite Oxide with Thermostable Oxide and Production of Exhaust Gas Purifying Catalyst To the above prepared powdery perovskite-type composite oxide was added the powdery theta-alumina, followed by mixing in a mortar to obtain a powdery exhaust gas purifying catalyst comprising the $La_{1.00}Fe_{0.90}Pd_{0.10}O_3$ perovskite-type composite oxide and the theta-alumina.

The resulting powder was prepared so as to have a weight ratio of the perovskite-type composite oxide to the theta-alumina of 1:2.

Example QA-13

Supporting of Palladium Containing Perovskite-Type Composite Oxide by Thermostable Oxide and Production of Exhaust Gas Purifying Catalyst

| Lanthanum nitrate | 43.3 g (0.100 mol) |
|---|---|
| Iron nitrate | 38.4 g (0.095 mol) |
| Aqueous palladium nitrate solution having a Pd content of 4.399% by mass | 12.1 g (corresponding to 0.53 g (0.005 mol) of Pd) |

The above listed components were dissolved in 200 mL of deionized water to obtain an aqueous mixed salt solution. Next, 73.4 g of a powdery theta-alumina was added to the aqueous mixed salt solution, followed by stirring. An aqueous solution of ammonium carbonate was added dropwise thereto up to pH 10. Then the coprecipitate was fully stirred for one hour, filtrated, washed with water, subjected to forced air drying at 120° C. for twelve hours and baked at 700° C. in the air for three hours to obtain a powdery exhaust gas purifying catalyst comprising theta-alumina supporting a $La_{1.00}Fe_{0.95}Pd_{0.05}O_3$ perovskite-type composite oxide.

The resulting powder was prepared so as to have a weight ratio of the perovskite-type composite oxide to the theta-alumina of 1:3.

Example QA-14

Supporting of Palladium Containing Perovskite-Type Composite Oxide by Thermostable Oxide and Production of Exhaust Gas Purifying Catalyst

| | |
|---|---|
| Lanthanum methoxypropylate | 40.6 g (0.100 mol) |
| Iron methoxypropylate | 30.7 g (0.095 mol) |

The above listed components were charged in a 1000 mL round bottomed flask and dissolved in 200 mL of toluene with stirring to obtain a mixed alkoxide solution. Separately, 1.52 g (0.005 mol) of palladium acetylacetonate was dissolved in 20 mL of toluene, and the resulting solution was added to the mixed alkoxide solution in the round bottomed flask to obtain a LaFePd containing homogeneous mixed solution.

To the homogeneous mixed solution was added 98.0 g of the powdery lanthanum containing theta-alumina (Production Example C3) having a lanthanum content of 4.0% by weight, followed by stirring, and 200 mL of deionized water was added dropwise to the solution over about fifteen minutes. Then, a brown viscous precipitate was formed upon hydrolysis.

After stirring at room temperature for two hours, the toluene and water were distilled off under reduced pressure to obtain a mixture of a lanthanum containing theta-alumina with a homogeneously dispersed LaFePd containing perovskite-type composite oxide. Next, the mixture was placed on a petri dish, subjected to forced air drying at 60° C. for twenty four hours and heat treated in an electric furnace at 800° C. in the air for one hour to obtain a powdery exhaust gas purifying catalyst comprising lanthanum containing theta-alumina supporting a $La_{1.00}Fe_{0.95}Pd_{0.05}O_3$ perovskite-type composite oxide The resulting powder was prepared so as to have a weight ratio of the perovskite-type composite oxide to the lanthanum containing theta-alumina of 1:4.

Example QA-15

Supporting of Palladium Containing Perovskite-Type Composite Oxide by Thermostable Oxide and Production of Exhaust Gas Purifying Catalyst

| | |
|---|---|
| Lanthanum methoxypropylate | 40.6 g (0.100 mol) |
| Iron methoxypropylate | 30.7 g (0.095 mol) |

The above listed components were charged in a 1000 mL round bottomed flask and dissolved in 200 mL of toluene with stirring to obtain a mixed alkoxide solution. Separately, 1.52 g (0.005 mol) of palladium acetylacetonate was dissolved in 20 mL of toluene, and the resulting solution was added to the mixed alkoxide solution in the round bottomed flask to obtain a LaFePd containing homogeneous mixed solution.

To the homogeneous mixed solution was added 24.5 g of the powdery lanthanum containing theta-alumina (Production Example C3) containing 4.0% by weight of lanthanum, followed by stirring, and 200 mL of deionized water was added dropwise to the solution over about fifteen minutes. Then, a brown viscous precipitate was formed upon hydrolysis.

After stirring at room temperature for two hours, the toluene and water were distilled off under reduced pressure to obtain a mixture of a lanthanum containing theta-alumina with a homogeneously dispersed LaFePd containing perovskite-type composite oxide. Next, the mixture was placed on a petri dish, subjected to forced air drying at 60° C. for twenty four hours and heat treated in an electric furnace at 800° C. in the air for one hour to obtain a powdery exhaust gas purifying catalyst comprising lanthanum containing theta-alumina supporting a. $La_{1.00}Fe_{0.95}Pd_{0.05}O_3$ perovskite-type composite oxide.

The resulting powder was prepared so as to have a weight ratio of the perovskite-type composite oxide to the lanthanum containing theta-alumina of 1:1.

Example QA-16

Supporting of Rhodium Containing Perovskite-Type Composite Oxide by Thermostable Oxide and Production of Exhaust Gas Purifying Catalyst

| | |
|---|---|
| Lanthanum methoxypropylate | 40.6 g (0.100 mol) |
| Iron methoxypropylate | 18.4 g (0.057 mol) |
| Manganese methoxypropylate | 8.9 g (0.038 mol) |

The above listed components were charged in a 1000 mL round bottomed flask and dissolved in 200 mL of toluene with stirring to obtain a mixed alkoxide solution. Separately, 2.00 g (0.005 mol) of rhodium acetylacetonate was dissolved in 20 mL of toluene, and the resulting solution was added to the mixed alkoxide solution in the round bottomed flask to obtain a LaFeMnRh containing homogeneous mixed solution.

To the homogeneous mixed solution was added 220 g of the powdery lanthanum containing theta-alumina (Production Example C2) containing 2.0% by weight of lanthanum, followed by stirring, and 200 mL of deionized water was added dropwise to the solution over about fifteen minutes. Then, a brown viscous precipitate was formed upon hydrolysis.

After stirring at room temperature for two hours, the toluene and water were distilled off under reduced pressure to obtain a mixture of a lanthanum containing theta-alumina with a homogeneously dispersed LaFeMnRh containing perovskite-type composite oxide. Next, the mixture was placed on a petri dish, subjected to forced air drying at 60° C. for twenty four hours and heat treated in an electric furnace at 800° C. in the air for one hour to obtain a powdery exhaust gas purifying catalyst comprising lanthanum containing theta-alumina supporting a $La_{1.00}Fe_{0.57}Mn_{0.38}Rh_{0.05}O_3$ perovskite-type composite oxide.

The resulting powder was prepared so as to have a weight ratio of the perovskite-type composite oxide to the lanthanum containing theta-alumina of 1:9.

Example QA-17

Supporting of Rhodium Containing Perovskite-Type Composite Oxide by Thermostable Oxide and Production of Exhaust Gas Purifying Catalyst

| Lanthanum methoxypropylate | 40.6 g (0.100 mol) |
|---|---|
| Iron methoxypropylate | 30.7 g (0.095 mol) |

The above listed components were charged in a 1000 mL round bottomed flask and dissolved in 200 mL of toluene with stirring to obtain a mixed alkoxide solution. Separately, 2.00 g (0.005 mol) of rhodium acetylacetonate was dissolved in 20 mL of toluene, and the resulting solution was added to the mixed alkoxide solution in the round bottomed flask to obtain a LaFeRh containing homogeneous mixed solution.

To the homogeneous mixed solution was added 36.8 g of the powdery lanthanum containing theta-alumina (Production Example C4) containing 10.0% by weight of lanthanum, followed by stirring, and 200 mL of deionized water was added dropwise to the solution over about fifteen minutes. Then, a brown viscous precipitate was formed upon hydrolysis.

After stirring at room temperature for two hours, the toluene and water were distilled off under reduced pressure to obtain a mixture of a lanthanum containing theta-alumina with a homogeneously dispersed LaFeRh containing perovskite-type composite oxide. Next, the mixture was placed on a petri dish, subjected to forced air drying at 60° C. for twenty four hours and heat treated in an electric furnace at 800° C. in the air for one hour to obtain a powdery exhaust gas purifying catalyst comprising lanthanum containing theta-alumina supporting a $La_{1.00}Fe_{0.95}Rh_{0.05}O_3$ perovskite-type composite oxide.

The resulting powder was prepared so as to have a weight ratio of the perovskite-type composite oxide to the lanthanum containing theta-alumina of 2:3.

Example QA-18

Supporting of Platinum Containing Perovskite-Type Composite Oxide by Thermostable Oxide and Production of Exhaust Gas Purifying Catalyst

| Lanthanum inethoxypropylate | 38.6 g (0.095 mol) |
|---|---|
| Iron methoxypropylate | 18.4 g (0.057 mol) |
| Manganese methoxypropylate | 8.9 g (0.038 mol) |

The above listed components were charged in a 1000 mL round bottomed flask and dissolved in 200 mL of toluene with stirring to obtain a mixed alkoxide solution. Separately, 1.965 g (0.005 mol) of platinum acetylacetonate and 1.53 g (0.005 mol) of silver acetylacetonate were dissolved in 40 mL of toluene, and the resulting solution was added to the mixed alkoxide solution in the round bottomed flask to obtain a LaAgFeMnPt containing homogeneous mixed solution.

To the homogeneous mixed solution was added 24.5 g of the powdery lanthanum containing theta-alumina (Production Example C4) containing 10.0% by weight of lanthanum, followed by stirring, and 200 mL of deionized water was added dropwise to the solution over about fifteen minutes. Then, a brown viscous precipitate was formed upon hydrolysis.

After stirring at room temperature for two hours, the toluene and water were distilled off under reduced pressure to obtain a mixture of a lanthanum containing theta-alumina with a homogeneously dispersed LaAgFeMnPt containing perovskite-type composite oxide. Next, the mixture was placed on a petri dish, subjected to forced air drying at 60° C. for twenty four hours and heat treated in an electric furnace at 800° C. in the air for one hour to obtain a powdery exhaust gas purifying catalyst comprising lanthanum containing theta-alumina supporting a $La_{0.95}Ag_{0.05}Fe_{0.57}Mn_{0.38}Pt_{0.05}O_3$ perovskite-type composite oxide.

The resulting powder was prepared so as to have a weight ratio of the perovskite-type composite oxide to the lanthanum containing theta-alumina of 1:1.

Example QA-19

Supporting of Platinum Containing Perovskite-Type Composite Oxide by Thermostable Oxide and Production of Exhaust Gas Purifying Catalyst

| Lanthanum methoxypropylate | 36.6 g (0.090 mol) |
|---|---|
| Calcium methoxypropylate | 2.2 g (0.010 mol) |
| Iron methoxypropylate | 29.1 g (0.090 mol) |

The above listed components were charged in a 1000 mL round bottomed flask and dissolved in 200 mL of toluene with stirring to obtain a mixed alkoxide solution. Separately, 3.93 g (0.010 mol) of platinum acetylacetonate was dissolved in 40 mL of toluene, and the resulting solution was added to the mixed alkoxide solution in the round bottomed flask to obtain a LaCaFePt containing homogeneous mixed solution.

To the homogeneous mixed solution was added 98.7 g of the powdery theta-alumina, followed by stirring, and 200 mL of deionized water was added dropwise to the solution over about fifteen minutes. Then, a brown viscous precipitate was formed upon hydrolysis.

After stirring at room temperature for two hours, the toluene and water were distilled off under reduced pressure to obtain a mixture of theta-alumina with a homogeneously dispersed LaCaFePt containing perovskite-type composite oxide. Next, the mixture was placed on a petri dish, subjected to forced air drying at 60° C. for twenty four hours and heat treated in an electric furnace at 800° C. in the air for one hour to obtain a powdery exhaust gas purifying catalyst comprising theta-alumina supporting a $La_{0.90}Ca_{0.10}Fe_{0.90}Pt_{0.10}O_3$ perovskite-type composite oxide.

The resulting powder was prepared so as to have a weight ratio of the perovskite-type composite oxide to the theta-alumina of 1:4.

Example RA-20

1) Supporting of Palladium Containing Perovskite-Type Composite Oxide by Thermostable Oxide

| Lanthanum ethoxyethylate | 40.6 g (0.100 mol) |
|---|---|
| Iron ethoxyethylate | 30.7 g (0.095 mol) |

The above listed components were charged in a 500 mL round bottomed flask and dissolved in 200 mL of toluene with stirring to obtain a mixed alkoxide solution. Separately, 1.52 g (0.005 mol) of palladium acetylacetonate was dissolved in 100 mL of toluene, and the resulting solution was added to the mixed alkoxide solution in the round bottomed flask to obtain a LaFePd containing homogeneous mixed solution.

A powdery zirconia composite oxide (Production Example A2) comprising a $Zr_{0.60}Ce_{0.30}La_{0.05}Y_{0.05}$ oxide was dispersed in 200 mL of toluene and the homogeneous mixed solution in the round bottomed flask was added, followed by stirring.

Next, 200 mL of deionized water was added dropwise to the solution over about fifteen minutes. Then, a brown viscous precipitate was formed upon hydrolysis.

After stirring at room temperature for two hours, the toluene and water were distilled off under reduced pressure to obtain a zirconia composite oxide with a dispersed pre-crystallization composition of a LaFePd composite oxide. Next, the zirconia composite oxide with the dispersed pre-crystallization composition was placed on a petri dish, subjected to forced air drying at 60° C. for twenty four hours and heat treated in an electric furnace at 650° C. in the air for one hour to obtain a powdery zirconia composite oxide comprising a $Zr_{0.60}Ce_{0.30}La_{0.05}Y_{0.05}$ oxide supporting a $La_{1.00}Fe_{0.95}Pd_{0.05}O_3$ perovskite-type composite oxide.

The resulting powder was prepared so as to have a weight ratio of the perovskite-type composite oxide to the zirconia composite oxide of 2:8.

2) Mixing of Perovskite-Type Composite Oxide with Thermostable Oxide and Production of Exhaust Gas Purifying Catalyst To the above prepared powdery zirconia composite oxide supporting the perovskite-type composite oxide was added the powdery theta-alumina. The mixture was mixed with deionized water and further mixed with alumina sol to obtain a slurry. The slurry was injected into a honeycomb cordierite carrier having a size of 3 mil per 600 cells, a diameter of 86 mm and a length of 104 mm so as to homogeneously apply 150 g of the zirconia composite oxide supporting the perovskite-type composite oxide and 150 g of theta-alumina per one liter of the honeycomb carrier. The resulting article dried at 100° C. and baked at 500° C. to obtain an exhaust gas purifying catalyst. The resulting exhaust gas purifying catalyst contained 0.66 g of Pd per one liter of the honeycomb carrier.

Example RA-21

1) Supporting of Palladium Containing Perovskite-Type Composite Oxide by Thermostable Oxide

| Lanthanum ethoxyethylate | 40.6 g (0.100 mol) |
| Iron ethoxyethylate | 18.4 g (0.057 mol) |
| Manganese ethoxyethylate | 8.9 g (0.038 mol) |

The above listed components were charged in a 500 mL round bottomed flask and dissolved in 200 mL of toluene with stirring to obtain a mixed alkoxide solution. Separately, 1.52 g (0.005 mol) of palladium acetylacetonate was dissolved in 100 mL of toluene, and the resulting solution was added to the mixed alkoxide solution in the round bottomed flask to obtain a LaFeMnPd containing homogeneous mixed solution.

A powdery zirconia composite oxide (Production Example A3) comprising a $Zr_{0.50}Ce_{0.40}La_{0.05}Nd_{0.05}$ oxide was dispersed in 200 mL of toluene and the homogeneous mixed solution in the round bottomed flask was added, followed by stirring.

Next, 200 mL of deionized water was added dropwise to the solution over about fifteen minutes. Then, a brown viscous precipitate was formed upon hydrolysis.

After stirring at room temperature for two hours, the toluene and water were distilled off under reduced pressure to obtain a zirconia composite oxide with a dispersed pre-crystallization composition of a LaFeMnPd composite oxide. Next, the zirconia composite oxide with the dispersed pre-crystallization composition was placed on a petri dish, subjected to forced air drying at 60° C. for twenty four hours and heat treated in an electric furnace at 650° C. in the air for one hour to obtain a powdery zirconia composite oxide comprising a $Zr_{0.50}Ce_{0.40}La_{0.05}Nd_{0.05}$ oxide supporting a $La_{1.00}Fe_{0.57}Mn_{0.38}Pd_{0.05}O_3$ perovskite-type composite oxide.

The resulting powder was prepared so as to have a weight ratio of the perovskite-type composite oxide to the zirconia composite oxide of 2:8.

2) Mixing of Perovskite-Type Composite Oxide with Thermostable Oxide and Production of Exhaust Gas Purifying Catalyst To the above prepared powdery zirconia composite oxide supporting the perovskite-type composite oxide were added the powdery Pt supporting ceria composite oxide (Production Example B1-1) comprising a $Ce_{0.60}Zr_{0.30}Y_{0.10}$ oxide supporting 0.25% by weight of Pt and the powdery theta-alumina. The mixture was mixed with deionized water and further mixed with alumina sol to obtain a slurry. The slurry was injected into a honeycomb cordierite carrier having a size of 3 mil per 600 cells, a diameter of 86 mm and a length of 104 mm so as to homogeneously apply 150 g of the zirconia composite oxide supporting the perovskite-type composite oxide, 60 g of the Pt supporting ceria composite oxide, and 90 g of the theta-alumina per one liter of the honeycomb carrier. The resulting article dried at 100° C. and baked at 500° C. to obtain an exhaust gas purifying catalyst. The resulting exhaust gas purifying catalyst contained 0.15 g of Pt and 0.66 g of Pd per one liter of the honeycomb carrier.

Example RA-22

1) Supporting of Palladium Containing Perovskite-Type Composite Oxide by Thermostable Oxide

| Lanthanum ethoxyethylate | 40.6 g (0.100 mol) |
| Iron ethoxyethylate | 18.4 g (0.057 mol) |
| Manganese ethoxyethylate | 8.9 g (0.038 mol) |

The above listed components were charged in a 500 mL round bottomed flask and dissolved in 200 mL of toluene with stirring to obtain a mixed alkoxide solution. Separately, 1.52 g (0.005 mol) of palladium acetylacetonate was dissolved in 100 mL of toluene, and the resulting solution was added to the mixed alkoxide solution in the round bottomed flask to obtain a LaFeMnPd containing homogeneous mixed solution.

Separately, the powdery zirconia composite oxide (Production Example A4) comprising $Zr_{0.65}Ce_{0.30}La_{0.02}Y_{0.03}$ oxide was dispersed in 200 mL of toluene and the homogeneous mixed solution in the round bottomed flask was added, followed by stirring.

Next, 200 mL of deionized water was added dropwise to the solution over about fifteen minutes. Then, a brown viscous precipitate was formed upon hydrolysis.

After stirring at room temperature for two hours, the toluene and water were distilled off under reduced pressure to obtain a zirconia composite oxide with a dispersed pre-crystallization composition of a LaFeMnPd composite oxide. Next, the zirconia composite oxide with the dispersed pre-crystallization composition was placed on a petri dish, subjected to forced air drying at 60° C. for twenty four hours and heat treated in an electric furnace at 650° C. in the air for one hour to obtain a powdery zirconia composite oxide comprising $Zr_{0.65}Ce_{0.30}La_{0.02}Y_{0.03}$ oxide supporting a $La_{1.00}Fe_{0.57}Mn_{0.38}Pd_{0.05}O_3$ perovskite-type composite oxide.

The resulting powder was prepared so as to have a weight ratio of the perovskite-type composite oxide to the zirconia composite oxide of 2:8.

2) Mixing of Perovskite-Type Composite Oxide with Thermostable Oxide and Production of Exhaust Gas Purifying Catalyst To the above prepared powdery zirconia composite oxide supporting the perovskite-type composite oxide were added the powdery ceria composite oxide (Production Example B1) comprising a $Ce_{0.60}Zr_{0.30}Y_{0.10}$ oxide and the powdery Rh supporting theta-alumina (Production Example C7) comprising theta-alumina supporting 0.188% by weight of Rh. The mixture was mixed with deionized water and further mixed with alumina sol to obtain a slurry. The slurry was injected into a honeycomb cordierite carrier having a size of 3 mil per 600 cells, a diameter of 86 mm and a length of 104 mm so as to homogeneously apply 150 g of the zirconia composite oxide supporting the perovskite-type composite oxide, 70 g of the ceria composite oxide, and 80 g of the Rh supporting theta-alumina per one liter of the honeycomb carrier. The resulting article dried at 100° C. and baked at 500° C. to obtain an exhaust gas purifying catalyst. The resulting exhaust gas purifying catalyst contained 0.66 g of Pd and 0.15 g of Rh per one liter of the honeycomb carrier.

Example RA-23

1) Supporting of Palladium Containing Perovskite-Type Composite Oxide by Thermostable Oxide

| | |
|---|---|
| Lanthanum ethoxyethylate | 40.6 g (0.100 mol) |
| Iron ethoxyethylate | 30.7 g (0.095 mol) |

The above listed components were charged in a 500 mL round bottomed flask and dissolved in 200 mL of toluene with stirring to obtain a mixed alkoxide solution. Separately, 1.52 g (0.005 mol) of palladium acetylacetonate was dissolved in 100 mL of toluene, and the resulting solution was added to the mixed alkoxide solution in the round bottomed flask to obtain a LaFePd containing homogeneous mixed solution.

Separately, the powdery zirconia composite oxide (Production Example A5) comprising a $Zr_{0.70}Ce_{0.20}La_{0.05}Y_{0.05}$ oxide was dispersed in 200 mL of toluene and the homogeneous mixed solution in the round bottomed flask was added, followed by stirring.

Next, 200 mL of deionized water was added dropwise to the solution over about fifteen minutes. Then, a brown viscous precipitate was formed upon hydrolysis.

After stirring at room temperature for two hours, the toluene and water were distilled off under reduced pressure to obtain a zirconia composite oxide with a dispersed pre-crystallization composition of a LaFePd composite oxide. Next, the zirconia composite oxide with the dispersed pre-crystallization composition was placed on a petri dish, subjected to forced air drying at 60° C. for twenty four hours and heat treated in an electric furnace at 650° C. in the air for one hour to obtain a powdery zirconia composite oxide comprising a $Zr_{0.70}Ce_{0.20}La_{0.05}Y_{0.05}$ oxide supporting a $La_{1.00}Fe_{0.95}Pd_{0.05}O_3$ perovskite-type composite oxide.

The resulting powder was prepared so as to have a weight ratio of the perovskite-type composite oxide to the zirconia composite oxide of 2:8.

2) Mixing of Perovskite-Type Composite Oxide with Thermostable Oxide and Production of Exhaust Gas Purifying Catalyst To the above prepared powdery zirconia composite oxide supporting the perovskite-type composite oxide were added the powdery Pt—Rh supporting zirconia composite oxide (Production Example A6-1) comprising $Zr_{0.76}Ce_{0.18}La_{0.02}Nd_{0.04}$ oxide supporting 0.2% by weight of Pt and 0.3% by weight of Rh, the powdery ceria composite oxide (Production Example B1) comprising a $Ce_{0.60}Zr_{0.30}Y_{0.10}$ oxide, and the powdery Pt—Rh supporting theta-alumina (Production Example C8-1) supporting 0.4% by weight of Pt and 0.1% by weight of Rh. The mixture was mixed with deionized water and further mixed with alumina sol to obtain a slurry. The slurry was injected into a honeycomb cordierite carrier having a size of 3 mil per 600 cells, a diameter of 86 mm and a length of 104 mm so as to homogeneously apply 150 g of the zirconia composite oxide supporting the perovskite-type composite oxide, 30 g of the Pt—Rh supporting zirconia composite oxide, 50 g of the ceria composite oxide, and 60 g of the Pt—Rh supporting theta-alumina per one liter of the honeycomb carrier. The resulting article dried at 100° C. and baked at 500° C. to obtain an exhaust gas purifying catalyst. The resulting exhaust gas purifying catalyst contained 0.30 g of Pt, 0.66 g of Pd, and 0.15 g of Rh per one liter of the honeycomb carrier.

Example RA-24

1) Supporting of Rhodium Containing Perovskite-Type Composite Oxide by Thermostable Oxide

| | |
|---|---|
| Lanthanum ethoxyethylate | 36.6 g (0.090 mol) |
| Cerium ethoxyethylate | 4.1 g (0.010 mol) |
| Iron ethoxyethylate | 29.1 g (0.090 mol) |

The above listed components were charged in a 500 mL round bottomed flask and dissolved in 200 mL of toluene with stirring to obtain a mixed alkoxide solution. Separately, 4.00 g (0.010 mol) of rhodium acetylacetonate was dissolved in 200 mL of toluene, and the resulting solution was added to the mixed alkoxide solution in the round bottomed flask to obtain a LaCeFeRh containing homogeneous mixed solution.

Separately, the powdery zirconia composite oxide (Production Example A7) comprising a $Zr_{0.60}Ce_{0.30}La_{0.05}Y_{0.05}$ oxide was dispersed in 200 mL of toluene and the homogeneous mixed solution in the round bottomed flask was added, followed by stirring.

Next, 200 mL of deionized water was added dropwise to the solution over about fifteen minutes. Then, a brown viscous precipitate was formed upon hydrolysis.

After stirring at room temperature for two hours, the toluene and water were distilled off under reduced pressure to obtain a zirconia composite oxide with a dispersed pre-crystallization composition of a LaCeFeRh composite oxide. Next, the zirconia composite oxide with the dispersed pre-crystallization composition was placed on a petri dish, subjected to forced air drying at 60° C. for twenty four hours and heat treated in an electric furnace at 650° C. in the air for one hour to obtain a powdery zirconia composite oxide comprising a $Zr_{0.60}Ce_{0.30}La_{0.05}Y_{0.05}$ oxide supporting a $La_{0.9}Ce_{0.10}Fe_{0.09}Rh_{0.10}O_3$ perovskite-type composite oxide.

The resulting powder was prepared so as to have a weight ratio of the perovskite-type composite oxide to the zirconia composite oxide of 1:9.

2) Mixing of Perovskite-Type Composite Oxide with Thermostable Oxide and Production of Exhaust Gas Purifying Catalyst To the above prepared powdery zirconia composite oxide supporting the perovskite-type composite oxide was added the powdery theta-alumina. The mixture was mixed with deionized water and further mixed with alumina sol to obtain a slurry. The slurry was injected into a honeycomb cordierite carrier having a size of 3 mil per 600 cells, a diameter of 86 mm and a length of 104 mm so as to homogeneously apply 150 g of the zirconia composite oxide supporting the perovskite-type composite oxide and 150 g of the theta-alumina per one liter of the honeycomb carrier. The resulting article dried at 100° C. and baked at 500° C. to obtain an exhaust gas purifying catalyst. The resulting exhaust gas purifying catalyst contained 0.63 g of Rh per one liter of the honeycomb carrier.

Example RA-25

1) Supporting of Rhodium Containing Perovskite-Type Composite Oxide by Thermostable Oxide

| | |
|---|---|
| Lanthanum ethoxyethylate | 36.6 g (0.090 mol) |
| Cerium ethoxyethylate | 4.1 g (0.010 mol) |
| Iron ethoxyethylate | 30.7 g (0.095 mol) |

The above listed components were charged in a 500 mL round bottomed flask and dissolved in 200 mL of toluene with stirring to obtain a mixed alkoxide solution. Separately, 2.00 g (0.005 mol) of rhodium acetylacetonate was dissolved in 100 mL of toluene, and the resulting solution was added to the mixed alkoxide solution in the round bottomed flask to obtain a LaCeFeRh containing homogeneous mixed solution.

Separately, the powdery lanthanum containing theta-alumina (Production Example C4) containing 10.0% by weight of lanthanum was dispersed in 200 mL of toluene and the homogeneous mixed solution in the round bottomed flask was added, followed by stirring.

Next, 200 mL of deionized water was added dropwise to the solution over about fifteen minutes. Then, a brown viscous precipitate was formed upon hydrolysis.

After stirring at room temperature for two hours, the toluene and water were distilled off under reduced pressure to obtain a lanthanum containing theta-alumina with a dispersed pre-crystallization composition of a LaCeFeRh composite oxide. Next, the lanthanum containing theta-alumina with the dispersed pre-crystallization composition was placed on a petri dish, subjected to forced air drying at 60° C. for twenty four hours and heat treated in an electric furnace at 650° C. in the air for one hour to obtain a powdery lanthanum containing theta-alumina supporting a $La_{0.90}Ce_{0.10}Fe_{0.95}Rh_{0.05}O_3$ perovskite-type composite oxide.

The resulting powder was prepared so as to have a weight ratio of the perovskite-type composite oxide to the lanthanum containing theta-alumina of 2:8.

2) Mixing of Perovskite-Type Composite Oxide with Thermostable Oxide and Production of Exhaust Gas Purifying Catalyst To the above prepared powdery lanthanum containing theta-alumina supporting the perovskite-type composite oxide were added the powdery ceria composite oxide (Production Example B1) comprising a $Ce_{0.60}Zr_{0.30}Y_{0.10}$ oxide and the powdery Pt—Rh supporting theta-alumina (Production Example C8-2) supporting 0.50% by weight of Pt and 0.10% by weight of Rh. The mixture was mixed with deionized water and further mixed with alumina sol to obtain a slurry. The slurry was injected into a honeycomb cordierite carrier having a size of 3 mil per 600 cells, a diameter of 86 mm and a length of 104 mm so as to homogeneously apply 150 g of the lanthanum containing theta-alumina supporting the perovskite-type composite oxide, 90 g of the ceria composite oxide, and 60 g of the Pt—Rh supporting theta-alumina per one liter of the honeycomb carrier. The resulting article dried at 100° C. and baked at 500° C. to obtain an exhaust gas purifying catalyst. The resulting exhaust gas purifying catalyst contained 0.30 g of Pt and 0.69 g (0.63 g in the perovskite-type composite oxide, 0.06 g on the theta-alumina) of Rh per one liter of the honeycomb carrier.

Example RA-26

1) Supporting of Rhodium Containing Perovskite-Type Composite Oxide by Thermostable Oxide

| | |
|---|---|
| Lanthanum ethoxyethylate | 40.6 g (0.100 mol) |
| Iron ethoxyethylate | 30.7 g (0.095 mol) |

The above listed components were charged in a 500 mL round bottomed flask and dissolved in 200 mL of toluene with stirring to obtain a mixed alkoxide solution. Separately, 2.00 g (0.005 mol) of rhodium acetylacetonate was dissolved in 100 mL of toluene, and the resulting solution was added to the mixed alkoxide solution in the round bottomed flask to obtain a LaFeRh containing homogeneous mixed solution.

Separately, the powdery $SrZrO_3$ (Production Example D1) was dispersed in 200 mL of toluene and the homogeneous mixed solution in the round bottomed flask was added, followed by stirring.

Next, 200 mL of deionized water was added dropwise to the solution over about fifteen minutes. Then, a brown viscous precipitate was formed upon hydrolysis.

After stirring at room temperature for two hours, the toluene and water were distilled off under reduced pressure to obtain SrZrO$_3$ with a dispersed pre-crystallization composition of a LaFeRh composite oxide. Next, SrZrO$_3$ with the dispersed pre-crystallization composition was placed on a petri dish, subjected to forced air drying at 60° C. for twenty four hours and heat treated in an electric furnace at 650° C. in the air for one hour to obtain a powdery SrZrO$_3$ supporting a La$_{1.00}$Fe$_{0.95}$Rh$_{0.05}$O$_3$ perovskite-type composite oxide.

The resulting powder was prepared so as to have a weight ratio of the perovskite-type composite oxide to SrZrO$_3$ of 2:8.

2) Mixing of Perovskite-Type Composite Oxide with Thermostable Oxide and Production of Exhaust Gas Purifying Catalyst To the above prepared powdery SrZrO$_3$ supporting the perovskite-type composite oxide were added the powdery Pt—Rh supporting zirconia composite oxide (Production Example A1-2) comprising a Zr$_{0.79}$Ce$_{0.16}$La$_{0.01}$Nd$_{0.04}$ oxide supporting 0.15% by weight of Pt and 0.15% by weight of Rh, the powdery Pt supporting ceria composite oxide (Production Example B2-1) comprising a Ce$_{0.40}$Zr$_{0.50}$Y$_{0.10}$ oxide supporting 0.20% by weight of Pt and the powdery Pt—Rh supporting theta-alumina (Production Example C8-2) comprising theta-alumina supporting 0.50% by weight of Pt and 0.10% by weight of Rh. The mixture was mixed with deionized water and further mixed with alumina sol to obtain a slurry. The slurry was injected into a honeycomb cordierite carrier having a size of 3 mil per 600 cells, a diameter of 86 mm and a length of 104 mm so as to homogeneously apply 150 g of SrZrO$_3$ supporting the perovskite-type composite oxide, 60 g of the Pt—Rh supporting zirconia composite oxide, 30 g of the Pt supporting ceria composite oxide, and 60 g of the Pt—Rh supporting theta-alumina per one liter of the honeycomb carrier. The resulting article dried at 100° C. and baked at 500° C. to obtain an exhaust gas purifying catalyst. The resulting exhaust gas purifying catalyst contained 0.45 g (0.06 g on the ceria composite oxide, 0.09 g on the zirconia composite oxide, 0.30 g on the theta-alumina) of Pt and 0.78 g (0.63 g in the perovskite-type composite oxide, 0.09 g on the zirconia composite oxide, 0.06 g on the theta-alumina) of Rh per one liter of the honeycomb carrier.

Example RA-27

1) Supporting of Platinum Containing Perovskite-Type Composite Oxide by Thermostable Oxide

| | |
|---|---|
| Lanthanum ethoxyethylate | 36.6 g (0.090 mol) |
| Calcium ethoxyethylate | 2.2 g (0.010 mol) |
| Iron ethoxyethylate | 29.1 g (0.090 mol) |

The above listed components were charged in a 500 mL round bottomed flask and dissolved in 200 mL of toluene with stirring to obtain a mixed alkoxide solution. Separately, 3.93 g (0.010 mol) of platinum acetylacetonate was dissolved in 200 mL of toluene, and the resulting solution was added to the mixed alkoxide solution in the round bottomed flask to obtain a LaCaFePt containing homogeneous mixed solution.

Separately, the powdery zirconia composite oxide (Production Example A7) comprising a Zr$_{0.60}$Ce$_{0.30}$La$_{0.05}$Y$_{0.05}$ oxide was dispersed in 200 mL of toluene and the homogeneous mixed solution in the round bottomed flask was added, followed by stirring.

Next, 200 mL of deionized water was added dropwise to the solution over about fifteen minutes. Then, a brown viscous precipitate was formed upon hydrolysis.

After stirring at room temperature for two hours, the toluene and water were distilled off under reduced pressure to obtain a zirconia composite oxide with a dispersed pre-crystallization composition of a LaCaFePt composite oxide. Next, the zirconia composite oxide with the dispersed pre-crystallization composition was placed on a petri dish, subjected to forced air drying at 60° C. for twenty four hours and heat treated in an electric furnace at 650° C. in the air for one hour to obtain a powdery zirconia composite oxide comprising Zr$_{0.60}$Ce$_{0.30}$La$_{0.05}$Y$_{0.05}$ oxide supporting a La$_{0.90}$Ca$_{0.10}$Fe$_{0.90}$Pt$_{0.10}$O$_3$ perovskite-type composite oxide.

The resulting powder was prepared so as to have a weight ratio of the perovskite-type composite oxide to the zirconia composite oxide of 1:9.

2) Mixing of Perovskite-Type Composite Oxide with Thermostable Oxide and Production of Exhaust Gas Purifying Catalyst To the above prepared zirconia composite oxide supporting the perovskite-type composite oxide was added the powdery theta-alumina. The mixture was mixed with deionized water and further mixed with alumina sol to obtain a slurry. The slurry was injected into a honeycomb cordierite carrier having a size of 3 mil per 600 cells, a diameter of 86 mm and a length of 104 mm so as to homogeneously apply 75 g of the zirconia composite oxide supporting the perovskite-type composite oxide and 150 g of the theta-alumina per one liter of the honeycomb carrier. The resulting article dried at 100° C. and baked at 500° C. to obtain an exhaust gas purifying catalyst. The resulting exhaust gas purifying catalyst contained 0.59 g of Pt per one liter of the honeycomb carrier.

Example RA-28

1) Supporting of Platinum Containing Perovskite-Type Composite Oxide by Thermostable Oxide

| | |
|---|---|
| Lanthanum ethoxyethylate | 36.6 g (0.090 mol) |
| Calcium ethoxyethylate | 2.2 g (0.010 mol) |
| Iron ethoxyethylate | 30.7 g (0.095 mol) |

The above listed components were charged in a 500 mL round bottomed flask and dissolved in 200 mL of toluene with stirring to obtain a mixed alkoxide solution. Separately, 1.965 g (0.005 mol) of platinum acetylacetonate was dissolved in 200 mL of toluene, and the resulting solution was added to the mixed alkoxide solution in the round bottomed flask to obtain a LaCaFePt containing homogeneous mixed solution.

Separately, the powdery lanthanum containing theta-alumina (Production Example C4) containing 10.0% by weight of lanthanum was dispersed in 200 mL of toluene and the homogeneous mixed solution in the round bottomed flask was added, followed by stirring.

Next, 200 mL of deionized water was added dropwise to the solution over about fifteen minutes. Then, a brown viscous precipitate was formed upon hydrolysis.

After stirring at room temperature for two hours, the toluene and water were distilled off under reduced pressure to obtain a lanthanum containing theta-alumina with a dispersed pre-crystallization composition of a LaCaFePt composite oxide. Next, the lanthanum containing theta-alumina with the dispersed pre-crystallization composition was placed on a petri dish, subjected to forced air drying at 60° C. for twenty four hours and heat treated in an electric furnace at 650° C. in the air for one hour to obtain a powdery lanthanum containing theta-alumina supporting a $La_{0.90}Ca_{0.10}Fe_{0.95}Pt_{0.05}O_3$ perovskite-type composite oxide.

The resulting powder was prepared so as to have a weight ratio of the perovskite-type composite oxide to the lanthanum containing theta-alumina of 2:8.

2) Mixing of Perovskite-Type Composite Oxide with Thermostable Oxide and Production of Exhaust Gas Purifying Catalyst To the above prepared powdery lanthanum containing theta-alumina supporting the perovskite-type composite oxide were added the powdery ceria composite oxide (Production Example B1) comprising a $Ce_{0.60}Zr_{0.30}Y_{0.10}$ oxide and the powdery Pt—Rh supporting theta-alumina (Production Example C8-3) comprising theta-alumina supporting 0.50% by weight of Pt and 0.17% by weight of Rh. The mixture was mixed with deionized water and further mixed with alumina sol to obtain a slurry. The slurry was injected into a honeycomb cordierite carrier having a size of 3 mil per 600 cells, a diameter of 86 mm and a length of 104 mm so as to homogeneously apply 75 g of the lanthanum containing theta-alumina supporting the perovskite-type composite oxide, 90 g of the ceria composite oxide, and 60 g of the Pt—Rh supporting theta-alumina per one liter of the honeycomb carrier. The resulting article dried at 100° C. and baked at 500° C. to obtain an exhaust gas purifying catalyst. The resulting exhaust gas purifying catalyst contained 0.91 g (0.61 g in the perovskite-type composite oxide, 0.30 g on the theta-alumina) of Pt and 0.10 g of Rh per one liter of the honeycomb carrier.

Example RA-29

1) Supporting of Palladium Containing Perovskite-Type Composite Oxide by Thermostable Oxide

| | |
|---|---|
| Lanthanum nitrate | 43.3 g (0.100 mol) |
| Iron nitrate | 23.0 g (0.057 mol) |
| Manganese nitrate | 10.9 g (0.038 mol) |
| Palladium nitrate solution having a Pd content of 4.399% by mass | 12.1 g (corresponding to 0.53 g (0.005 mol) of Pd) |

The above listed components were dissolved in 100 mL of pure water, followed by homogeneous mixing to obtain an aqueous mixed salt solution. Separately, 50.4 g (0.24 mol) of citric acid was dissolved in pure water, and the solution was added to the aqueous mixed salt solution to obtain an aqueous LaFeMnPd containing solution of citric acid and salts.

To the powdery zirconia composite oxide (Production Example A8) comprising a $Zr_{0.65}Ce_{0.30}La_{0.02}Y_{0.03}$ oxide were added 200 mL of pure water and the aqueous LaFeMnPd containing solution of citric acid and salts, followed by stirring. The mixture was evaporated to dryness in a hot water bath at 60° C. to 80° C. with evacuation using a rotary evaporator. After passage of about three hours and when the solution came into a starch-syrup-like state, the temperature of the hot water bath was gradually raised, followed by drying at 250° C. in vacuum for one hour to obtain a citrate complex.

The above-prepared citrate complex was baked at 300° C. in the air for three hours, pulverized in a mortar and baked again at 700° C. in the air for three hours to obtain a powdery zirconia composite oxide comprising $Zr_{0.65}Ce_{0.30}La_{0.02}Y_{0.03}$ oxide supporting a $La_{1.00}Fe_{0.57}Mn_{0.38}Pd_{0.05}O_3$ perovskite-type composite oxide.

The resulting powder was prepared so as to have a weight ratio of the perovskite-type composite oxide to the zirconia composite oxide of 2:8.

2) Supporting of Rhodium Containing Perovskite-Type Composite Oxide by Thermostable Oxide

| | |
|---|---|
| Lanthanum ethoxyethylate | 36.6 g (0.090 mol) |
| Cerium ethoxyethylate | 4.1 g (0.010 mol) |
| Iron ethoxyethylate | 30.7 g (0.095 mol) |

The above listed components were charged in a 500 mL round bottomed flask and dissolved in 200 mL of toluene with stirring to obtain a mixed alkoxide solution. Separately, 2.00 g (0.005 mol) of rhodium acetylacetonate was dissolved in 100 mL of toluene, and the resulting solution was added to the mixed alkoxide solution in the round bottomed flask to obtain a LaCeFeRh containing homogeneous mixed solution.

Separately, the powdery lanthanum containing theta-alumina (Production Example C3) containing 4.0% by weight of lanthanum was dispersed in 200 mL of toluene and the homogeneous mixed solution in the round bottomed flask was added, followed by stirring.

Next, 200 mL of deionized water was added dropwise to the solution over about fifteen minutes. Then, a brown viscous precipitate was formed upon hydrolysis.

After stirring at room temperature for two hours, the toluene and water were distilled off under reduced pressure to obtain a lanthanum containing theta-alumina with a dispersed pre-crystallization composition of a LaCeFeRh composite oxide. Next, the lanthanum containing theta-alumina with the dispersed pre-crystallization composition was placed on a petri dish, subjected to forced air drying at 60° C. for twenty four hours and heat treated in an electric furnace at 650° C. in the air for one hour to obtain a powdery lanthanum containing theta-alumina supporting a $La_{0.90}Ce_{0.10}Fe_{0.95}Rh_{0.05}O_3$ perovskite-type composite oxide.

The resulting powder was prepared so as to have a weight ratio of the perovskite-type composite oxide to the lanthanum containing theta-alumina of 2:8.

3) Mixing of Perovskite-Type Composite Oxide with Thermostable Oxide and Production of Exhaust Gas Purifying Catalyst To the above prepared powdery zirconia composite oxide supporting the perovskite-type composite oxide and powdery lanthanum theta-alumina supporting the perovskite-type composite oxide were added the powdery ceria composite oxide (Production Example B1-2) comprising a $Ce_{0.60}Zr_{0.30}Y_{0.10}$ oxide supporting 0.50% by weight of Pt, and the powdery theta-alumina. The mixture was mixed with deionized water and further mixed with alumina sol to obtain a slurry. The slurry was injected into a honeycomb cordierite carrier having a size of 6 mil per 400 cells, a diameter of 86 mm and a length of 104 mm so as to homogeneously apply 50 g of the zirconia composite oxide supporting the palladium containing perovskite-type composite oxide, 50 g of the lanthanum containing theta-alumina supporting the rhodium containing perovskite-type composite oxide, 60 g of the Pt supporting ceria composite oxide, and 40 g of the theta-alumina per one liter of the honeycomb carrier. The resulting article dried at 100° C. and baked at 500° C. to obtain an exhaust gas purifying catalyst. The resulting exhaust gas purifying catalyst contained 0.30 g of Pt, 0.22 g of Pd, and 0.26 g of Rh per one liter of the honeycomb carrier.

Example RA-29-1

1) Production of Palladium Containing Perovskite-Type Composite Oxide

| Lanthanum nitrate | 43.3 g (0.100 mol) |
| Iron nitrate | 40.4 g (0.100 mol) |

An aqueous solution prepared by dissolving the above lanthanum nitrate in 100 mL of pure water and an aqueous solution prepared by dissolving the above iron nitrate in 30 mL of ion-exchanged water were homogeneously mixed to obtain an aqueous mixed salt solution. Separately, 38.4 g (0.20 mol) of citric acid was dissolved in ion-exchanged water, and the solution was added to the aqueous mixed salt solution to obtain an aqueous LaFe containing solution of citric acid and salts.

The aqueous LaFe containing solution of citric acid and salts was evaporated to dryness in a hot water bath at 60° C. to 80° C. with evacuation using a rotary evaporator. After passage of about three hours and when the solution came into a starch-syrup-like state, the temperature of the hot water bath was gradually raised, followed by drying at 250° C. in vacuum for one hour to obtain a citrate complex.

The above-prepared citrate complex was baked at 400° C. in the air for three hours, pulverized in a mortar and baked again at 700° C. in the air for three hours to obtain a powdery perovskite-type composite oxide comprising $La_{1.00}Fe_{1.00}O_3$.

The resulting powdery perovskite-type composite oxide was impregnated with a palladium nitrate solution, dried at 100° C. and baked at 500° C. to obtain a powdery palladium supporting perovskite-type composite oxide containing 2.20% by weight of Pd.

2) Mixing of Perovskite-Type Composite Oxide with Thermostable Oxide and Production of Exhaust Gas Purifying Catalyst To the above prepared powdery palladium supporting perovskite-type composite oxide supporting Pd were added the powdery Pt—Rh supporting zirconia composite oxide (Production Example A6-1) comprising a $Zr_{0.76}Ce_{0.18}La_{0.02}Nd_{0.04}$ oxide supporting 0.20% by weight of Pt and 0.30% by weight of Rh, the powdery ceria composite oxide (Production Example B1-3) comprising a $Ce_{0.60}Zr_{0.30}Y_{0.10}$ oxide supporting 1.00% by weight of Pt, and the powdery theta-alumina. The mixture was mixed with deionized water and further mixed with alumina sol to obtain a slurry. The slurry was injected into a honeycomb cordierite carrier having a size of 6 mil per 400 cells, a diameter of 86 mm and a length of 104 mm so as to homogeneously apply 30 g of the palladium supporting perovskite-type composite oxide, 40 g of the Pt—Rh supporting zirconia composite oxide, 50 g of the Pt supporting ceria composite oxide, and 50 g of the theta-alumina per one liter of the honeycomb carrier. The resulting article dried at 100° C. and baked at 500° C. to obtain an exhaust gas purifying catalyst. The resulting exhaust gas purifying catalyst contained 0.58 g of Pt, 0.66 g of Pd, and 0.12 g of Rh per one liter of the honeycomb carrier.

Example RA-30

1) Supporting of Palladium Containing Perovskite-Type Composite Oxide by Thermostable Oxide

| Lanthanum methoxypropylate | 40.6 g (0.100 mol) |
| Iron methoxypropylate | 30.7 g (0.095 mol) |

The above listed components were charged in a 1000 mL round bottomed flask and dissolved in 200 mL of toluene with stirring to obtain a mixed alkoxide solution. Separately, 1.52 g (0.005 mol) of palladium acetylacetonate was dissolved in 20 mL of toluene, and the resulting solution was added to the mixed alkoxide solution in the round bottomed flask to obtain a LaFePd containing homogeneous mixed solution.

Separately, the powdery lanthanum containing theta-alumina (Production Example C3) containing 4.0% by weight of lanthanum was dispersed in 200 mL of toluene and the homogeneous mixed solution in the round bottomed flask was added, followed by stirring.

Next, 200 mL of deionized water was added dropwise to the solution over about fifteen minutes. Then, a brown viscous precipitate was formed upon hydrolysis.

After stirring at room temperature for two hours, the toluene and water were distilled off under reduced pressure to obtain a lanthanum containing theta-alumina with a dispersed pre-crystallization composition of a LaFePd composite oxide. Next, the lanthanum containing theta-alumina with the dispersed pre-crystallization composition was placed on a petri dish, subjected to forced air drying at 60° C. for twenty four hours and heat treated in an electric furnace at 800° C. in the air for one hour to obtain a powdery lanthanum containing theta-alumina supporting a $La_{1.00}Fe_{0.95}Pd_{0.05}O_3$ perovskite-type composite oxide.

The resulting powder was prepared so as to have a weight ratio of the perovskite-type composite oxide to the lanthanum containing theta-alumina of 1:1.

2) Mixing of Perovskite-Type Composite Oxide with Thermostable Oxide and Production of Exhaust Gas Purifying Catalyst To the above prepared powdery lanthanum containing theta-alumina supporting the perovskite-type composite oxide were added the powdery Pt—Rh supporting zirconia composite oxide (Production Example A6-2) comprising a $Zr_{0.76}Ce_{0.18}La_{0.02}Nd_{0.04}$ oxide supporting 1.00% by weight of Pt and 1.00% by weight of Rh, the powdery Pt supporting ceria composite oxide (Production Example B1-3) comprising a $Ce_{0.60}Zr_{0.30}Y_{0.10}$ oxide supporting 1.00% by weight of Pt, and the powdery Pt—Rh supporting theta-alumina (Production Example C8-4) supporting 0.57% by weight of Pt and 0.14% by weight of Rh. The mixture was mixed with deionized water and further mixed with alumina sol to obtain a slurry. The slurry was injected into a honeycomb cordierite carrier having a size of 3 mil per 600 cells, a diameter of 86 mm and a length of 104 mm so as to homogeneously apply 30 g of the lanthanum containing theta-alumina supporting the perovskite-type composite oxide, 30 g of the Pt—Rh supporting zirconia composite oxide, 80 g of the Pt supporting ceria composite oxide, and 70 g of the Pt—Rh supporting theta-alumina per one liter of the honeycomb carrier. The resulting article dried at 100° C. and baked at 500° C. to obtain an exhaust gas purifying catalyst. The resulting exhaust gas purifying catalyst contained 1.50 g of Pt, 0.33 g of Pd, and 0.40 g of Rh per one liter of the honeycomb carrier.

Example RA-31

1) Supporting of Palladium Containing Perovskite-Type Composite Oxide by Thermostable Oxide

| Lanthanum methoxypropylate | 40.6 g (0.100 mol) |
| Iron methoxypropylate | 30.7 g (0.095 mol) |

The above listed components were charged in a 1000 mL round bottomed flask and dissolved in 200 mL of toluene with stirring to obtain a mixed alkoxide solution. Separately, 1.52 g (0.005 mol) of palladium acetylacetonate was dissolved in 20 mL of toluene, and the resulting solution was added to the mixed alkoxide solution in the round bottomed flask to obtain a LaFePd containing homogeneous mixed solution.

Separately, the powdery lanthanum containing theta-alumina (Production Example C3) containing 4.0% by weight of lanthanum was dispersed in 200 mL of toluene and the homogeneous mixed solution in the round bottomed flask was added, followed by stirring.

Next, 200 mL of deionized water was added dropwise to the solution over about fifteen minutes. Then, a brown viscous precipitate was formed upon hydrolysis.

After stirring at room temperature for two hours, the toluene and water were distilled off under reduced pressure to obtain a lanthanum containing theta-alumina with a dispersed pre-crystallization composition of a LaFePd composite oxide. Next, the lanthanum containing theta-alumina with the dispersed pre-crystallization composition was placed on a petri dish, subjected to forced air drying at 60° C. for twenty four hours and heat treated in an electric furnace at 800° C. in the air for one hour to obtain a powdery lanthanum containing theta-alumina supporting a $La_{1.00}Fe_{0.95}Pd_{0.05}O_3$ perovskite-type composite oxide.

The resulting powder was prepared so as to have a weight ratio of the perovskite-type composite oxide to the lanthanum containing theta-alumina of 1:1.

2) Mixing of Perovskite-Type Composite Oxide with Thermostable Oxide and Production of Exhaust Gas Purifying Catalyst To the above prepared powdery lanthanum containing theta-alumina supporting the perovskite-type composite oxide were added the powdery ceria composite oxide (Production Example B1-3) comprising a $Ce_{0.60}Zr_{0.30}Y_{0.10}$ oxide supporting 1.00% by weight of Pt and the powdery Pt—Rh supporting gamma-alumina (Production Example C13-1) comprising gamma-alumina supporting 1.00% by weight of Pt and 0.57% by weight of Rh. The mixture was mixed with deionized water and further mixed with alumina sol to obtain a slurry. The slurry was injected into a honeycomb cordierite carrier having a size of 3 mil per 600 cells, a diameter of 86 mm and a length of 104 mm so as to homogeneously apply 30 g of the lanthanum containing theta-alumina supporting the perovskite-type composite oxide, 80 g of the Pt supporting ceria composite oxide, and 70 g of the Pt—Rh supporting gamma-alumina per one liter of the honeycomb carrier. The resulting article dried at 100° C. and baked at 500° C. to obtain an exhaust gas purifying catalyst. The resulting exhaust gas purifying catalyst contained 1.50 g of Pt, 0.33 g of Pd, and 0.40 g of Rh per one liter of the honeycomb carrier.

Example RA-32

1) Supporting of Palladium Containing Perovskite-Type Composite Oxide by Thermostable Oxide

| Lanthanum methoxypropylate | 40.6 g (0.100 mol) |
| Iron methoxypropylate | 30.7 g (0.095 mol) |

The above listed components were charged in a 1000 mL round bottomed flask and dissolved in 200 mL of toluene with stirring to obtain a mixed alkoxide solution. Separately, 1.52 g (0.005 mol) of palladium acetylacetonate was dissolved in 20 mL of toluene, and the resulting solution was added to the mixed alkoxide solution in the round bottomed flask to obtain a LaFePd containing homogeneous mixed solution.

Separately, the powdery alpha-alumina was dispersed in 200 mL of toluene and the homogeneous mixed solution in the round bottomed flask was added, followed by stirring.

Next, 200 mL of deionized water was added dropwise to the solution over about fifteen minutes. Then, a brown viscous precipitate was formed upon hydrolysis.

After stirring at room temperature for two hours, the toluene and water were distilled off under reduced pressure to obtain alpha-alumina with a dispersed pre-crystallization composition of a LaFePd composite oxide. Next, the alpha-alumina with the dispersed pre-crystallization composition was placed on a petri dish, subjected to forced air drying at 60° C. for twenty four hours and heat treated in an electric furnace at 800° C. in the air for one hour to obtain powdery alpha-alumina supporting a $La_{1.00}Fe_{0.95}Pd_{0.05}O_3$ perovskite-type composite oxide.

The resulting powder was prepared so as to have a weight ratio of the perovskite-type composite oxide to the alpha-alumina of 1:2.

2) Mixing of Perovskite-Type Composite Oxide with Thermostable Oxide and Production of Exhaust Gas Purifying Catalyst To the above prepared powdery alpha-alumina supporting the perovskite-type composite oxide were added the powdery Pt—Rh supporting zirconia composite oxide (Production Example A6-2) comprising a $Zr_{0.76}Ce_{0.18}La_{0.02}Nd_{0.04}$ oxide supporting 1.00% by weight of Pt and 1.00% by weight of Rh, the powdery Pt supporting ceria composite oxide (Production Example B1-9) comprising a $Ce_{0.60}Zr_{0.30}Y_{0.10}$ oxide supporting 1.38% by weight of Pt and the powdery gamma-alumina. The mixture was mixed with deionized water and further mixed with alumina sol to obtain a slurry. The slurry was injected into a honeycomb cordierite carrier having a size of 3 mil per 600 cells, a diameter of 86 mm and a length of 104 mm so as to homogeneously apply 45 g of the alpha-alumina supporting the perovskite-type composite oxide, 40 g of the Pt—Rh supporting zirconia composite oxide, 80 g of the Pt supporting ceria composite oxide, and 70 g of the gamma-alumina per one liter of the honeycomb carrier. The resulting article dried at 100° C. and baked at 500° C. to obtain an exhaust gas purifying catalyst. The resulting exhaust gas purifying catalyst contained 1.50 g of Pt, 0.33 g of Pd, and 0.40 g of Rh per one liter of the honeycomb carrier.

Example RC-1

1) Formation of Inner Layer

1)-1 Supporting of Palladium Containing Perovskite-Type Composite Oxide by Thermostable Oxide

| Lanthanum ethoxyethylate | 40.6 g (0.100 mol) |
|---|---|
| Iron ethoxyethylate | 30.7 g (0.095 mol) |

The above listed components were charged in a 500 mL round bottomed flask and dissolved in 200 mL of toluene with stirring to obtain a mixed alkoxide solution. Separately, 1.52 g (0.005 mol) of palladium acetylacetonate was dissolved in 100 mL of toluene, and the resulting solution was added to the mixed alkoxide solution in the round bottomed flask to obtain a LaFePd containing homogeneous mixed solution.

Separately, the powdery zirconia composite oxide (Production Example A4) comprising a $Zr_{0.65}Ce_{0.30}La_{0.02}Y_{0.03}$ oxide was dispersed in 200 mL of toluene and the homogeneous mixed solution in the round bottomed flask was added, followed by stirring.

Next, 200 mL of deionized water was added dropwise to the solution over about fifteen minutes. As a result, a brown viscous precipitate was formed upon hydrolysis.

After stirring at room temperature for two hours, the toluene and water were distilled off under reduced pressure to obtain a zirconia composite oxide with a dispersed pre-crystallization composition of a LaFePd composite oxide. Next, the zirconia composite oxide with the dispersed pre-crystallization composition was placed on a petri dish, subjected to forced air drying at 60° C. for twenty four hours and heat treated in an electric furnace at 650° C. in the air for one hour to obtain a powdery zirconia composite oxide comprising a $Zr_{0.65}Ce_{0.30}La_{0.02}Y_{0.03}$ oxide supporting a $La_{1.00}Fe_{0.95}Pd_{0.05}O_3$ perovskite-type composite oxide.

The resulting powder was prepared so as to have a weight ratio of the perovskite-type composite oxide to the zirconia composite oxide of 2:8.

1)-2 Production of Inner Layer

To the above prepared powdery zirconia composite oxide supporting the perovskite-type composite oxide were added the powdery Pt supporting ceria composite oxide (Production Example B1-4) comprising a $Ce_{0.60}Zr_{0.30}Y_{0.10}$ oxide supporting 0.30% by weight of Pt, and the powdery theta-alumina. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm so as to homogeneously apply 75 g of the zirconia composite oxide supporting the perovskite-type composite oxide, 50 g of the Pt supporting ceria composite oxide, and 70 g of the theta-alumina per one liter of the honeycomb carrier. The resulting article dried at 100° C. and baked at 500° C. to form an inner layer.

2) Production of Outer Layer and Exhaust Gas Purifying Catalyst

The powdery Pt—Rh supporting zirconia composite oxide (Production Example A6-3) comprising a $Zr_{0.76}Ce_{0.18}La_{0.02}Nd_{0.04}$ oxide supporting 0.30% by weight of Pt and 1.40% by weight of Rh, the powdery Pt supporting ceria composite oxide (Production Example B1-2) comprising a $Ce_{0.60}Zr_{0.30}Y_{0.10}$ oxide supporting 0.50% by weight of Pt, and the powdery theta-alumina were mixed. The resulting mixture was further mixed with deionized water and then mixed with alumina sol to form a slurry. The slurry was injected into the honeycomb cordierite carrier having a size of 3 mil per 600 cells, a diameter of 86 mm and a length of 104 mm so as to homogeneously apply, to a surface of the inner layer, 50 g of the Pt—Rh supporting zirconia composite oxide, 30 g of the Pt supporting ceria composite oxide, and 50 g of the theta-alumina per one liter of the honeycomb carrier. The resulting article dried at 100° C. and baked at 500° C. to form an outer layer. Thus, an exhaust gas purifying catalyst was produced.

The resulting exhaust gas purifying catalyst contained 0.15 g of Pt and 0.33 g of Pd in the inner layer, and 0.30 g of Pt and 0.70 g of Rh in the outer layer, respectively, per one liter of the honeycomb carrier.

Example RC-2

1) Formation of Inner Layer

1)-1 Supporting of Palladium Containing Perovskite-Type Composite Oxide by Thermostable Oxide

| Lanthanum ethoxyethylate | 40.6 g (0.100 mol) |
|---|---|
| Iron ethoxyethylate | 30.7 g (0.095 mol) |

The above listed components were charged in a 500 mL round bottomed flask and dissolved in 200 mL of toluene with stirring to obtain a mixed alkoxide solution. Separately, 1.52 g (0.005 mol) of palladium acetylacetonate was dissolved in 100 mL of toluene, and the resulting solution was added to the mixed alkoxide solution in the round bottomed flask to obtain a LaFePd containing homogeneous mixed solution.

Separately, the powdery $SrZrO_3$ (Production Example D1) was dispersed in 200 mL of toluene and the homogeneous mixed solution in the round bottomed flask was added, followed by stirring.

Next, 200 mL of deionized water was added dropwise to the solution over about fifteen minutes. As a result, a brown viscous precipitate was formed upon hydrolysis.

After stirring at room temperature for two hours, the toluene and water were distilled off under reduced pressure to obtain $SrZrO_3$ with a dispersed pre-crystallization composition of a LaFePd composite oxide. Next, $SrZrO_3$ with the dispersed pre-crystallization composition was placed on a petri dish, subjected to forced air drying at 60° C. for twenty four hours and heat treated in an electric furnace at 650° C. in the air for one hour to obtain a powdery $SrZrO_3$ supporting a $La_{1.00}Fe_{0.95}Pd_{0.05}O_3$ perovskite-type composite oxide.

The resulting powder was prepared so as to have a weight ratio of the perovskite-type composite oxide to $SrZrO_3$ of 2:8.

1)-2 Production of Inner Layer

To the above prepared powdery $SrZrO_3$ supporting a perovskite-type composite oxide were added the powdery Pt supporting ceria composite oxide (Production Example B1-4) comprising a $Ce_{0.60}Zr_{0.30}Y_{0.10}$ oxide supporting 0.30% by weight of Pt, the powdery theta-alumina and the powdery BaSO$_4$. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm so as to homogeneously apply 75 g of SrZrO$_3$ supporting the perovskite-type composite oxide, 30 g of the Pt supporting ceria composite oxide, 70 g of the theta-alumina, and 20 g of BaSO$_4$ per one liter of the honeycomb carrier. The resulting article dried at 100° C. and baked at 500° C. to form an inner layer.

2) Production of Outer Layer and Exhaust Gas Purifying Catalyst

The powdery Pt—Rh supporting zirconia composite oxide (Production Example A6-3) comprising a $Zr_{0.76}Ce_{0.18}La_{0.02}Nd_{0.04}$ oxide supporting 0.30% by weight of Pt and 1.40% by weight of Rh, the powdery Pt supporting ceria composite oxide (Production Example B1-2) comprising a $Ce_{0.60}Zr_{0.30}Y_{0.10}$ oxide supporting 0.50% by weight of Pt, and the powdery theta-alumina were mixed. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm thereby to homogeneously apply, to a surface of the inner layer, 50 g of the Pt—Rh supporting zirconia composite oxide, 30 g of the Pt supporting ceria composite oxide, and 50 g of the theta-alumina per one liter of the honeycomb carrier. The resulting article dried at 100° C. and baked at 500° C. to form an outer layer. Thus, an exhaust gas purifying catalyst was produced.

The resulting exhaust gas purifying catalyst contained 0.15 g of Pt and 0.33 g of Pd in the inner layer, and 0.30 g of Pt and 0.70 g of Rh in the outer layer, respectively, per one liter of the honeycomb carrier.

Example RC-3

1) Formation of Inner Layer

1)-1 Supporting of Palladium Containing Perovskite-Type Composite Oxide by Thermostable Oxide

| Lanthanum ethoxyethylate | 40.6 g (0.100 mol) |
|---|---|
| Iron ethoxyethylate | 30.7 g (0.095 mol) |

The above listed components were charged in a 500 mL round bottomed flask and dissolved in 200 mL of toluene with stirring to obtain a mixed alkoxide solution. Separately, 1.52 g (0.005 mol) of palladium acetylacetonate was dissolved in 100 mL of toluene, and the resulting solution was added to the mixed alkoxide solution in the round bottomed flask to obtain a LaFePd containing homogeneous mixed solution.

Next, 200 mL of deionized water was added dropwise to the solution over about fifteen minutes. As a result, a brown viscous precipitate was formed upon hydrolysis.

After stirring at room temperature for two hours, the toluene and water were distilled off under reduced pressure to obtain a pre-crystallization composition of a LaFePd composite oxide. Next, the pre-crystallization composition was placed on a petri dish, subjected to forced air drying at 60° C. for twenty four hours and heat treated in an electric furnace at 650° C. in the air for one hour to obtain a powdery perovskite-type composite oxide comprising $La_{1.00}Fe_{0.95}Pd_{0.05}O_3$.

1)-2 Production of Inner Layer

To the above prepared perovskite-type composite oxide were added the powdery Pt supporting ceria composite oxide (Production Example B1-4) comprising a $Ce_{0.60}Zr_{0.30}Y_{0.10}$ oxide supporting 0.30% by weight of Pt, the powdery theta-alumina, and a powdery BaSO$_4$. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm so as to homogeneously apply 30 g of the perovskite-type composite oxide, 50 g of the Pt supporting ceria composite oxide, 90 g of the theta-alumina, and 20 g of BaSO$_4$ per one liter of the honeycomb carrier. The resulting article dried at 100° C. and baked at 500° C. to form an inner layer.

2) Production of Outer Layer and Exhaust Gas Purifying Catalyst

The powdery Pt—Rh supporting zirconia composite oxide (Production Example A6-3) comprising a $Zr_{0.76}Ce_{0.18}La_{0.02}Nd_{0.04}$ oxide supporting 0.30% by weight of Pt and 1.40% by weight of Rh, the powdery Pt supporting ceria composite oxide (Production Example B1-2) comprising a $Ce_{0.60}Zr_{0.30}Y_{0.10}$ oxide supporting 0.50% by weight of Pt, and the powdery theta-alumina were mixed. The resulting mixture was further mixed with deionized water and then mixed with alumina sol to form a slurry. The slurry was injected into the honeycomb cordierite carrier having a size of 3 mil per 600 cells, a diameter of 86 mm and a length of 104 mm so as to homogeneously apply, to a surface of the inner layer, 50 g of the Pt—Rh supporting zirconia composite oxide, 40 g of the Pt supporting ceria composite oxide, and 50 g of the theta-alumina per one liter of the honeycomb carrier. The resulting article dried at 100° C. and baked at 500° C. to form an outer layer. Thus, an exhaust gas purifying catalyst was produced.

The resulting exhaust gas purifying catalyst contained 0.15 g of Pt and 0.66 g of Pd in the inner layer, and 0.35 g of Pt and 0.70 g of Rh in the outer layer, respectively, per one liter of the honeycomb carrier.

Example RC-4

1) Formation of Inner Layer

1)-1 Supporting of Palladium Containing Perovskite-Type Composite Oxide by Thermostable Oxide

| Lanthanum ethoxyethylate | 40.6 g (0.100 mol) |
|---|---|
| Iron ethoxyethylate | 30.7 g (0.095 mol) |

The above listed components were charged in a 500 mL round bottomed flask and dissolved in 200 mL of toluene with stirring to obtain a mixed alkoxide solution. Separately, 1.52 g (0.005 mol) of palladium acetylacetonate was dissolved in 100 mL of toluene, and the resulting solution was added to the mixed alkoxide solution in the round bottomed flask to obtain a LaFePd containing homogeneous mixed solution.

Separately, the powdery zirconia composite oxide (Production Example A4) comprising a $Zr_{0.65}Ce_{0.30}La_{0.02}Y_{0.03}$ oxide was dispersed in 200 mL of toluene and the homogeneous mixed solution in the round bottomed flask was added, followed by stirring.

Next, 200 mL of deionized water was added dropwise to the solution over about fifteen minutes. As a result, a brown viscous precipitate was formed upon hydrolysis.

After stirring at room temperature for two hours, the toluene and water were distilled off under reduced pressure to obtain a zirconia composite oxide with a dispersed pre-crystallization composition of a LaFePd composite oxide. Next, the zirconia composite oxide with the dispersed pre-crystallization composition was placed on a petri dish, subjected to forced air drying at 60° C. for twenty four hours and heat treated in an electric furnace at 650° C. in the air for one hour to obtain a powdery zirconia composite oxide comprising a $Zr_{0.65}Ce_{0.30}La_{0.02}Y_{0.03}$ oxide supporting a $La_{1.00}Fe_{0.95}Pd_{0.05}O_3$ perovskite-type composite oxide.

The resulting powder was prepared so as to have a weight ratio of the perovskite-type composite oxide to the zirconia composite oxide of 2:8.

1)-2 Production of Inner Layer

To the above prepared powdery zirconia composite oxide supporting the perovskite-type composite oxide were added the powdery Pt supporting ceria composite oxide (Production Example B1-5) comprising a $Ce_{0.60}Zr_{0.30}Y_{0.10}$ oxide supporting 0.80% by weight of Pt, and the powdery theta-alumina. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm so as to homogeneously apply 75 g of the zirconia composite oxide supporting the perovskite-type composite oxide, 20 g of the Pt supporting ceria composite oxide, and 90 g of the theta-alumina per one liter of the honeycomb carrier. The resulting article dried at 100° C. and baked at 500° C. to form an inner layer.

2) Production of Outer Layer and Exhaust Gas Purifying Catalyst

The powdery Pt—Rh supporting zirconia composite oxide (Production Example A9-1) comprising a $Zr_{0.80}Ce_{0.15}La_{0.02}Nd_{0.03}$ oxide supporting 0.27% by weight of Pt and 1.33% by weight of Rh, the powdery Pt supporting ceria composite oxide (Production Example B1-5) comprising a $Ce_{0.60}Zr_{0.30}Y_{0.10}$ oxide supporting 0.80% by weight of Pt, and the powdery Pt—Rh supporting theta-alumina (Production Example C8-5) comprising theta-aluminum supporting 0.43% by weight of Pt and 0.21% by weight of Rh were mixed. The resulting mixture was further mixed with deionized water and then mixed with alumina sol to form a slurry. The slurry was injected into the honeycomb cordierite carrier having a size of 3 mil per 600 cells, a diameter of 86 mm and a length of 104 mm so as to homogeneously apply, to a surface of the inner layer, 30 g of the Pt—Rh supporting zirconia composite oxide, 30 g of the Pt supporting ceria composite oxide, and 70 g of the Pt—Rh supporting theta-alumina per one liter of the honeycomb carrier. The resulting article dried at 100° C. and baked at 500° C. to form an outer layer. Thus, an exhaust gas purifying catalyst was produced.

The resulting exhaust gas purifying catalyst contained 0.16 g of Pt and 0.33 g of Pd in the inner layer, and 0.62 g of Pt and 0.55 g of Rh in the outer layer, respectively, per one liter of the honeycomb carrier.

Example RC-5

1) Formation of Inner Layer

1)-1 Supporting of Palladium Containing Perovskite-Type Composite Oxide by Thermostable Oxide

| Lanthanum ethoxyethylate | 40.6 g (0.100 mol) |
|---|---|
| Iron ethoxyethylate | 31.0 g (0.096 mol) |

The above listed components were charged in a 500 mL round bottomed flask and dissolved in 200 mL of toluene with stirring to obtain a mixed alkoxide solution. Separately, 1.22 g (0.004 mol) of palladium acetylacetonate was dissolved in 100 mL of toluene, and the resulting solution was added to the mixed alkoxide solution in the round bottomed flask to obtain a LaFePd containing homogeneous mixed solution.

Separately, the powdery theta-alumina was dispersed in 200 mL of toluene and the homogeneous mixed solution in the round bottomed flask was added, followed by stirring.

Next, 200 mL of deionized water was added dropwise to the mixture over about fifteen minutes. As a result, a brown viscous precipitate was formed upon hydrolysis.

After stirring at room temperature for two hours, the toluene and water were distilled off under reduced pressure to obtain theta-alumina with a dispersed pre-crystallization composition of a LaFePd composite oxide. Next, the theta-alumina with the dispersed pre-crystallization composition was placed on a petri dish, subjected to forced air drying at 60° C. for twenty four hours and heat treated in an electric furnace at 650° C. in the air for one hour to obtain a powdery theta-alumina supporting a $La_{1.00}Fe_{0.96}Pd_{0.04}O_3$ perovskite-type composite oxide.

The resulting powder was prepared so as to have a weight ratio of the perovskite-type composite oxide to the theta-alumina of 2:8.

1)-2 Production of Inner Layer

To the above prepared theta-alumina supporting the perovskite-type composite oxide were added the powdery Pt supporting ceria composite oxide (Production Example B1-5) comprising a $Ce_{0.60}Zr_{0.30}Y_{0.10}$ oxide supporting 0.80% by weight of Pt, and the powdery theta-alumina. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm so as to homogeneously apply 75 g of the theta-alumina supporting the perovskite-type composite oxide, 20 g of the Pt supporting ceria composite oxide, and 90 g of the theta-alumina per one liter of the honeycomb carrier. The resulting article dried at 100° C. and baked at 500° C. to form an inner layer.

2) Production of Outer Layer and Exhaust Gas Purifying Catalyst

The powdery Rh supporting zirconia composite oxide (Production Example A9-2) comprising a $Zr_{0.80}Ce_{0.15}La_{0.02}Nd_{0.03}$ oxide supporting 0.83% by weight of Rh, the powdery Pt supporting ceria composite oxide (Production Example B1-5) comprising a $Ce_{0.60}Zr_{0.30}Y_{0.10}$ oxide supporting 0.80% by weight of Pt, and the powdery Pt—Rh supporting theta-alumina (Production Example C8-5) comprising theta-alumina supporting 0.43% by weight of Pt and 0.21% by weight of Rh were mixed. The resulting mixture was further mixed with deionized water and then mixed with alumina sol to form a slurry. The slurry was injected into the honeycomb cordierite carrier having a size of 3 mil per 600 cells, a diameter of 86 mm and a length of 104 mm so as to homogeneously apply, to a surface of the inner layer, 30 g of the Rh supporting zirconia composite oxide, 30 g of the Pt supporting ceria composite oxide, and 70 g of the Pt—Rh supporting theta-alumina per one liter of the honeycomb carrier. The resulting article dried at 100° C. and baked at 500° C. to form an outer layer. Thus, an exhaust gas purifying catalyst was produced.

The resulting exhaust gas purifying catalyst contained 0.16 g of Pt and 0.26 g of Pd in the inner layer, and 0.54 g of Pt and 0.40 g of Rh in the outer layer, respectively, per one liter of the honeycomb carrier.

Example RC-6

1) Formation of Inner Layer

1)-1 Supporting of Palladium Containing Perovskite-Type Composite Oxide by Thermostable Oxide

| Lanthanum ethoxyethylate | 40.6 g (0.100 mol) |
|---|---|
| Iron ethoxyethylate | 30.7 g (0.095 mol) |

The above listed components were charged in a 500 mL round bottomed flask and dissolved in 200 mL of toluene with stirring to obtain a mixed alkoxide solution. Separately, 1.52 g (0.005 mol) of palladium acetylacetonate was dissolved in 100 mL of toluene, and the resulting solution was added to the mixed alkoxide solution in the round bottomed flask to obtain a LaFePd containing homogeneous mixed solution.

Separately, the powdery theta-alumina was dispersed in 200 mL of toluene and the homogeneous mixed solution in the round bottomed flask was added, followed by stirring.

Next, 200 mL of deionized water was added dropwise to the solution over about fifteen minutes. As a result, a brown viscous precipitate was formed upon hydrolysis.

After stirring at room temperature for two hours, the toluene and water were distilled off under reduced pressure to obtain a theta-alumina with a dispersed pre-crystallization composition of a LaFePd composite oxide. Next, the theta-alumina with the dispersed pre-crystallization composition was placed on a petri dish, subjected to forced air drying at 60° C. for twenty four hours and heat treated in an electric furnace at 650° C. in the air for one hour to obtain a powdery theta-alumina supporting a $La_{1.00}Fe_{0.95}Pd_{0.05}O_3$ perovskite-type composite oxide.

The resulting powder was prepared so as to have a weight ratio of the perovskite-type composite oxide to the theta-alumina of 1:1.

1)-2 Production of Inner Layer

To the above prepared powdery theta-alumina supporting the perovskite-type composite oxide were added the powdery ceria composite oxide (Production Example B1) comprising a $Ce_{0.60}Zr_{0.30}Y_{0.10}$ oxide, and the powdery $BaSO_4$. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm so as to homogeneously apply 50 g of the theta-alumina supporting the perovskite-type composite oxide, 30 g of the ceria composite oxide, and 20 g of $BaSO_4$ per one liter of the honeycomb carrier. The resulting article dried at 100° C. and baked at 500° C. to form an inner layer.

2) Formation of Outer Layer

2)-1 Supporting of Rhodium Containing Perovskite-Type Composite Oxide by Thermostable Oxide

| Lanthanum ethoxyethylate | 40.6 g (0.100 mol) |
|---|---|
| Iron ethoxyethylate | 30.7 g (0.095 mol) |

The above listed components were charged in a 500 mL round bottomed flask and dissolved in 200 mL of toluene with stirring to obtain a mixed alkoxide solution. Separately, 2.00 g (0.005 mol) of rhodium acetylacetonate was dissolved in 100 mL of toluene, and the resulting solution was added to the mixed alkoxide solution in the round bottomed flask to obtain a LaFeRh containing homogeneous mixed solution.

Separately, the powdery $LaAlO_3$ (Production Example E1) was dispersed in 200 mL of toluene and the homogeneous mixed solution in the round bottomed flask was added, followed by stirring.

Next, 200 mL of deionized water was added dropwise to the solution over about fifteen minutes. Then, a brown viscous precipitate was formed upon hydrolysis.

After stirring at room temperature for two hours, the toluene and water were distilled off under reduced pressure to obtain $LaAlO_3$ with a dispersed pre-crystallization composition of a LaFeRh composite oxide. Next, the $LaAlO_3$ with the dispersed pre-crystallization composition was placed on a petri dish, subjected to forced air drying at 60° C. for twenty four hours and heat treated in an electric furnace at 650° C. in the air for one hour to obtain a powdery $LaAlO_3$ supporting a $La_{1.00}Fe_{0.95}Rh_{0.05}O_3$ perovskite-type composite oxide.

The resulting powder was prepared so as to have a weight ratio of the perovskite-type composite oxide to $LaAlO_3$ of 2:8.

2)-2 Production of Outer Layer and Exhaust Gas Purifying Catalyst

To the above prepared powdery $LaAlO_3$ supporting perovskite-type composite oxide were added the powdery Pt supporting ceria composite oxide (Production Example B3-1) comprising a $Ce_{0.60}Zr_{0.30}Y_{0.10}$ oxide supporting 1.33% by weight of Pt, and the powdery theta-alumina. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm thereby to homogeneously apply, to a surface of the inner layer, 95 g of $LaAlO_3$ supporting the perovskite-type composite oxide, 30 g of the Pt supporting ceria composite oxide, and 30 g of the theta-alumina per one liter of the honeycomb carrier. The resulting article dried at 100° C. and baked at 500° C. to form an outer layer. Thus, an exhaust gas purifying catalyst was produced.

The resulting exhaust gas purifying catalyst contained 0.80 g of Pd in the inner layer, and 0.40 g of Pt, and 0.40 g of Rh in the outer layer, respectively, per one liter of the honeycomb carrier.

Example RC-7

1) Formation of Inner Layer

To the powdery Pt supporting ceria composite oxide (Production Example B2-1) comprising a $Ce_{0.40}Zr_{0.50}Y_{0.10}$ oxide supporting 0.20% by weight of Pt was added the powdery Pd supporting theta-alumina (Production Example C9-1) comprising theta-alumina supporting 0.40% by weight of Pd. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm so as to homogeneously apply 30 g of the Pt supporting ceria composite oxide and 50 g of the Pd supporting theta-alumina per one liter of the honeycomb carrier. The resulting article dried at 100° C. and baked at 500° C. to form an inner layer.

2) Formation of Outer Layer

2)-1 Supporting of Platinum Containing Perovskite-Type Composite Oxide by Thermostable Oxide

| | |
|---|---|
| Lanthanum ethoxyethylate | 36.6 g (0.090 mol) |
| Strontium ethoxyethylate | 2.7 g (0.010 mol) |
| Iron ethoxyethylate | 29.1 g (0.090 mol) |

The above listed components were charged in a 500 mL round bottomed flask and dissolved in 200 mL of toluene with stirring to obtain a mixed alkoxide solution. Separately, 1.965 g (0.005 mol) of platinum acetylacetonate and 2.00 g (0.005 mol) of rhodium acetylacetonate were dissolved in 100 mL of toluene, and the resulting solution was added to the mixed alkoxide solution in the round bottomed flask to obtain a LaSrFePtRh containing homogeneous mixed solution.

Separately, the powdery $SrZrO_3$ (Production Example D1) was dispersed in 200 mL of toluene and the homogeneous mixed solution in the round bottomed flask was added, followed by stirring.

Next, 200 mL of deionized water was added dropwise to the solution over about fifteen minutes. As a result, a brown viscous precipitate was formed upon hydrolysis.

After stirring at room temperature for two hours, the toluene and water were distilled off under reduced pressure to obtain $SrZrO_3$ with a dispersed pre-crystallization composition of a LaSrFePtRh composite oxide. Next, $SrZrO_3$ with the dispersed pre-crystallization composition was placed on a petri dish, subjected to forced air drying at 60° C. for twenty four hours and heat treated in an electric furnace at 650° C. in the air for one hour to obtain a powdery $SrZrO_3$ supporting a $La_{0.90}Sr_{0.10}Fe_{0.90}Pt_{0.05}Rh_{0.05}O_3$ perovskite-type composite oxide.

The resulting powder was prepared so as to have a weight ratio of the perovskite-type composite oxide to $SrZrO_3$ of 2:8.

2)-2 Production of Outer Layer and Exhaust Gas Purifying Catalyst

To the above prepared powdery $SrZrO_3$ supporting the perovskite-type composite oxide was added the powdery Pt—Rh supporting zirconia composite oxide (Production Example A1-2) comprising a $Zr_{0.79}Ce_{0.16}La_{0.01}Nd_{0.04}$ oxide supporting 0.15% by weight of Pt and 0.15% by weight of Rh. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm thereby to homogeneously apply, to a surface of the inner layer, 75 g of $SrZrO_3$ supporting the perovskite-type composite oxide and 60 g of the Pt—Rh supporting zirconia composite oxide per one liter of the honeycomb carrier. The resulting article dried at 100° C. and baked at 500° C. to form an outer layer. Thus, an exhaust gas purifying catalyst was produced.

The resulting exhaust gas purifying catalyst contained 0.06 g of Pt and 0.20 g of Pd in the inner layer, and 0.68 g (0.59 g in the perovskite-type composite oxide, 0.09 g on the zirconia composite oxide) of Pt and 0.40 g (0.31 g in the perovskite-type composite oxide, 0.09 g on the zirconia composite oxide) of Rh in the outer layer, respectively, per one liter of the honeycomb carrier.

Example RC-8

1) Formation of Inner Layer

To the powdery Pd supporting gamma-alumina (Production Example C11-1) supporting 1.60% by weight of Pd were added the powdery ceria composite oxide (Production Example B3) comprising a $Ce_{0.60}Zr_{0.30}Y_{0.10}$ oxide and the powdery $BaSO_4$. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm so as to homogeneously apply 50 g of the Pd supporting gamma-alumina, 30 g of the ceria composite oxide, and 20 g of $BaSO_4$ per one liter of the honeycomb carrier. The resulting article dried at 100° C. and baked at 500° C. to form an inner layer.

2) Formation of Outer Layer

2)-1 Supporting of Platinum Containing Perovskite-Type Composite Oxide by Thermostable Oxide

| | |
|---|---|
| Lanthanum ethoxyethylate | 36.6 g (0.090 mol) |
| Strontium ethoxyethylate | 2.7 g (0.010 mol) |
| Iron ethoxyethylate | 30.7 g (0.095 mol) |

The above listed components were charged in a 500 mL round bottomed flask and dissolved in 200 mL of toluene with stirring to obtain a mixed alkoxide solution. Separately, 1.965 g (0.005 mol) of platinum acetylacetonate was dissolved in 100 mL of toluene, and the resulting solution was added to the mixed alkoxide solution in the round bottomed flask to obtain a LaSrFePt containing homogeneous mixed solution.

Separately, the powdery zirconia composite oxide (Production Example A7) comprising a $Zr_{0.60}Ce_{0.30}La_{0.05}Y_{0.05}$ oxide was dispersed in 200 mL of toluene and the homogeneous mixed solution in the round bottomed flask was added, followed by stirring.

Next, 200 mL of deionized water was added dropwise to the solution over about fifteen minutes. As a result, a brown viscous precipitate was formed upon hydrolysis.

After stirring at room temperature for two hours, the toluene and water were distilled off under reduced pressure to obtain a zirconia composite oxide with a dispersed pre-crystallization composition of a LaSrFePt composite oxide. Next, the zirconia composite oxide with the dispersed pre-crystallization composition was placed on a petri dish, subjected to forced air drying at 60° C. for twenty four hours and heat treated in an electric furnace at 650° C. in the air for one hour to obtain a zirconia composite oxide comprising a $Zr_{0.60}Ce_{0.30}La_{0.05}Y_{0.05}$ oxide supporting a $La_{0.90}Sr_{0.10}Fe_{0.95}Pt_{0.05}O_3$ perovskite-type composite oxide.

The resulting powder was prepared so as to have a weight ratio of the perovskite-type composite oxide to the zirconia composite oxide of 2:8.

2)-2 Production of Outer Layer and Exhaust Gas Purifying Catalyst

To the above prepared powdery zirconia composite oxide supporting the perovskite-type composite oxide were added the powdery Pt supporting ceria composite oxide (Production Example B3-2) comprising a $Ce_{0.60}Zr_{0.30}Y_{0.10}$ oxide supporting 0.33% by weight of Pt and the powdery Pt—Rh supporting theta-alumina (Production Example C8-6) comprising theta-alumina supporting 0.33% by weight of Pt and 1.33% by weight of Rh. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm thereby to homogeneously apply, to a surface of the inner layer, 63 g of the zirconia composite oxide supporting the perovskite-type composite oxide, 30 g of the Pt supporting ceria composite oxide, and 30 g of the Pt—Rh supporting theta-alumina per one liter of the honeycomb carrier. The resulting article dried at 100° C. and baked at 500° C. to form an outer layer. Thus, an exhaust gas purifying catalyst was produced.

The exhaust gas purifying catalyst contained 0.80 g of Pd in the inner layer, and 0.70 g of Pt and 0.40 g of Rh in the outer layer, respectively, per one liter of the honeycomb carrier.

Example RC-9

1) Formation of Inner Layer

1)-1 Supporting of Palladium Containing Perovskite-Type Composite Oxide by Thermostable Oxide

| | |
|---|---|
| Lanthanum ethoxyethylate | 40.6 g (0.100 mol) |
| Iron ethoxyethylate | 30.7 g (0.095 mol) |

The above listed components were charged in a 500 mL round bottomed flask and dissolved in 200 mL of toluene with stirring to obtain a mixed alkoxide solution. Separately, 1.52 g (0.005 mol) of palladium acetylacetonate was dissolved in 100 mL of toluene, and the resulting solution was added to the mixed alkoxide solution in the round bottomed flask to obtain a LaFePd containing homogeneous mixed solution.

Separately, the powdery zirconia composite oxide (Production Example A4) comprising a $Zr_{0.65}Ce_{0.30}La_{0.02}Y_{0.03}$ oxide was dispersed in 200 mL of toluene and the homogeneous mixed solution in the round bottomed flask was added, followed by stirring.

Next, 200 mL of deionized water was added dropwise to the solution over about fifteen minutes. As a result, a brown viscous precipitate was formed upon hydrolysis.

After stirring at room temperature for two hours, the toluene and water were distilled off under reduced pressure to obtain a zirconia composite oxide with a dispersed pre-crystallization composition of a LaFePd composite oxide. Next, the zirconia composite oxide with the dispersed pre-crystallization composition was placed on a petri dish, subjected to forced air drying at 60° C. for twenty four hours and heat treated in an electric furnace at 650° C. in the air for one hour to obtain a powdery zirconia composite oxide comprising a $Zr_{0.65}Ce_{0.30}La_{0.02}Y_{0.03}$ oxide supporting a $La_{1.00}Fe_{0.95}Pd_{0.05}O_3$ perovskite-type composite oxide.

The resulting powder was prepared so as to have a weight ratio of the perovskite-type composite oxide to the zirconia composite oxide of 2:8.

1)-2 Production of Inner Layer

To the above prepared powdery zirconia composite oxide supporting the perovskite-type composite oxide were added the powdery Pt supporting ceria composite oxide (Production Example B1-2) comprising a $Ce_{0.60}Zr_{0.30}Y_{0.10}$ oxide supporting 0.50% by weight of Pt and the powdery lanthanum containing theta-alumina (Production Example C3) containing 4.0% by weight of lanthanum. The resulting mixture was further mixed with deionized water and then mixed with alumina sol to form a slurry. The slurry was injected into a honeycomb cordierite carrier having a size of 6 mil per 400 cells, a diameter of 86 mm and a length of 104 mm so as to homogeneously apply 50 g of zirconia composite oxide supporting the perovskite-type composite oxide, 30 g of the Pt supporting ceria composite oxide, and 30 g of the lanthanum containing theta-alumina per one liter of the honeycomb carrier. The resulting article dried at 100° C. and baked at 500° C. to form an inner layer.

2) Formation of Outer Layer

2)-1 Supporting of Rhodium Containing Perovskite-Type Composite Oxide by Thermostable Oxide

| | |
|---|---|
| Lanthanum ethoxyethylate | 40.6 g (0.100 mol) |
| Iron ethoxyethylate | 12.3 g (0.038 mol) |
| Aluminum ethoxyethylate | 11.2 g (0.038 mol) |
| Manganese ethoxyethylate | 4.4 g (0.019 mol) |

The above listed components were charged in a 500 mL round bottomed flask and dissolved in 200 mL of toluene with stirring to obtain a mixed alkoxide solution. Separately, 2.00 g (0.005 mol) of rhodium acetylacetonate was dissolved in 100 mL of toluene, and the resulting solution was added to the mixed alkoxide solution in the round bottomed flask to obtain a LaFeAlMnRh containing homogeneous mixed solution.

Separately, the powdery $SrZrO_3$ (Production Example D1) was dispersed in 200 mL of toluene and the homogeneous mixed solution in the round bottomed flask was added, followed by stirring.

Next, 200 mL of deionized water was added dropwise to the solution over about fifteen minutes. As a result, a brown viscous precipitate was formed upon hydrolysis.

After stirring at room temperature for two hours, the toluene and water were distilled off under reduced pressure to obtain $SrZrO_3$ with a dispersed pre-crystallization composition of a LaFeAlMnRh composite oxide. Next, $SrZrO_3$ with the dispersed pre-crystallization composition was placed on a petri dish, subjected to forced air drying at 60° C. for twenty four hours and heat treated in an electric furnace at 650° C. in the air for one hour to obtain a powdery $SrZrO_3$ supporting a $La_{1.00}Fe_{0.38}Al_{0.38}Mn_{0.19}Rh_{0.05}O_3$ perovskite-type composite oxide.

The resulting powder was prepared so as to have a weight ratio of the perovskite-type composite oxide to SrZrO$_3$ of 2:8.

2)-2 Production of Outer Layer and Exhaust Gas Purifying Catalyst

To the above prepared powdery SrZrO$_3$ supporting the perovskite-type composite oxide was added the powdery Pt—Rh supporting lanthanum containing theta-alumina (Production Example C3-1) comprising a lanthanum containing theta-alumina (lanthanum content: 4.0% by weight) supporting 1.00% by weight of Pt and 0.17% by weight of Rh. The resulting mixture was further mixed with deionized water and then mixed with alumina sol to form a slurry. The slurry was injected into a honeycomb cordierite carrier having a size of 6 mil per 400 cells, a diameter of 86 mm and a length of 104 mm thereby to homogeneously apply, to a surface of the inner layer, 50 g of SrZrO$_3$ supporting the perovskite-type composite oxide and 60 g of the Pt—Rh supporting lanthanum containing theta-alumina per one liter of the honeycomb carrier. The resulting article dried at 100° C. and baked at 500° C. to form an outer layer. Thus, an exhaust gas purifying catalyst was produced.

The resulting exhaust gas purifying catalyst contained 0.75 g of Pt, 0.22 g of Pd, and 0.32 g of Rh per one liter of the honeycomb carrier.

Example RC-10

1) Formation of Inner Layer

1)-1 Supporting of Palladium Containing Perovskite-Type Composite Oxide by Thermostable Oxide

| | |
|---|---|
| Lanthanum ethoxyethylate | 40.6 g (0.100 mol) |
| Iron ethoxyethylate | 31.0 g (0.096 mol) |

The above listed components were charged in a 500 mL round bottomed flask and dissolved in 200 mL of toluene with stirring to obtain a mixed alkoxide solution. Separately, 1.22 g (0.004 mol) of palladium acetylacetonate was dissolved in 100 mL of toluene, and the resulting solution was added to the mixed alkoxide solution in the round bottomed flask to obtain a LaFePd containing homogeneous mixed solution.

Separately, the powdery lanthanum containing theta-alumina (Production Example C3) containing 4.0% by weight of lanthanum was dispersed in 200 mL of toluene and the homogeneous mixed solution in the round bottomed flask was added, followed by stirring.

Next, 200 mL of deionized water was added dropwise to the solution over about fifteen minutes. As a result, a brown viscous precipitate was formed upon hydrolysis.

After stirring at room temperature for two hours, the toluene and water were distilled off under reduced pressure to obtain a lanthanum containing theta-alumina with a dispersed pre-crystallization composition of a LaFePd composite oxide. Next, the lanthanum containing theta-alumina with the dispersed pre-crystallization composition was placed on a petri dish, subjected to forced air drying at 60° C. for twenty four hours and heat treated in an electric furnace at 650° C. in the air for one hour to obtain a powdery lanthanum containing theta-alumina supporting a La$_{1.00}$Fe$_{0.96}$Pd$_{0.04}$O$_3$ perovskite-type composite oxide.

The resulting powder was prepared so as to have a weight ratio of the perovskite-type composite oxide to the lanthanum containing theta-alumina of 2:8.

1)-2 Production of Inner Layer

To the above prepared lanthanum containing theta-alumina supporting the perovskite-type composite oxide was added the powdery lanthanum containing theta-alumina (Production Example C3) containing 4.0% by weight of lanthanum. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm so as to homogeneously apply 75 g of the lanthanum containing theta-alumina supporting the perovskite-type composite oxide and 90 g of the lanthanum containing theta-alumina per one liter of the honeycomb carrier. The resulting article dried at 100° C. and baked at 500° C. to form an inner layer.

2) Formation of Outer Layer

2)-1 Supporting of Platinum Containing Perovskite-Type Composite Oxide by Thermostable Oxide

| | |
|---|---|
| Lanthanum ethoxyethylate | 38.6 g (0.095 mol) |
| Iron ethoxyethylate | 18.4 g (0.057 mol) |
| Manganese ethoxyethylate | 8.9 g (0.038 mol) |

The above listed components were charged in a 500 mL round bottomed flask and dissolved in 200 mL of toluene with stirring to obtain a mixed alkoxide solution. Separately, 1.04 g (0.005 mol) of silver acetylacetonate and 1.965 g (0.005 mol) of platinum acetylacetonate were dissolved in 200 mL of toluene, and the resulting solution was added to the mixed alkoxide solution in the round bottomed flask to obtain a LaAgFeMnPt containing homogeneous mixed solution.

Separately, the powdery zirconia composite oxide (Production Example A10) comprising a Zr$_{0.50}$Ce$_{0.40}$La$_{0.05}$Y$_{0.05}$ oxide was dispersed in 200 mL of toluene and the homogeneous mixed solution in the round bottomed flask was added, followed by stirring.

Next, 200 mL of deionized water was added dropwise to the solution over about fifteen minutes. As a result, a brown viscous precipitate was formed upon hydrolysis.

After stirring at room temperature for two hours, the toluene and water were distilled off under reduced pressure to obtain a zirconia composite oxide with a dispersed pre-crystallization composition of a LaAgFeMnPt composite oxide. Next, the zirconia composite oxide with the dispersed pre-crystallization composition was placed on a petri dish, subjected to forced air drying at 60° C. for twenty four hours and heat treated in an electric furnace at 650° C. in the air for one hour to obtain a powdery zirconia composite oxide comprising a Zr$_{0.50}$Ce$_{0.40}$La$_{0.05}$Y$_{0.05}$ oxide supporting a La$_{0.95}$Ag$_{0.05}$Fe$_{0.57}$Mn$_{0.38}$Pt$_{0.05}$O$_3$ perovskite-type composite oxide.

The resulting powder was prepared so as to have a weight ratio of the perovskite-type composite oxide to the zirconia composite oxide of 2:8.

2)-2 Production of Outer Layer and Exhaust Gas Purifying Catalyst

To the powdery zirconia composite oxide supporting the perovskite-type composite oxide were added the powdery Rh supporting zirconia composite oxide (Production Example A1-1) comprising a $Zr_{0.79}Ce_{0.16}La_{0.01}Nd_{0.04}$ oxide supporting 0.50% by weight of Rh, the powdery Pt supporting ceria composite oxide (Production Example B1-6) comprising a $Ce_{0.60}Zr_{0.30}Y_{0.10}$ oxide supporting 0.10% by weight of Pt and the powdery Pt—Rh supporting gamma-alumina (Production Example C10-1) comprising lanthanum containing gamma-alumina (lanthanum content: 4.0% by weight) supporting 0.33% by weight of Pt and 0.25% by weight of Rh. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm thereby to homogeneously apply, to a surface of the inner layer, 50 g of the zirconia composite oxide supporting the perovskite-type composite oxide, 30 g of the Rh supporting zirconia composite oxide, 60 g of the Pt supporting ceria composite oxide, and 60 g of the Pt—Rh supporting lanthanum containing gamma-alumina per one liter of the honeycomb carrier. The resulting article dried at 100° C. and baked at 500° C. to form an outer layer. Thus, an exhaust gas purifying catalyst was produced.

The resulting exhaust gas purifying catalyst contained 0.65 g of Pt, 0.26 g of Pd, and 0.30 g of Rh per one liter of the honeycomb carrier.

Example RC-11

1) Formation of Inner Layer

1)-1 Supporting of Palladium Containing Perovskite-Type Composite Oxide by Thermostable Oxide

| | |
|---|---|
| Lanthanum ethoxyethylate | 40.6 g (0.100 mol) |
| Iron ethoxyethylate | 30.7 g (0.095 mol) |

The above listed components were charged in a 500 mL round bottomed flask and dissolved in 200 mL of toluene with stirring to obtain a mixed alkoxide solution. Separately, 1.52 g (0.005 mol) of palladium acetylacetonate was dissolved in 100 mL of toluene, and the resulting solution was added to the mixed alkoxide solution in the round bottomed flask to obtain a LaFePd containing homogeneous mixed solution.

Separately, the powdery lanthanum containing theta-alumina (Production Example C3) containing 4.0% by weight of lanthanum was dispersed in 200 mL of toluene and the homogeneous mixed solution in the round bottomed flask was added, followed by stirring.

Next, 200 mL of deionized water was added dropwise to the solution over about fifteen minutes. As a result, a brown viscous precipitate was formed upon hydrolysis.

After stirring at room temperature for two hours, the toluene and water were distilled off under reduced pressure to obtain a lanthanum containing theta-alumina with a dispersed pre-crystallization composition of a LaFePd composite oxide. Next, the lanthanum containing theta-alumina with the dispersed pre-crystallization composition was placed on a petri dish, subjected to forced air drying at 60° C. for twenty four hours and heat treated in an electric furnace at 650° C. in the air for one hour to obtain a powdery lanthanum containing theta-alumina supporting a $La_{1.00}Fe_{0.95}Pd_{0.05}O_3$ perovskite-type composite oxide.

The resulting powder was prepared so as to have a weight ratio of the perovskite-type composite oxide to the lanthanum containing theta-alumina of 1:1.

1)-2 Supporting of Platinum Containing Perovskite-Type Composite Oxide by Thermostable Oxide

| | |
|---|---|
| Lanthanum ethoxyethylate | 36.6 g (0.090 mol) |
| Strontium ethoxyethylate | 2.7 g (0.010 mol) |
| Iron ethoxyethylate | 18.4 g (0.057 mol) |
| Manganese ethoxyethylate | 8.9 g (0.038 mol) |

The above listed components were charged in a 500 mL round bottomed flask and dissolved in 200 mL of toluene with stirring to obtain a mixed alkoxide solution. Separately, 11.48 g (corresponding to 0.975 g (0.005 mol) of Pt) of a dinitrodiammine platinum nitrate solution having a Pt content of 8.50% by mass was dissolved in 100 mL of toluene, and the resulting solution was added to the mixed alkoxide solution in the round bottomed flask to obtain a LaSrFeMnPt containing homogeneous mixed solution.

Separately, the powdery lanthanum containing theta-alumina (Production Example C3) containing 4.0% by weight of lanthanum was dispersed in 200 mL of toluene and the homogeneous mixed solution in the round bottomed flask was added, followed by stirring.

Next, 200 mL of deionized water was added dropwise to the mixture over about fifteen minutes. As a result, a brown viscous precipitate was formed upon hydrolysis.

After stirring at room temperature for two hours, the toluene and water were distilled off under reduced pressure to obtain a powdery lanthanum containing theta-alumina with a dispersed pre-crystallization composition of a LaSrFeMnPt composite oxide. Next, the lanthanum containing theta-alumina with the dispersed pre-crystallization composition was placed on a petri dish, subjected to forced air drying at 60° C. for twenty four hours and heat treated in an electric furnace at 650° C. in the air for one hour to obtain a powdery lanthanum containing theta-alumina supporting a $La_{0.90}Sr_{0.10}Fe_{0.57}Mn_{0.38}Pt_{0.05}O_3$ perovskite-type composite oxide.

The resulting powder was prepared so as to have a weight ratio of the perovskite-type composite oxide to the lanthanum containing theta-alumina of 1:1.

1)-3 Production of Inner Layer

To the above prepared powdery lanthanum containing theta-alumina supporting the palladium containing perovskite-type composite oxide and the powdery lanthanum containing theta-alumina supporting the platinum containing perovskite-type composite oxide were added the powdery lanthanum containing gamma-alumina (Production Example C10) containing 4.0% by weight of lanthanum and the powdery $BaSO_4$. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm so as to homogeneously apply 24 g of the lanthanum containing theta-alumina supporting the palladium containing perovskite-type composite oxide, 20 g of the lanthanum containing theta-alumina supporting the platinum containing perovskite-type composite oxide, 40 g of the lanthanum containing gamma-alumina, and 20 g of $BaSO_4$ per one liter of the honeycomb carrier. The resulting article dried at 100° C. and baked at 500° C. to form an inner layer.

2) Formation of Outer Layer

2)-1 Supporting of Rhodium Containing Perovskite-Type Composite Oxide by Thermostable Oxide

| | |
|---|---|
| Lanthanum ethoxyethylate | 40.6 g (0.100 mol) |
| Iron ethoxyethylate | 24.6 g (0.076 mol) |
| Manganese ethoxyethylate | 4.4 g (0.019 mol) |

The above listed components were charged in a 500 mL round bottomed flask and dissolved in 200 mL of toluene with stirring to obtain a mixed alkoxide solution. Separately, 2.00 g (0.005 mol) of rhodium acetylacetonate was dissolved in 200 mL of toluene, and the resulting solution was added to the mixed alkoxide solution in the round bottomed flask to obtain a LaFeMnRh containing homogeneous mixed solution.

Separately, the powdery $SrZrO_3$ (Production Example D1) was dispersed in 200 mL of toluene and the homogeneous mixed solution in the round bottomed flask was added, followed by stirring.

Next, 200 mL of deionized water was added dropwise to the solution over about fifteen minutes. As a result, a brown viscous precipitate was formed upon hydrolysis.

After stirring at room temperature for two hours, the toluene and water were distilled off under reduced pressure to obtain $SrZrO_3$ with a dispersed pre-crystallization composition of a LaFeMnRh composite oxide. Next, $SrZrO_3$ with the dispersed pre-crystallization composition was placed on a petri dish, subjected to forced air drying at 60° C. for twenty four hours and heat treated in an electric furnace at 650° C. in the air for one hour to obtain $SrZrO_3$ supporting a $La_{1.00}Fe_{0.76}Mn_{0.19}Rh_{0.05}O_3$ perovskite-type composite oxide.

The resulting powder was prepared so as to have a weight ratio of the perovskite-type composite oxide to $SrZrO_3$ of 1:2.

The powdery $SrZrO_3$ supporting the rhodium containing perovskite-type composite oxide was impregnated with a dinitrodiammine platinum nitrate solution, dried at 100° C. and baked at 500° C. to obtain $SrZrO_3$ supporting a Pt supporting rhodium containing perovskite-type composite oxide. The amount of Pt supported of the $SrZrO_3$ supporting the Pt supporting rhodium containing perovskite-type composite oxide was 1.33% by weight based on the rhodium containing perovskite-type composite oxide.

2)-2 Production of Outer Layer and Exhaust Gas Purifying Catalyst

To the above prepared powdery $SrZrO_3$ supporting the Pt supporting rhodium containing perovskite-type composite oxide were added the powdery Pt supporting ceria composite oxide (Production Example B1-2) comprising a $Ce_{0.60}Zr_{0.30}Y_{0.10}$ oxide supporting 0.50% by weight of Pt and the powdery lanthanum containing gamma-alumina (Production Example C10) containing 4.0% by weight of lanthanum. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm thereby to homogeneously apply, to a surface of the inner layer, 45 g of the $SrZrO_3$ supporting the Pt supporting rhodium containing perovskite-type composite oxide, 20 g of the Pt supporting ceria composite oxide, and 50 g of the lanthanum containing gamma-alumina per one liter of the honeycomb carrier. The resulting article dried at 100° C. and baked at 500° C. to form an outer layer. Thus, an exhaust gas purifying catalyst was produced.

The exhaust gas purifying catalyst contained 0.70 g of Pt, 0.26 g of Pd, and 0.32 g of Rh per one liter of the honeycomb carrier.

Example RC-12

1) Formation of Inner Layer

1)-1 Supporting of Palladium Containing Perovskite-Type Composite Oxide by Thermostable Oxide

| | |
|---|---|
| Lanthanum ethoxyethylate | 40.6 g (0.100 mol) |
| Iron ethoxyethylate | 30.7 g (0.095 mol) |

The above listed components were charged in a 500 mL round bottomed flask and dissolved in 200 mL of toluene with stirring to obtain a mixed alkoxide solution. Separately, 1.52 g (0.005 mol) of palladium acetylacetonate was dissolved in 100 mL of toluene, and the resulting solution was added to the mixed alkoxide solution in the round bottomed flask to obtain a LaFePd containing homogeneous mixed solution.

Separately, the powdery lanthanum containing theta-alumina (Production Example C3) containing 4.0% by weight of lanthanum was dispersed in 200 mL of toluene and the homogeneous mixed solution in the round bottomed flask was added, followed by stirring.

Next, 200 mL of deionized water was added dropwise to the solution over about fifteen minutes. As a result, a brown viscous precipitate was formed upon hydrolysis.

After stirring at room temperature for two hours, the toluene and water were distilled off under reduced pressure to obtain a lanthanum containing theta-alumina with a dispersed pre-crystallization composition of a LaFePd composite oxide. Next, the lanthanum containing theta-alumina with the dispersed pre-crystallization composition was placed on a petri dish, subjected to forced air drying at 60° C. for twenty four hours and heat treated in an electric furnace at 650° C. in the air for one hour to obtain a powdery lanthanum containing theta-alumina supporting a $La_{1.00}Fe_{0.95}Pd_{0.05}O_3$ perovskite-type composite oxide.

The resulting powder was prepared so as to have a weight ratio of the perovskite-type composite oxide to the lanthanum containing theta-alumina of 2:8.

1)-2 Supporting of Platinum Containing Perovskite-Type Composite Oxide by Thermostable Oxide

| | |
|---|---|
| Lanthanum ethoxyethylate | 36.6 g (0.090 mol) |
| Calcium ethoxyethylate | 2.2 g (0.010 mol) |
| Iron ethoxyethylate | 30.7 g (0.095 mol) |

The above listed components were charged in a 500 mL round bottomed flask and dissolved in 200 mL of toluene with stirring to obtain a mixed alkoxide solution. Separately, 2.00 g (0.005 mol) of platinum acetylacetonate was dissolved in 200 mL of toluene, and the resulting solution was added to the mixed alkoxide solution in the round bottomed flask to obtain a LaCaFePt containing homogeneous mixed solution.

Separately, the powdery zirconia composite oxide (Production Example A11) comprising a $Zr_{0.60}Ce_{0.30}La_{0.05}$ Nd$_{0.05}$ oxide was dispersed in 200 mL of toluene and the homogeneous mixed solution in the round bottomed flask was added, followed by stirring.

Next, 200 mL of deionized water was added dropwise to the mixture over about fifteen minutes. As a result, a brown viscous precipitate was formed upon hydrolysis.

After stirring at room temperature for two hours, the toluene and water were distilled off under reduced pressure to obtain a powdery zirconia composite oxide with a dispersed pre-crystallization composition of a LaCaFePt composite oxide. Next, the zirconia composite oxide with the dispersed pre-crystallization composition was placed on a petri dish, subjected to forced air drying at 60° C. for twenty four hours and heat treated in an electric furnace at 650° C. in the air for one hour to obtain a powdery zirconia composite oxide comprising a $Zr_{0.60}Ce_{0.30}La_{0.05}Nd_{0.05}$ oxide supporting a $La_{0.90}Ca_{0.10}Fe_{0.95}Pt_{0.05}O_3$ perovskite-type composite oxide.

The resulting powder was prepared so as to have a weight ratio of the perovskite-type composite oxide to the zirconia composite oxide of 2:8.

1)-3 Production of Inner Layer

To the above prepared powdery lanthanum containing theta-alumina supporting the palladium containing perovskite-type composite oxide and the powdery zirconia composite oxide supporting the platinum containing perovskite-type composite oxide were added the powdery Pt supporting ceria composite oxide (Production Example B1-2) comprising a $Ce_{0.60}Zr_{0.30}Y_{0.10}$ oxide supporting 0.50% by weight of Pt and the powdery lanthanum containing theta-alumina (Production Example C3) containing 4.0% by weight of lanthanum. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm so as to homogeneously apply 60 g of the lanthanum containing theta-alumina supporting the palladium containing perovskite-type composite oxide, 30 g of the zirconia composite oxide supporting the platinum containing perovskite-type composite oxide, 20 g of the Pt supporting ceria composite oxide, and 40 g of the lanthanum containing theta-alumina per one liter of the honeycomb carrier. The resulting article dried at 100° C. and baked at 500° C. to form an inner layer.

2) Formation of Outer Layer

2)-1 Supporting of Rhodium Containing Perovskite-Type Composite Oxide by Thermostable Oxide

| Lanthanum ethoxyethylate | 40.6 g (0.100 mol) |
|---|---|
| Aluminum ethoxyethylate | 16.8 g (0.057 mol) |
| Manganese ethoxyethylate | 8.9 g (0.038 mol) |

The above listed components were charged in a 500 mL round bottomed flask and dissolved in 200 mL of toluene with stirring to obtain a mixed alkoxide solution. Separately, 2.00 g (0.005 mol) of rhodium acetylacetonate was dissolved in 100 mL of toluene, and the resulting solution was added to the mixed alkoxide solution in the round bottomed flask to obtain a LaAlMnRh containing homogeneous mixed solution.

Separately, the powdery lanthanum containing theta-alumina (Production Example C3) containing 4.0% by weight of lanthanum was dispersed in 200 mL of toluene and the homogeneous mixed solution in the round bottomed flask was added, followed by stirring.

Next, 200 mL of deionized water was added dropwise to the solution over about fifteen minutes. As a result, a brown viscous precipitate was formed upon hydrolysis.

After stirring at room temperature for two hours, the toluene and water were distilled off under reduced pressure to obtain a lanthanum containing theta-alumina with a dispersed pre-crystallization composition of a LaAlMnRh composite oxide. Next, the lanthanum containing theta-alumina with the dispersed pre-crystallization composition was placed on a petri dish, subjected to forced air drying at 60° C. for twenty four hours and heat treated in an electric furnace at 650° C. in the air for one hour to obtain a powdery lanthanum containing theta-alumina supporting a $La_{1.00}Al_{0.57}Mn_{0.38}Rh_{0.05}O_3$ perovskite-type composite oxide.

The resulting powder was prepared so as to have a weight ratio of the perovskite-type composite oxide to the lanthanum containing theta-alumina of 1:2.

2)-2 Supporting of Platinum Containing Perovskite-Type Composite Oxide by Thermostable Oxide

| Lanthanum ethoxyethylate | 36.6 g (0.090 mol) |
|---|---|
| Calcium ethoxyethylate | 2.2 g (0.010 mol) |
| Iron ethoxyethylate | 30.7 g (0.095 mol) |

The above listed components were charged in a 500 mL round bottomed flask and dissolved in 200 mL of toluene with stirring to obtain a mixed alkoxide solution. Separately, 2.00 g (0.005 mol) of platinum acetylacetonate was dissolved in 200 mL of toluene, and the resulting solution was added to the mixed alkoxide solution in the round bottomed flask to obtain a LaCaFePt containing homogeneous mixed solution.

A powdery zirconia composite oxide (Production Example A11) comprising a $Zr_{0.60}Ce_{0.30}La_{0.05}Nd_{0.05}$ oxide was dispersed in 200 mL of toluene and the homogeneous mixed solution in the round bottomed flask was added, followed by stirring.

Next, 200 mL of deionized water was added dropwise to the solution over about fifteen minutes. Then, a brown viscous precipitate was formed upon hydrolysis.

After stirring at room temperature for two hours, the toluene and water were distilled off under reduced pressure to obtain a zirconia composite oxide with a dispersed pre-crystallization composition of a LaCaFePt composite oxide. Next, the powdery zirconia composite oxide with the dispersed pre-crystallization composition was placed on a petri dish, subjected to forced air drying at 60° C. for twenty four hours and heat treated in an electric furnace at 650° C. in the air for one hour to obtain a powdery zirconia composite oxide comprising $Zr_{0.60}Ce_{0.30}La_{0.05}Nd_{0.05}$ oxide supporting a $La_{0.90}Ca_{0.10}Fe_{0.95}Pt_{0.05}O_3$ perovskite-type composite oxide.

The resulting powder was prepared so as to have a weight ratio of the perovskite-type composite oxide to the zirconia composite oxide of 2:8.

2)-3 Production of Outer Layer and Exhaust Gas Purifying Catalyst

To the above prepared powdery lanthanum containing theta-alumina supporting the rhodium containing perovskite-type composite oxide and the powdery zirconia composite oxide supporting the platinum containing perovskite-type composite oxide were added the powdery Pt supporting ceria composite oxide (Production Example B1-2) comprising a $Ce_{0.60}Zr_{0.30}Y_{0.10}$ oxide supporting 0.50% by weight of Pt and the powdery lanthanum containing theta-alumina (Production Example C3) containing 4.0% by weight of lanthanum. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm thereby to homogeneously apply, to a surface of the inner layer, 45 g of the lanthanum containing theta-alumina supporting the rhodium containing perovskite-type composite oxide, 30 g of the zirconia composite oxide supporting the platinum containing perovskite-type composite oxide, 40 g of the Pt supporting ceria composite oxide, and 30 g of the lanthanum containing theta-alumina per one liter of the honeycomb carrier. The resulting article dried at 100° C. and baked at 500° C. to form an outer layer. Thus, an exhaust gas purifying catalyst was produced.

The resulting exhaust gas purifying catalyst contained 0.78 g of Pt, 0.26 g of Pd, and 0.34 g of Rh per one liter of the honeycomb carrier.

Example RC-13

1) Formation of Inner Layer

1)-1 Supporting of Palladium Containing Perovskite-Type Composite Oxide by Thermostable Oxide

| Lanthanum methoxypropylate | 40.6 g (0.100 mol) |
|---|---|
| Iron methoxypropylate | 30.7 g (0.095 mol) |

The above listed components were charged in a 1000 mL round bottomed flask and dissolved in 200 mL of toluene with stirring to obtain a mixed alkoxide solution. Separately, 1.52 g (0.005 mol) of palladium acetylacetonate was dissolved in 100 mL of toluene, and the resulting solution was added to the mixed alkoxide solution in the round bottomed flask to obtain a LaFePd containing homogeneous mixed solution.

A powdery lanthanum containing theta-alumina (Production Example C3) containing 4.0% by weight of lanthanum was dispersed in 200 mL of toluene and the homogeneous mixed solution in the round bottomed flask was added, followed by stirring.

Next, 200 mL of deionized water was added dropwise to the solution over about fifteen minutes. Then, a brown viscous precipitate was formed upon hydrolysis.

After stirring at room temperature for two hours, the toluene and water were distilled off under reduced pressure, to obtain a lanthanum containing theta-alumina with a diepersed pre-crystallization composition of a LaFePd composite oxide. Next, the lanthanum containing theta-alumina with the dispersed pre-crystallization composition was placed on a petri dish, subjected to forced air drying at 60° C. for twenty four hours and heat treated in an electric furnace at 650° C. in the air for one hour to obtain a powdery lanthanum containing theta-alumina supporting a $La_{1.00}Fe_{0.95}Pd_{0.05}O_3$ perovskite-type composite oxide.

The resulting powder was prepared so as to have a weight ratio of the perovskite-type composite oxide to the lanthanum containing theta-alumina of 1:1.

1)-2 Production of Inner Layer

To the above prepared lanthanum containing theta-alumina supporting the palladium containing perovskite-type composite oxide were added the powdery Pt supporting ceria composite oxide (Production Example B1-7) comprising a $Ce_{0.60}Zr_{0.30}Y_{0.10}$ oxide supporting 0.33% by weight of Pt and the powdery theta-alumina. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm so as to homogeneously apply 28 g of the lanthanum containing theta-alumina supporting the palladium containing perovskite-type composite oxide, 60 g of the Pt supporting ceria composite oxide, and 70 g of the theta-alumina per one liter of the honeycomb carrier. The resulting article dried at 100° C. and baked at 500° C. to form an inner layer.

2) Production of Outer Layer and Exhaust Gas Purifying Catalyst

The powdery Pt—Rh supporting zirconia composite oxide (Production Example A6-4) comprising a $Zr_{0.76}Ce_{0.18}La_{0.02}Nd_{0.04}$ oxide supporting 0.27% by weight of Pt and 1.33% by weight of Rh, the powdery Pt supporting ceria composite oxide (Production Example B1-7) comprising a $Ce_{0.60}Zr_{0.30}Y_{0.10}$ oxide supporting 0.33% by weight of Pt and the powdery Pt supporting theta-alumina (Production Example C6) comprising a theta-alumina supporting 0.31% by weight of Pt were mixed. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm thereby to homogeneously apply, to a surface of the inner layer, 30 g of the Pt—Rh supporting zirconia composite oxide, 60 g of the Pt supporting ceria composite oxide, and 70 g of the Pt supporting theta-alumina per one liter of the honeycomb carrier. The resulting article dried at 100° C. and baked at 500° C. to form an outer layer. Thus, an exhaust gas purifying catalyst was produced.

The exhaust gas purifying catalyst contained 0.10 g of Pt and 0.30 g of Pd in the inner layer, and 0.50 g of Pt and 0.40 g of Rh in the outer layer, respectively, per one liter of the honeycomb carrier.

Example RC-14

1) Formation of Inner Layer

1)-1 Supporting of Palladium Containing Perovskite-Type Composite Oxide by Thermostable Oxide

| Lanthanum methoxypropylate | 40.6 g (0.100 mol) |
|---|---|
| Iron methoxypropylate | 30.7 g (0.095 mol) |

The above listed components were charged in a 1000 mL round bottomed flask and dissolved in 200 mL of toluene with stirring to obtain a mixed alkoxide solution. Separately, 1.52 g (0.005 mol) of palladium acetylacetonate was dissolved in 100 mL of toluene, and the resulting solution was added to the mixed alkoxide solution in the round bottomed flask to obtain a LaFePd containing homogeneous mixed solution.

Separately, the powdery lanthanum containing theta-alumina (Production Example C3) containing 4.0% by weight of lanthanum was dispersed in 200 mL of toluene and the homogeneous mixed solution in the round bottomed flask was added, followed by stirring.

Next, 200 mL of deionized water was added dropwise to the solution over about fifteen minutes. Then, a brown viscous precipitate was formed upon hydrolysis.

After stirring at room temperature for two hours, the toluene and water were distilled off under reduced pressure, to obtain a lanthanum containing theta-alumina with a dispersed pre-crystallization composition of a LaFePd composite oxide. Next, the lanthanum containing theta-alumina with the dispersed pre-crystallization composition was placed on a petri dish, subjected to forced air drying at 60° C. for twenty four hours and heat treated in an electric furnace at 650° C. in the air for one hour to obtain a powdery lanthanum containing theta-alumina supporting a $La_{1.00}Fe_{0.95}Pd_{0.05}O_3$ perovskite-type composite oxide.

The resulting powder was prepared so as to have a weight ratio of the perovskite-type composite oxide to the lanthanum containing theta-alumina of 1:1.

1)-2 Production of Inner Layer

To the above prepared lanthanum containing theta-alumina supporting the palladium containing perovskite-type composite oxide were added the powdery Pt supporting ceria composite oxide (Production Example B1-8) comprising a $Ce_{0.60}Zr_{0.30}Y_{0.10}$ oxide supporting 0.67% by weight of Pt and the powdery theta-alumina. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm so as to homogeneously apply 30 g of the lanthanum containing theta-alumina supporting the palladium containing perovskite-type composite oxide, 30 g of the Pt supporting ceria composite oxide, and 80 g of the theta-alumina per one liter of the honeycomb carrier. The resulting article dried at 100° C. and baked at 500° C. to form an inner layer.

2) Production of Outer Layer and Exhaust Gas Purifying Catalyst

The powdery Pt—Rh supporting zirconia composite oxide (Production Example A3-1) comprising a $Zr_{0.50}Ce_{0.40}La_{0.05}Nd_{0.05}$ oxide supporting 0.27% by weight of Pt and 1.33% by weight of Rh, the powdery Pt supporting ceria composite oxide (Production Example B1-7) comprising a $Ce_{0.60}Zr_{0.30}Y_{0.10}$ oxide supporting 0.33% by weight of Pt and the powdery Pt—Rh supporting theta-alumina (Production Example C8-5) comprising theta-alumina supporting 0.43% by weight of Pt and 0.21% by weight of Rh were mixed. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm thereby to homogeneously apply, to a surface of the inner layer, 30 g of the Pt—Rh supporting zirconia composite oxide, 60 g of the Pt supporting ceria composite oxide, and 70 g of the Pt—Rh supporting theta-alumina per one liter of the honeycomb carrier. The resulting article dried at 100° C. and baked at 500° C. to form an outer layer. Thus, an exhaust gas purifying catalyst was produced.

The exhaust gas purifying catalyst contained 0.20 g of Pt and 0.33 g of Pd in the inner layer, and 0.58 g of Pt and 0.55 g of Rh in the outer layer, respectively, per one liter of the honeycomb carrier.

Example RC-15

1) Formation of Inner Layer

1)-1 Supporting of Palladium Containing Perovskite-Type Composite Oxide by Thermostable Oxide

| | |
|---|---|
| Lanthanum methoxypropylate | 40.6 g (0.100 mol) |
| Iron methoxypropylate | 30.7 g (0.095 mol) |

The above listed components were charged in a 1000 mL round bottomed flask and dissolved in 200 mL of toluene with stirring to obtain a mixed alkoxide solution. Separately, 1.52 g (0.005 mol) of palladium acetylacetonate was dissolved in 100 mL of toluene, and the resulting solution was added to the mixed alkoxide solution in the round bottomed flask to obtain a LaFePd containing homogeneous mixed solution.

Separately, the powdery barium containing theta-alumina (Production Example C5) containing 4.0% by weight of barium was dispersed in 200 mL of toluene and the homogeneous mixed solution in the round bottomed flask was added, followed by stirring.

Next, 200 mL of deionized water was added dropwise to the solution over about fifteen minutes. Then, a brown viscous precipitate was formed upon hydrolysis.

After stirring at room temperature for two hours, the toluene and water were distilled off under reduced pressure, to obtain a barium containing theta-alumina with a dispersed pre-crystallization composition of a LaFePd composite oxide. Next, the barium containing theta-alumina with the dispersed pre-crystallization composition was placed on a petri dish, subjected to forced air drying at 60° C. for twenty four hours and heat treated in an electric furnace at 650° C. in the air for one hour to obtain a powdery barium containing theta-alumina supporting a $La_{1.00}Fe_{0.95}Pd_{0.05}O_3$ perovskite-type composite oxide.

The resulting powder was prepared so as to have a weight ratio of the perovskite-type composite oxide to the barium containing theta-alumina of 1:4.

1)-2 Production of Inner Layer

To the above prepared barium containing theta-alumina supporting the palladium containing perovskite-type composite oxide was added the powdery Pt supporting ceria composite oxide (Production Example B1-8) comprising a $Ce_{0.60}Zr_{0.30}Y_{0.10}$ oxide supporting 0.67% by weight of Pt. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm so as to homogeneously apply 46 g of the barium containing theta-alumina supporting the palladium containing perovskite-type composite oxide and 45 g of the Pt supporting ceria composite oxide per one liter of the honeycomb carrier. The resulting article dried at 100° C. and baked at 500° C. to form an inner layer.

2) Formation of Outer Layer

2)-1 Supporting of Rhodium Containing Perovskite-Type Composite Oxide by Thermostable Oxide

| | |
|---|---|
| Lanthanum methoxypropylate | 40.6 g (0.100 mol) |
| Iron methoxypropylate | 30.7 g (0.095 mol) |

The above listed components were charged in a 1000 mL round bottomed flask and dissolved in 200 mL of toluene with stirring to obtain a mixed alkoxide solution. Separately, 2.00 g (0.005 mol) of rhodium acetylacetonate was dissolved in 100 mL of toluene, and the resulting solution was added to the mixed alkoxide solution in the round bottomed flask to obtain a LaFeRh containing homogeneous mixed solution.

Separately, the powdery theta-alumina was dispersed in 200 mL of toluene and the homogeneous mixed solution in the round bottomed flask was added, followed by stirring.

Next, 200 mL of deionized water was added dropwise to the solution over about fifteen minutes. As a result, a brown viscous precipitate was formed upon hydrolysis.

After stirring at room temperature for two hours, the toluene and water were distilled off under reduced pressure to obtain a theta-alumina with a dispersed pre-crystallization composition of a LaFeRh composite oxide. Next, the theta-alumina with the dispersed pre-crystallization composition was placed on a petri dish, subjected to forced air drying at 60° C. for twenty four hours and heat treated in an electric furnace at 650° C. in the air for one hour to obtain a powdery theta-alumina supporting a $La_{1.00}Fe_{0.95}Rh_{0.05}O_3$ perovskite-type composite oxide.

The resulting powder was prepared so as to have a weight ratio of the perovskite-type composite oxide to the theta-alumina of 1:3.

2)-2 Production of Outer Layer and Exhaust Gas Purifying Catalyst

To the above prepared powdery theta-alumina supporting the rhodium containing perovskite-type composite oxide was added the powdery Pt supporting ceria composite oxide (Production Example B1-8) comprising a $Ce_{0.60}Zr_{0.30}Y_{0.10}$ oxide supporting 0.67% by weight of Pt. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm thereby to homogeneously apply, to a surface of the inner layer, 38 g of the theta-alumina supporting the rhodium containing perovskite-type composite oxide and 60 g of the Pt supporting ceria composite oxide per one liter of the honeycomb carrier. The resulting article dried at 100° C. and baked at 500° C. to form an outer layer. Thus, an exhaust gas purifying catalyst was produced.

The exhaust gas purifying catalyst contained 0.30 g of Pt and 0.20 g of Pd in the inner layer, and 0.40 g of Pt and 0.20 g of Rh in the outer layer, respectively, per one liter of the honeycomb carrier.

Example RC-16

1) Formation of Inner Layer

1)-1 Supporting of Palladium Containing Perovskite-Type Composite Oxide by Thermostable Oxide

| Lanthanum methoxypropylate | 40.6 g (0.100 mol) |
| Iron methoxypropylate | 30.7 g (0.095 mol) |

The above listed components were charged in a 1000 mL round bottomed flask and dissolved in 200 mL of toluene with stirring to obtain a mixed alkoxide solution. Separately, 1.52 g (0.005 mol) of palladium acetylacetonate was dissolved in 100 mL of toluene, and the resulting solution was added to the mixed alkoxide solution in the round bottomed flask to obtain a LaFePd containing homogeneous mixed solution.

Separately, the powdery theta-alumina was dispersed in 200 mL of toluene and the homogeneous mixed solution in the round bottomed flask was added, followed by stirring.

Next, 200 mL of deionized water was added dropwise to the solution over about fifteen minutes. Then, a brown viscous precipitate was formed upon hydrolysis.

After stirring at room temperature for two hours, the toluene and water were distilled off under reduced pressure, to obtain a theta-alumina with a dispersed pre-crystallization composition of a LaFePd composite oxide. Next, the theta-alumina with the dispersed pre-crystallization composition was placed on a petri dish, subjected to forced air drying at 60° C. for twenty four hours and heat treated in an electric furnace at 650° C. in the air for one hour to obtain a powdery theta-alumina supporting a $La_{1.00}Fe_{0.95}Pd_{0.05}O_3$ perovskite-type composite oxide.

The resulting powder was prepared so as to have a weight ratio of the perovskite-type composite oxide to the lanthanum containing theta-alumina of 2:3.

1)-2 Production of Inner Layer

To the above prepared theta-alumina supporting the palladium containing perovskite-type composite oxide were added the powdery Pt supporting ceria composite oxide (Production Example B1-7) comprising a $Ce_{0.60}Zr_{0.30}Y_{0.10}$ oxide supporting 0.33% by weight of Pt and the powdery theta-alumina. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm so as to homogeneously apply 40 g of the theta-alumina supporting the palladium containing perovskite-type composite oxide, 30 g of the Pt supporting ceria composite oxide, and 80 g of the theta-alumina per one liter of the honeycomb carrier. The resulting article dried at 100° C. and baked at 500° C. to form an inner layer.

2) Formation of Outer Layer

2)-1 Supporting of Platinum Containing Perovskite-Type Composite Oxide by Thermostable Oxide

| Lanthanum methoxypropylate | 38.6 g (0.090 mol) |
| Calcium methoxypropylate | 2.2 g (0.010 mol) |
| Iron methoxypropylate | 29.1 g (0.090 mol) |

The above listed components were charged in a 1000 mL round bottomed flask and dissolved in 200 mL of toluene with stirring to obtain a mixed alkoxide solution. Separately, 3.93 g (0.010 mol) of platinum acetylacetonate was dissolved in 40 mL of toluene, and the resulting solution was added to the mixed alkoxide solution in the round bottomed flask to obtain a LaCaFePt containing homogeneous mixed solution.

Separately, the powdery theta-alumina was dispersed in 200 mL of toluene and the homogeneous mixed solution in the round bottomed flask was added, followed by stirring.

Next, 200 mL of deionized water was added dropwise to the solution over about fifteen minutes. As a result, a brown viscous precipitate was formed upon hydrolysis.

After stirring at room temperature for two hours, the toluene and water were distilled off under reduced pressure to obtain a theta-alumina with a dispersed pre-crystallization composition of a LaCaFePt composite oxide. Next, the theta-alumina with the dispersed pre-crystallization composition was placed on a petri dish, subjected to forced air drying at 60° C. for twenty four hours and heat treated in an electric furnace at 650° C. in the air for one hour to obtain a powdery theta-alumina supporting a $La_{0.90}Ca_{0.10}Fe_{0.90}Pt_{0.10}O_3$ perovskite-type composite oxide.

The resulting powder was prepared so as to have a weight ratio of the perovskite-type composite oxide to the theta-alumina of 2:3.

2)-2 Production of Outer Layer and Exhaust Gas Purifying Catalyst

To the above prepared powdery theta-alumina supporting the platinum containing perovskite-type composite oxide were added the powdery Pt—Rh supporting zirconia composite oxide (Production Example A12-1) comprising a $Zr_{0.70}Ce_{0.25}La_{0.02}Nd_{0.03}$ oxide supporting 0.75% by weight of Pt and 1.25% by weight of Rh and the powdery Pt supporting ceria composite oxide (Production Example B1-7) comprising a $Ce_{0.60}Zr_{0.30}Y_{0.10}$ oxide supporting 0.33% by weight of Pt. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm thereby to homogeneously apply, to a surface of the inner layer, 3.2 g of the theta-alumina supporting the platinum containing perovskite-type composite oxide, 40 g of the Pt—Rh supporting zirconia composite oxide, and 60 g of the Pt supporting ceria composite oxide per one liter of the honeycomb carrier. The resulting article dried at 100° C. and baked at 500° C. to form an outer layer. Thus, an exhaust gas purifying catalyst was produced.

The resulting exhaust gas purifying catalyst contained 0.10 g of Pt and 0.35 g of Pd in the inner layer, and 0.60 g of Pt and 0.50 g of Rh in the outer layer, respectively, per one liter of the honeycomb carrier.

Comparative Example PX-1

The powdery Pd supporting gamma-alumina (Production Example C11-2) comprising gamma-alumina supporting 1.63% by weight of Pd was mixed with deionized water and then mixed with alumina sol to form a slurry. The slurry was injected into a honeycomb cordierite carrier having a size of 6 mil per 400 cells, a diameter of 80 mm and a length of 95 mm so as to homogeneously apply 200 g of the Pd supporting gamma-alumina per one liter of the honeycomb carrier. The resulting article was dried at 100° C. and baked at 500° C. to obtain an exhaust gas purifying catalyst. The resulting exhaust gas purifying catalyst contained 3.26 g of Pd per one liter of the honeycomb carrier.

Comparative Example PX-2

The powdery Rh supporting gamma-alumina (Production Example C12) comprising gamma-alumina supporting 1.58% by weight of Rh was mixed with deionized water and then mixed with alumina sol to form a slurry. The slurry was injected into a honeycomb cordierite carrier having a size of 6 mil per 400 cells, a diameter of 80 mm and a length of 95 mm so as to homogeneously apply 200 g of the Rh supporting gamma-alumina per one liter of the honeycomb carrier. The resulting article was dried at 100° C. and baked at 500° C. to obtain an exhaust gas purifying catalyst. The resulting exhaust gas purifying catalyst contained 3.16 g of Rh per one liter of the honeycomb carrier.

Comparative Example PX-3

To the powdery Pt—Rh supporting gamma-alumina (Production Example C13-2) comprising gamma-alumina supporting 2.00% by weight of Pt and 0.20% by weight of Rh was added the powdery Pt supporting ceria composite oxide (Production Example B3-3) comprising a $Ce_{0.60}Zr_{0.30}Y_{0.10}$ oxide supporting 0.10% by weight of Pt. The resulting mixture was mixed with deionized water and then mixed with alumina sol to form a slurry. The slurry was injected into a honeycomb cordierite carrier having a size of 6 mil per 400 cells, a diameter of 80 mm and a length of 95 mm so as to homogeneously apply 100 g of the Pt—Rh supporting gamma-alumina and 40 g of the Pt supporting ceria composite oxide per one liter of the honeycomb carrier. The resulting article was dried at 100° C. and baked at 500° C. to obtain an exhaust gas purifying catalyst. The resulting exhaust gas purifying catalyst contained 2.4 g of Pt and 0.20 g of Pd per one liter of the honeycomb carrier.

| Comparative Example QX-5 | |
|---|---|
| Lanthanum ethoxyethylate | 40.6 g (0.100 mol) |
| Iron ethoxyethylate | 30.7 g (0.095 mol) |

The above listed components were charged in a 1000 mL round bottomed flask and dissolved in 200 mL of toluene with stirring to obtain a mixed alkoxide solution. Separately, 1.52 g (0.005 mol) of palladium acetylacetonate was dissolved in 100 mL of toluene, and the resulting solution was added to the mixed alkoxide solution in the round bottomed flask to obtain a LaFePd containing homogeneous mixed solution.

Separately, the powdery zirconia composite oxide (Production Example A13) comprising a $Zr_{0.70}Ce_{0.25}La_{0.02}Y_{0.03}$ oxide was dispersed in 200 mL of toluene and the homogeneous mixed solution in the round bottomed flask was added, followed by stirring.

Next, 200 mL of deionized water was added dropwise to the mixture over about fifteen minutes. As a result, a brown viscous precipitate was formed upon hydrolysis.

After stirring at room temperature for two hours, the toluene and water were distilled off under reduced pressure to obtain a zirconia composite oxide with a dispersed pre-crystallization composition of a LaFePd composite oxide. Next, the zirconia composite oxide with the dispersed pre-crystallization composition was placed on a petri dish, subjected to forced air drying at 60° C. for twenty four hours and heat treated in an electric furnace at 650° C. in the air for one hour to obtain a powdery exhaust gas purifying catalyst comprising a $Zr_{0.70}Ce_{0.25}La_{0.02}Y_{0.03}$ oxide zirconia composite oxide supporting a $La_{1.00}Fe_{0.95}Pd_{0.05}O_3$ perovskite-type composite oxide.

The resulting powder was prepared so as to have a weight ratio of the perovskite-type composite oxide to the zirconia composite oxide of 1:4.

| Comparative Example QX-6 | |
|---|---|
| Lanthanum ethoxyethylate | 40.6 g (0.100 mol) |
| Iron ethoxyethylate | 30.7 g (0.095 mol) |

The above listed components were charged in a 1000 mL round bottomed flask and dissolved in 200 mL of toluene with stirring to obtain a mixed alkoxide solution. Separately, 2.00 g (0.005 mol) of rhodium acetylacetonate was dissolved in 100 mL of toluene, and the resulting solution was added to the mixed alkoxide solution in the round bottomed flask to obtain a LaFeRh containing homogeneous mixed solution.

Separately, the powdery zirconia composite oxide (Production Example A10) comprising a $Zr_{0.50}Ce_{0.40}La_{0.05}Y_{0.05}$ oxide was dispersed in 100 mL of toluene and the homogeneous mixed solution in the round bottomed flask was added, followed by stirring.

Next, 200 mL of deionized water was added dropwise to the mixture over about fifteen minutes. As a result, a brown viscous precipitate was formed upon hydrolysis.

After stirring at room temperature for two hours, the toluene and water were distilled off under reduced pressure to obtain a zirconia composite oxide with a dispersed pre-crystallization composition of a LaFeRh composite oxide. Next, the zirconia composite oxide with the dispersed pre-crystallization composition was placed on a petri dish, subjected to forced air drying at 60° C. for twenty four hours and heat treated in an electric furnace at 650° C. in the air for one hour to obtain a powdery exhaust gas purifying catalyst comprising a $Zr_{0.50}Ce_{0.40}La_{0.05}Y_{0.05}$ oxide zirconia composite oxide supporting a $La_{1.00}Fe_{0.95}Rh_{0.05}O_3$ perovskite-type composite oxide.

The resulting powder was prepared so as to have a weight ratio of the perovskite-type composite oxide to the zirconia composite oxide of 2:3.

| Comparative Example QX-7 | |
| --- | --- |
| Lanthanum methoxypropylate | 36.6 g (0.090 mol) |
| Calcium methoxypropylate | 2.2 g (0.010 mol) |
| Iron methoxypropylate | 29.1 g (0.090 mol) |

The above listed components were charged in a 1000 mL round bottomed flask and dissolved in 200 mL of toluene with stirring to obtain a mixed alkoxide solution. Separately, 3.93 g (0.010 mol) of platinum acetylacetonate was dissolved in 100 mL of toluene, and the resulting solution was added to the mixed alkoxide solution in the round bottomed flask to obtain a LaCaFePt containing homogeneous mixed solution.

Separately, the powdery zirconia composite oxide (Production Example A14) comprising a $Zr_{0.70}Ce_{0.25}Pr_{0.02}Nd_{0.03}$ oxide was dispersed in 100 mL of toluene and the homogeneous mixed solution in the round bottomed flask was added, followed by stirring.

Next, 200 mL of deionized water was added dropwise to the mixture over about fifteen minutes. As a result, a brown viscous precipitate was formed upon hydrolysis.

After stirring at room temperature for two hours, the toluene and water were distilled off under reduced pressure, to obtain a zirconia composite oxide with a dispersed pre-crystallization composition of a LaCaFePt containing perovskite-type composite oxide. Next, the zirconia composite oxide with the dispersed pre-crystallization composition was placed on a petri dish, subjected to forced air drying at 60° C. for twenty four hours and heat treated in an electric furnace at 800° C. in the air for one hour to obtain a powdery exhaust gas purifying catalyst comprising a $Zr_{0.70}Ce_{0.25}Pr_{0.02}Nd_{0.03}$ oxide zirconia composite oxide supporting a $La_{0.90}Ca_{0.10}Fe_{0.90}Pt_{0.10}O_3$ perovskite-type composite oxide.

The resulting powder was prepared so as to have a weight ratio of the perovskite-type composite oxide to the zirconia composite oxide of 1:4.

| Comparative Example QX-8 | |
| --- | --- |
| Lanthanum ethoxyethylate | 40.6 g (0.100 mol) |
| Iron ethoxyethylate | 30.7 g (0.095 mol) |

The above listed components were charged in a 1000 mL round bottomed flask and dissolved in 200 mL of toluene with stirring to obtain a mixed alkoxide solution. Separately, 1.52 g (0.005 mol) of palladium acetylacetonate was dissolved in 100 mL of toluene, and the resulting solution was added to the mixed alkoxide solution in the round bottomed flask to obtain a LaFePd containing homogeneous mixed solution.

Separately, the powdery gamma-alumina was dispersed in 100 mL of toluene and the homogeneous mixed solution in the round bottomed flask was added, followed by stirring.

Next, 200 mL of deionized water was added dropwise to the mixture over about fifteen minutes. As a result, a brown viscous precipitate was formed upon hydrolysis.

After stirring at room temperature for two hours, the toluene and water were distilled off under reduced pressure to obtain a gamma-alumina with a dispersed pre-crystallization composition of a LaFePd composite oxide. Next, the gamma-alumina with the dispersed pre-crystallization composition was placed on a petri dish, subjected to forced air drying at 60° C. for twenty four hours and heat treated in an electric furnace at 650° C. in the air for one hour to obtain a powdery exhaust gas purifying catalyst comprising a gamma-alumina supporting a $La_{1.00}Fe_{0.95}Pd_{0.05}O_3$ perovskite-type composite oxide.

The resulting powder was prepared so as to have a weight ratio of the perovskite-type composite oxide to the gamma-alumina of 1:4.

Comparative Example RX-9

The powdery Pd supporting gamma-alumina (Production Example C11-3) supporting 0.44% by weight of Pd was mixed with deionized water and then mixed with alumina sol to form a slurry. The slurry was injected into a honeycomb cordierite carrier having a size of 3 mil per 600 cells, a diameter of 80 mm and a length of 104 mm so as to homogeneously apply 150 g of the Pd supporting gamma-alumina per one liter of the honeycomb carrier. The resulting article was dried at 100° C. and baked at 500° C. to obtain an exhaust gas purifying catalyst. The resulting exhaust gas purifying catalyst contained 0.66 g of Pd per one liter of the honeycomb carrier.

Comparative Example RX-10

To the powdery Pt—Rh supporting gamma-alumina (Production Example C13-3) comprising gamma-alumina supporting 0.67% by weight of Pd and 0.42% by weight of Rh was added the powdery Pt supporting ceria composite oxide (Production Example B3-4) comprising a $Ce_{0.60}Zr_{0.30}Y_{0.10}$ oxide supporting 0.67% by weight of Pt. The resulting mixture was mixed with deionized water and then mixed with alumina sol to form a slurry. The slurry was injected into a honeycomb cordierite carrier having a size of 3 mil per 600 cells, a diameter of 80 mm and a length of 104 mm so as to homogeneously apply 150 g of the Pt—Rh supporting gamma-alumina and 75 g of the Pt supporting ceria composite oxide per one liter of the honeycomb carrier. The resulting article was dried at 100° C. and baked at 500° C. to obtain an exhaust gas purifying catalyst. The resulting exhaust gas purifying catalyst contained 1.50 g of Pt and 0.63 g of Rh per one liter of the honeycomb carrier.

Comparative Example RX-11

To the powdery Pd supporting theta-alumina (Production Example C9-2) comprising theta-alumina supporting 1.10% by weight of Pd were added the powdery Pt supporting ceria composite oxide (Production Example B1-10) comprising a $Ce_{0.60}Zr_{0.30}Y_{0.10}$ oxide supporting 1.50% by weight of Pt and the powdery Pt—Rh supporting theta-alumina (Production Example C8-7) comprising theta-alumina supporting 1.50% by weight of Pt and 0.67% by weight of Rh. The resulting mixture was mixed with deionized water and then mixed with alumina sol to form a slurry. The slurry was injected into a honeycomb cordierite carrier having a size of 3 mil per 600 cells, a diameter of 86 mm and a length of 104 mm so as to homogeneously apply 30 g of the Pd supporting theta-alumina, 40 g of the Pt supporting ceria composite oxide and 60 g of the Pt—Rh supporting theta-alumina per one liter of the honeycomb carrier. The resulting article was dried at 100° C. and baked at 500° C. to obtain an exhaust gas purifying catalyst. The resulting exhaust gas purifying catalyst contained 1.50 g of Pt, 0.33 g of Pd, and 0.40 g of Rh per one liter of the honeycomb carrier.

Comparative Example RX-12

1) Formation of Inner Layer

To the powdery Pd supporting ceria composite oxide (Production Example B4-1) comprising $Ce_{0.80}Zr_{0.20}O_2$ supporting 3.30% by weight of Pd were added the powdery gamma-alumina and the powdery $BaSO_4$. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm so as to homogeneously apply 45 g of the Pd supporting ceria composite oxide, 50 g of the gamma-alumina, and 20 g of $BaSO_4$ per one liter of the honeycomb carrier. The resulting article dried at 100° C. and baked at 500° C. to form an inner layer.

2) Production of Outer Layer and Exhaust Gas Purifying Catalyst

The powdery Pt—Rh supporting ceria composite oxide (Production Example B5-1) comprising $Ce_{0.30}Zr_{0.70}O_2$ supporting 2.00% by weight of Pt and 1.70% by weight of Rh and the powdery gamma-alumina were mixed. The resulting mixture was further mixed with deionized water and then mixed with alumina sol to form a slurry. The slurry was injected into the honeycomb cordierite carrier having a size of 3 mil per 600 cells, a diameter of 86 mm and a length of 104 mm so as to homogeneously apply, to a surface of the inner layer, 75 g of the Pt—Rh supporting ceria composite oxide and 75 g of the gamma-alumina per one liter of the honeycomb carrier. The resulting article dried at 100° C. and baked at 500° C. to form an outer layer. Thus, an exhaust gas purifying catalyst was produced.

The resulting exhaust gas purifying catalyst contained 1.50 g of Pd in the inner layer, and 1.50 g of Pt and 1.30 g of Rh in the outer layer, respectively, per one liter of the honeycomb carrier.

Comparative Example RX-13

1) Formation of Inner Layer

1)-1 Supporting of Palladium Containing Perovskite-Type Composite Oxide by Thermostable Oxide

| Lanthanum ethoxyethylate | 40.6 g (0.100 mol) |
| Iron ethoxyethylate | 30.7 g (0.095 mol) |

The above listed components were charged in a 1000 mL round bottomed flask and dissolved in 200 mL of toluene with stirring to obtain a mixed alkoxide solution. Separately, 1.52 g (0.005 mol) of palladium acetylacetonate was dissolved in 100 mL of toluene, and the resulting solution was added to the mixed alkoxide solution in the round bottomed flask to obtain a LaFePd containing homogeneous mixed solution.

Separately, the powdery gamma-alumina was dispersed in 200 mL of toluene and the homogeneous mixed solution in the round bottomed flask was added, followed by stirring.

Next, 200 mL of deionized water was added dropwise to the mixture over about fifteen minutes. As a result, a brown viscous precipitate was formed upon hydrolysis.

After stirring at room temperature for two hours, the toluene and water were distilled off under reduced pressure to obtain a gamma-alumina with a dispersed pre-crystallization composition of a LaFePd composite oxide. Next, the gamma-alumina with the dispersed pre-crystallization composition was placed on a petri dish, subjected to forced air drying at 60° C. for twenty four hours and heat treated in an electric furnace at 650° C. in the air for one hour to obtain a powdery gamma-alumina supporting a $La_{1.00}Fe_{0.95}Pd_{0.05}O_3$ perovskite-type composite oxide.

The resulting powder was prepared so as to have a weight ratio of the perovskite-type composite oxide to the gamma-alumina of 1:1.

1)-2 Production of Inner Layer

To the above prepared powdery gamma-alumina supporting the palladium containing perovskite-type composite oxide was added a powdery gamma-alumina. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm so as to homogeneously apply 60 g of the gamma-alumina supporting the palladium containing perovskite-type composite oxide and 30 g of the gamma-alumina per one liter of the honeycomb carrier. The resulting article dried at 100° C. and baked at 500° C. to form an inner layer.

2) Production of Outer Layer and Exhaust Gas Purifying Catalyst

To the powdery Pt—Rh supporting ceria composite oxide (Production Example B5-2) comprising $Ce_{0.30}Zr_{0.70}O_2$ supporting 2.00% by weight of Pt and 1.00% by weight of Rh was added the powdery gamma-alumina. The resulting mixture was further mixed with deionized water and then mixed with alumina sol to form a slurry. The slurry was injected into a honeycomb cordierite carrier having a size of 3 mil per 600 cells, a diameter of 86 mm and a length of 104 mm so as to homogeneously apply, to a surface of the inner layer, 50 g of the Pt—Rh supporting ceria composite oxide and 30 g of the gamma-alumina per one liter of the honeycomb carrier. The resulting article dried at 100° C. and baked at 500° C. to form an outer layer. Thus, an exhaust gas purifying catalyst was produced.

The resulting exhaust gas purifying catalyst contained 1.00 g of Pt, 0.66 g of Pd, and 0.50 g of Rh per one liter of the honeycomb carrier.

Measurement

Test Example 1

1) Endurance Test

The exhaust gas purifying catalysts of examples and comparative examples shown in Table 1 were connected to both banks of a V type eight cylinder engine having a displacement of 4 liters and were subjected to an endurance test at a temperature in the catalyst bed of 900° C. with a single cycle of 900 seconds repeated for the time shown in Table 1.

One cycle of the endurance test was set as follows. Specifically, from Second 0 to Second 870 (a period of 870 seconds), an oscillation (amplitude) of $\Delta\lambda=\pm4\%$ ($\Delta A/F=\pm0.6$ A/F) of which the center was set in the theoretical fuel-air ratio of A/F=14.6 ($\lambda=1$) (A/F=air to fuel ratio) was applied to the monolith catalysts at a frequency of 0.6 Hz. From Second 870 to Second 900 (a period of 30 seconds), secondary air was introduced upstream of the catalysts to achieve forced oxidation under the conditions ($\lambda=1.25$).

2) Activity Determination (Purification Rates of CO, HC, and NOx)

Using a model gas shown in Table 2, activity of test pieces having a diameter of 80 mm and a length of 95 mm (test pieces sampled from the exhaust gas purifying catalysts of examples and comparative examples after the endurance test) was determined by a sweep test.

In the sweep test, an oscillation (amplitude) of $\Delta\lambda=\pm3.4\%$ ($\Delta A/F=\pm0.5$ A/F) of which the center was set in the theoretical fuel-air ratio ($\lambda=1$) was applied to the test pieces at a frequency of 0.5 Hz. The purification rates of CO, HC, and NOx of the test pieces were measured. The results are shown in Table 1. In the measurement, the upstream (inlet gas) of the monolith catalysts was kept at 400° C., and the flow rate was set at a space velocity shown in Table 1.

TABLE 1

| Examples/ Comparative Examples | Composition | Amount supported (g/L) | | | Endurance test Cycling time (hrs) | Activity determination (purification rates of CO, HC, and NOx) | | | |
|---|---|---|---|---|---|---|---|---|---|
| | | Pt | Pd | Rh | | Space velocity | CO (%) | HC (%) | NOx (%) |
| Example PA-1 | La1.00Fe0.57Mn0.38Pd0.05O3 (150 g) + theta-alumina (50 g) (3:1) | — | 3.26 | — | 100 | SV35000 | 97.7 | 99.8 | 97.7 |
| Example PA-2 | La1.00Fe0.95Pd0.05O3/theta-alumina (3:1) (200 g) | — | 3.26 | — | 100 | SV35000 | 98.0 | 99.8 | 97.8 |
| Example PA-3 | La1.00Fe0.57Mn0.38Rh0.05O3 (150 g) + theta-alumina (50 g) (3:1) | — | — | 3.15 | 120 | SV40000 | 93.9 | 94.7 | 94.4 |
| Example PA-4 | La0.80Pr0.20Fe0.75Ti0.20Rh0.05O3/theta-alumina (3:1) (200 g) | — | — | 3.16 | 120 | SV40000 | 94.1 | 95.8 | 95.6 |
| Example PA-5 | Pt/La1.00Fe0.95Rh0.05O3 (150 g) + theta-alumina (50 g) (3:1) | 1.50 | — | 3.15 | 120 | SV40000 | 95.3 | 97.7 | 96.6 |
| Example PA-6 | La0.90Sr0.10Fe0.57Mn0.3BPt0.05O3 (60 g) + theta-alumina (50 g) | 2.39 | — | — | 120 | SV40000 | 85.2 | 88.7 | 85.4 |
| Example PA-7 | La0.95Ag0.05A10.85Mn0.10Pt0.05O3 (54 g)/theta-alumina (50 g) | 2.41 | — | — | 120 | SV40000 | 87.1 | 89.2 | 85.2 |
| Example PA-8 | Nd0.80Ba0.10Mg0.10A10.85Pt0.10Rh0.05O3 (28 g) + theta-alumina (50 g) | 2.41 | — | 0.66 | 120 | SV40000 | 93.2 | 93.7 | 91.8 |
| Example PA-9 | La0.90Sr0.10Fe0.57Mn0.38Pt0.05O3 (60 g) + La1.00Fe0.57Mn0.38Rh0.05O3 (9 g) + La-theta-alumina (La: 4%) (100 g) | 2.39 | — | 0.19 | 120 | SV40000 | 94.1 | 92.3 | 91.4 |
| Example PA-10 | La1.00Fe0.95Pd0.05O3 (138 g) + La1.00Fe0.95Rh0.05O3 (9 g) + La-theta-alumina (La: 4%) (100 g) | — | 2.41 | 0.19 | 120 | SV40000 | 94.4 | 93.2 | 95.1 |
| Example PA-11 | La1.00Fe0.95Pd0.05O3 (92 g) + La0.95Ag0.05A10.85Mn0.10Pt0.05O3 (11.2 g) + Rh/Zr0.79Ce0.16La0.01Nd0.04 Oxide (40 g) + La-theta-alumina (La: 4%) (100 g) | 0.50 | 2.00 | 0.20 | 120 | SV40000 | 95.1 | 94.2 | 93.4 |
| Comparative Example PX-1 | Pd/gamma-alumina (200 g) | — | 3.26 | — | 100 | SV35000 | 87.2 | 99.4 | 97.2 |
| Comparative Example PX-2 | Rh/gamma-alumina (200 g) | — | — | 3.16 | 120 | SV40000 | 85.2 | 83.6 | 84.3 |
| Comparative Example PX-3 | Pt-Rh/gamma-alumina (100 g) + Pt/Ce0.60Zr0.30Y0.10 Oxide (40 g) | 2.40 | — | 0.20 | 120 | SV40000 | 76.2 | 79.6 | 74.3 |

TABLE 2

| | Gas | | | | | | |
|---|---|---|---|---|---|---|---|
| | CO | $H_2$ | $C_3H_6$ | $C_3H_8$ | $O_2$ | NOx | $CO_2$ |
| Reducing side ($\lambda$ = 0.966) | 22000 | 7333 | 500 | 133 | 6700 | 1700 | 80000 |
| Theoretical fuel-air ratio ($\lambda$ = 1.000) | 7000 | 2333 | ↑ | ↑ | 6700 | ↑ | ↑ |
| Oxidation side ($\lambda$ = 1.034) | 7000 | 2333 | ↑ | ↑ | 16700 | ↑ | ↑ |

Test Example 2

1) High Temperature Endurance Treatment (R/L 1000° C.)

The above prepared powdery exhaust gas purifying catalysts according to Examples and Comparative Examples shown in Table 3 were subjected to high temperature endurance treatment under the following conditions. In the high temperature endurance treatment, the atmospheric temperature was set at 1000° C., and a cycle for a total of 30 minutes comprising an inert atmosphere for 5 minutes, an oxidative atmosphere for 10 minutes, an inert atmosphere for 5 minutes, and a reducing atmosphere for 10 minutes was repeated 10 times, for a total of five hours. The above atmospheres were constituted by supplying gases containing high temperature steam and having the following gas compositions, respectively, at a flow rate of 300 L/hr. The temperatures of the atmospheres were hold to 1000° C. by the action of high temperature steam.

Inert atmosphere gas composition: 8% of $CO_2$, 10% of $H_2O$, with the balance of $N_2$ Oxidative atmosphere gas composition: 1% of $O_2$, 8% of $CO_2$, 10% of $H_2O$, with the balance of $N_2$ Reducing atmosphere gas composition: 0.5% of $H_2$, 1.5% of CO, 8% of $CO_2$, 10% of $H_2O$, with the balance of $N_2$ 2) High Temperature Endurance Treatment (Air 1150° C.)

The above prepared powdery exhaust gas purifying catalysts according to Examples and Comparative Examples shown in Table 3 were subjected to the high temperature endurance treatment in an atmosphere of the air (in a normal atmosphere).

3) Measurement of Specific Surface Area

The specific surface areas of the above prepared powdery exhaust gas purifying catalysts according to Examples and Comparative Examples shown in Table 3 were determined before and after the high temperature endurance treatments. The specific surface areas were measured according to the BET method. The results are shown in Table 3.

TABLE 3

| | | Test Example 2 Specific surface area (m2/g) | | | | |
|---|---|---|---|---|---|---|
| Examples/ Comparative Examples | Composition | Before high temperature endurance treatment | After endurance treatment (1000° C.) | After endurance treatment/Before endurance treatment (1000° C.) (%) | After endurance treatment (1150° C.) | After endurance treatment/Before endurance treatment (1150° C.) (%) |
| Example QA-12 | La1.00Fe0.90Pd0.10O3 + theta-alumina (1:2) | 70.2 | 62.1 | 88.5 | 38.1 | 54.3 |
| Example QA-13 | La1.00Fe0.95Pd0.05O3/ theta-alumina (1:3) | 75.2 | 66.2 | 88.0 | 40.2 | 53.5 |
| Example QA-14 | La1.00Fe0.95Pd0.05O3/ La-theta-alumina (La: 4%) (1:4) | 87.5 | 82.5 | 94.3 | 62.2 | 71.1 |
| Example QA-15 | La1.00Fe0.95Pd0.05O3/ La-theta-alumina (La: 4%) (1:1) | 51.2 | 46.1 | 90.0 | 35.3 | 68.9 |
| Example QA-16 | La1.00Fe0.57Mn0.38Rh0.05O3/ La-theta-alumina (La: 2%) (1:9) | 96.4 | 91.3 | 94.7 | 71.9 | 74.6 |
| Example QA-17 | La1.00Fe0.95Rh0.05O3/ La-theta-alumina (La: 10%) (2:3) | 63.2 | 57.3 | 90.7 | 43.8 | 69.3 |
| Example QA-18 | La0.95Ag0.05Fe0.57Mn0.38Pt0.05O3/ La-theta-alumina (La: 10%) (1:1) | 51.1 | 47.2 | 92.4 | 35.5 | 69.5 |
| Example QA-19 | La0.90Ca0.10Fe0.90Pt0.10O3/ theta-alumina (1:4) | 85.4 | 77.0 | 90.2 | 58.3 | 68.3 |
| Comparative Example QX-5 | La1.00Fe0.95Pd0.05O3/ Zr0.70Ce0.25La0.02Y0.03 Oxide (1:4) | 50.1 | 42.3 | 84.4 | 5.3 | 10.6 |
| Comparative Example QX-6 | La1.00Fe0.95Rh0.05O3/ Zr0.50Ce0.40La0.05Y0.05 Oxide (2:3) | 25.2 | 16.0 | 63.5 | 3.4 | 13.5 |
| Comparative Example QX-7 | La0.90Ca0.10Fe0.90Pt0.10O3/ Zr0.70Ce0.25Pr0.02Nd0.03 Oxide (1:4) | 43.2 | 35.3 | 81.7 | 3.1 | 7.2 |
| Comparative Example QX-8 | La1.00Fe0.95Pd0.05O3/ gamma-alumina (1:4) | 140.6 | 101.4 | 72.1 | 43.2 | 30.7 |

Test Example 3

1) Endurance Test

The exhaust gas purifying catalysts according to Examples and Comparative Examples were connected to a bank of a V type eight cylinder engine of 4 liters. With the cycle shown in Tables 4 to 7 as a single cycle (30 seconds) at 1050° C. or 1100° C., the endurance test was repeated for time periods shown in Tables 4 to 7. Then, annealing was carried out at a fuel-air ratio A/F of 14.3, at 900° C. for two hours.

One cycle was set as follows. Specifically, from Second 0 to Second 5 (a period of 5 seconds), a mixed gas which was kept of amount of theoretical fuel-air ratio (A/F=14.6, in the stoichiometric state) under feedback control was fed to the engine and the internal temperature of the exhaust gas purifying catalysts was set at around 850° C. From Second 5 to Second 30 (a period of 25 seconds), the feedback was released. From Second 5 to Second 7 (a period of 2 seconds), the fuel was injected excessively, so that the fuel rich mixed gas (A/F=11.2) was fed to the engine. From Second 7 to Second 28 (a period of 21 seconds), while an excessive amount of fuel was kept on being fed to the engine, secondary air was introduced from the upstream into the exhaust gas purifying catalysts through an inlet tube, to cause the excessive fuel to react with the secondary air in the interior of the exhaust gas purifying catalysts, so as to raise the temperature. In this time period, the fuel-air ratio in the exhaust gas in the exhaust gas purifying catalysts was substantially kept in a somewhat lean state than the stoichiometric state (A/F=14.8), and the highest temperature in the catalyst bed was 1050° C. or 1100° C. as shown in Tables 4 to 7. From Second 28 to Second 30 (a period of 2 seconds), no excessive fuel was fed to the engine but the secondary air was fed to the exhaust gas purifying catalysts to put the exhaust gas into a lean state.

The temperatures of the exhaust gas purifying catalysts were measured with a thermocouple inserted into a center part of the honeycomb carrier. A phosphorus compound was added to the fuel (gasoline) so that phosphorus element in the exhaust gas poisons the catalysts. The amount of the phosphorus compound was set so that 816 mg in terms of phosphorus element was deposited to the exhaust gas purifying catalysts during the endurance time shown in Tables 4 to 7.

2) HC 50% Purification Temperature

The mixed gas held substantially in the stoichiometric state was supplied to the engine. While the temperature of the exhaust gas exhausted by the combustion of the mixed gas was raised at a rate of 30° C. per minute, the exhaust gas was fed to the exhaust gas purifying catalysts according to Examples and Comparative Examples shown in Tables 4 to 7 which had been subjected to the endurance.

The exhaust gas was fed to the exhaust gas purifying catalysts at a space velocity SV of 90000/h. The HC level in the exhaust gas treated by the exhaust gas purifying catalysts was measured. In this procedure, the HC 50% purification temperature was defined as the temperature at the time when HC in the exhaust gas was purified to 50%. The results are shown in Tables 4 to 7. The mixed gas to be fed to the engine was set substantially in the stoichiometric state by the feed back control, and the A/F was set at 14.6±1.0.

3) Co—NOx Cross-Point Purification Rate

The mixed gas was fed to the engine, while it was varied from its fuel-rich state to its lean state. The exhaust gas produced by the combustion in the engine was purified by use of the exhaust gas purifying catalysts of Examples and Comparative Examples shown in Tables 4 and 6. The CO and NOx purifying rates were measured. A purifying rate obtained when the purifying rates of these components are coincident with each other was defined as a CO—NOx cross-point purifying rate. The results are shown in Tables 4 and 6. It is to be noted that the measurement of the purifying rates was performed in the condition of the engine only, rather than in the condition in which the engine was mounted on the automobile. The temperature of the exhaust gas fed to the exhaust gas purifying catalysts was set at 460° C. and space velocity SV was set at 90000/h.

TABLE 4

| Examples/ Comparative | | Amount supported (g/L) | | | Test Example 3 | | |
|---|---|---|---|---|---|---|---|
| | | | | | Endurance test Cycling time (hrs) | CO—NOx (%) | HC 50% purification temperature (° C.) 1050° C. |
| Examples | Composition | Pt | Pd | Rh | | | |
| Example RA-20 | La1.00Fe0.95Pd0.05O3/ Zr0.60Ce0.30La0.05Y0.05 Oxide (2:8) (150 g) + theta-alumina (1:1) (150 g) | — | 0.66 | — | 48 | 72.0 | 400 |
| Example RA-21 | La1.00Fe0.57Mn0.38Pd0.05O3/ Zr0.50Ce0.40La0.05Nd0.05 Oxide (2:8) (150 g) + Pt/ Ce0.60Zr0.30Y0.10 Oxide (60 g) + theta-alumina (90 g) | 0.15 | 0.66 | — | 48 | 76.3 | 402 |
| Example RA-22 | La1.00Fe0.57Mn0.38Pd0.05O3/ Zr0.65Ce0.30La0.02Y0.03 Oxide (2:8) (150 g) + Ce0.60Zr0.30Y0.10 Oxide (70 g) + Rh/ theta-alumina (80 g) | — | 0.66 | 0.15 | 48 | 79.0 | 390 |
| Example RA-23 | La1.00Fe0.95Pd0.05O3/ Zr0.70Ce0.20La0.052Y0.05 Oxide (2:8) (150 g) + Pt-Rh/Zr0.76Ce0.18La0.02Nd0.04 Oxide (30 g) + Ce0.60Zr0.30Y0.10 Oxide (50 g) + Pt-Rh/theta-alumina (60 g) | 0.30 | 0.66 | 0.15 | 48 | 81.0 | 378 |
| Example RA-24 | La0.90Ce0.10Fe0.90Rh0.10O3/ Zr0.60Ce0.30La0.05Y0.05 Oxide (1:9) (150 g) + theta-alumina (150 g) | — | — | 0.63 | 48 | 79.2 | 392 |

TABLE 4-continued

| Examples/ Comparative Examples | Composition | Amount supported (g/L) | | | Test Example 3 | | |
|---|---|---|---|---|---|---|---|
| | | | | | Endurance test Cycling | CO—NOx | HC 50% purification temperature (° C.) |
| | | Pt | Pd | Rh | time (hrs) | (%) | 1050° C. |
| Example RA-25 | La0.90Ce0.10Fe0.95Rh0.05O3/ La-theta-alumina (2:8) (La: 10%) (150 g) + Ce0.60Zr0.30Y0.10 Oxide (90 g) + Pt-Rh/theta-alumina (60 g) | 0.30 | — | 0.69 | 48 | 91.1 | 368 |
| Example RA-26 | La1.00Fe0.95Rh0.05/SrZrO3 (2:8) (150 g) + Pt-Rh/Zr0.79Ce0.16La0.01Nd0.04 Oxide (60 g) + Pt/Ce0.40Zr0.50Y0.10 Oxide (30 g) + Pt-Rh/theta-alumina (60 g) | 0.45 | — | 0.78 | 48 | 94.0 | 353 |
| Example RA-27 | La0.90Ca0.10Fe0.90Pt0.10O3/ Zr0.60Ce0.30La0.05Y0.05 Oxide (1:9) (75 g) + theta-alumina (150 g) | 0.59 | — | — | 60 | 71.2 | 413 |
| Example RA-28 | La0.90Ca0.10Fe0.95Pt0.05O3/ La-theta-alumina (La: 10%) (2:8) (75 g) + Ce0.60Zr0.30Y0.10 Oxide (90 g) + Pt-Rh/theta-alumina (60 g) | 0.91 | — | 0.10 | 60 | 86.1 | 388 |
| Example RA-29 | La1.00Fe0.57Mn0.38Pd0.05O3/ Zr0.65Ce0.30La0.02Y0.03 Oxide (2:8) (50 g) + La0.90Ce0.10Fe0.95Rh0.05O3/ La-theta-alumina (La: 4%) (2:8) (50 g) + Pt/Ce0.60Zr0.30Y0.10 Oxide (60 g) + theta-alumina (40 g) | 0.30 | 0.22 | 0.26 | 60 | 82.0 | 387 |
| Example RA-29-1 | Pd/La1.00Fe1.00O3 (30 g) + Pt-Rh/Zr0.76Ce0.18La0.02Nd0.04 Oxide (40 g) + Pt/Ce0.60Zr0.30Y0.10 Oxide (50 g) + theta-alumina (50 g) | 0.58 | 0.66 | 0.12 | 60 | 83.2 | 385 |
| Comparative Example RX-9 | Pd/gamma-alumina (150 g) | — | 0.66 | — | 48 | 60.3 | 445 |
| Comparative Example RX-10 | Pd-Rh/gamma-alumina (150 g) + Pt/Ce0.60Zr0.30Y0.10 Oxide (75 g) | 1.50 | — | 0.63 | 48 | 71.3 | 420 |

TABLE 5

| Examples | Composition | Amount supported (g/L) | | | Test Example 3 | | |
|---|---|---|---|---|---|---|---|
| | | | | | Endurance test Cycling | HC 50% purification temperature (° C.) | |
| | | Pt | Pd | Rh | time (hrs) | 1050° C. | 1100° C. |
| Eample RA-30 | La1.00Fe0.95Pd0.05O3/ La-theta-alumina (La: 4%) (1:1) (30 g) + Pt-Rh/zr0.76Ce0.18La0.02Nd0.04 Oxide (30 g) + Pt/Ce0.60Zr0.30Y0.10 Oxide (80 g) + Pt-Rh/gamma-alumina (70 g) | 1.50 | 0.33 | 0.40 | 40 48 | — 351 | 392 — |
| Example RA-31 | La1.00Fe0.95Pd0.05O3/ La-theta-alumina (La: 4%) (1:1) (30 g) + Pt/Ce0.60Zr0.30Y0.10 Oxide (80 g) + Pt-Rh/gamma-alumina (70 g) | 1.50 | 0.33 | 0.40 | 40 48 | — 362 | 423 — |
| Example RA-32 | La1.00Fe0.95Pd0.05O3 alpha-alumina (1:2) (45 g) + Pt-Rh/Zr0.76Ce0.18La0.02Nd0.04 Oxide (40 g) + Pt/Ce0.60Zr0.30Y0.10 Oxide (80 g) + gamma-alumina (70 g) | 1.50 | 0.33 | 0.40 | 40 48 | — 365 | 418 — |
| Comparative Example RX-11 | Pd/theta-alumina (30 g) + Pt/Ce0.60Zr0.30Y0.10 Oxide (40 g) + Pt-Rh/theta-alumina (60 g) | 1.50 | 0.33 | 0.40 | 40 48 | — 395 | >500 — |

TABLE 6

| | Composition | | Amount supported (g/L) | | | Test Example 3 | | HC 50% purification temperature (° C.) |
|---|---|---|---|---|---|---|---|---|
| | | | | | | Endurance test Cycling time | CO—NOx | |
| Examples | Inner layer | Outer layer | Pt | Pd | Rh | (hrs) | (%) | 1050° C. |
| Example RC-1 | La1.00Fe0.95Pd0.05O3/Zr0.65Ce0.30La0.02Y0.03 Oxide (2:8) (75 g) + Pt/Ce0.60Zr0.30Y0.10 Oxide (50 g) + theta-alumina (70 g) | PT-RH/Zr0.76Ce0.18La0.02Nd0.04 Oxide (50 g) + Pt/ce0.60zr0.30y0.10 Oxide (30 g) + theta-alumina (50 g) | 0.45 | 0.33 | 0.70 | 48 | 83.3 | 374 |
| Example RC-2 | La1.00Fe0.95Pd0.05O3/SrZrO3 (2:8) (75 g) + Pt/Ce0.60Zr0.30Y0.10 Oxide (30 g) + theta-alumina (70 g) + BaSO4 (20 g) | PT-RH/Zr0.76Ce0.18La0.02Nd0.04 Oxide (50 g) + Pt/Ce0.60Zr0.30Y0.10 Oxide (30 g) + theta-alumina (50 g) | 0.45 | 0.33 | 0.70 | 48 | 84.0 | 371 |
| Example RC-3 | La1.00Fe0.95Pd0.05O3 (30 g) + Pt/Ce0.60Zr0.30Y0.10 Oxide (50 g) + theta-alumina (90 g) + BaSO4 (20 g) | PT-RH/Zr0.76Ce0.18La0.02Nd0.04 Oxide (50 g) + Pt/Ce0.60Zr0.30Y0.10 Oxide (40%) + theta-alumina (50 g) | 0.5 | 0.66 | 0.70 | 48 | 84.8 | 360 |
| Example RC-4 | La1.00Fe0.95Pd0.05O3/Zr0.65Ce0.30La0.02Y0.03 Oxide (2:8) (75 g) + Pt/Ce0.60Zr0.30Y0.10 Oxide (20 g) + theta-alumina (90 g) | PT-RH/zr0.80Ce0.15La0.02Nd0.03 Oxide (30 g) + Pt/Ce0.60Zr0.30Y0.10 Oxide (30 g) + Pt-Rh/theta-alumina (70 g) | 0.78 | 0.33 | 0.55 | 48 | 87.3 | 358 |
| Example RC-5 | La1.00Fe0.96Pd0.04O3/theta-alumina (2:8) (75 g) + Pt/Ce0.60Zr0.30Y0.10 Oxide (20 g) + theta-alumina (90 g) | Rh/Zr0.80Ce0.15La0.02Nd0.03 Oxide (30 g) + Pt/Ce0.60Zr0.30Y0.10 Oxide (30 g) + Pt-Rh/theta-alumina (70 g) | 0.70 | 0.26 | 0.40 | 48 | 85.2 | 362 |
| Example RC-6 | La1.00Fe0.95Pd0.05O3/theta-alumina (50 g) + Ce0.60Zr0.30Y0.10 Oxide (30 g) + BaSO4 (20 g) | La1.00Fe0.95Rh0.05O3/LaAlO3 (2:8) (95 g) + Pt/Ce0.60Zr0.30Y0.10 Oxide (30 g) + theta-alumina (30 g) | 0.40 | 0.80 | 0.40 | 48 | 96.6 | 337 |
| Example RC-7 | Pt/Ce0.40Zr0.50Y0.10 Oxide (30 g) + Pd/theta-alumina (50 g) | La0.90Sr0.10Fe0.90Pt0.05Rh0.05O3/SrZrO3 (2:8) (75 g) + Pt-Rh/Zr0.79Ce0.16La0.01Nd0.04 Oxide (60 g) | 0.74 | 0.20 | 0.40 | 60 | 90.8 | 371 |
| Example RC-8 | Pd/gamma-alumina (50 g) + Ce0.60Zr0.30Y0.10 Oxide (30 g) + BasO4 (20 g) | La0.90Sr0.10Fe0.95Pt0.05O3/Zr0.60Ce0.30La0.05Y0.05 Oxide (2:8) (63 g) + Pt/Ce0.60Zr0.30Y0.10 Oxide (30 g) + Pt-Rh/theta-alumina (30 g) | 0.70 | 0.80 | 0.40 | 60 | 92.5 | 353 |
| Example RC-9 | La1.00Fe0.95Pd0.05O3/Zr0.65Ce0.30La0.02Y0.03 Oxide (2:8) (50 g) + Pt/Ce0.60Zr0.30Y0.10 Oxide (30 g) + La-theta-alumina (La: 4%) (30 g) | La1.00Fe0.38A10.38Mn0.19Rh0.05O3/SrZrO3 (2:8) (50 g) + Pt-Rh/La-theta-alumina (La: 4%) (60 g) | 0.75 | 0.22 | 0.32 | 60 | 90.6 | 353 |
| Example RC-10 | La1.00Fe0.96Pd0.4o3/La-theta-alumina (La: 4%) (2:8) (75 g) + La-theta-alumina (La: 4%) (90 g) | La0.95Ag0.05Fe0.57Mn0.38Pt0.05o3/Zr0.50Ce0.40La0.05Y0.05 Oxide (2:8) (50 g) + Rh/Zr0.79Ce0.16La0.01Nd0.04 Oxide (30 g) + Pt/Ce0.60Zr0.30Y0.10 Oxide (60 g) + Pt-Rh/La-gamma-alumina (La: 4% (60 g) | 0.65 | 0.26 | 0.30 | 60 | 88.0 | 350 |

TABLE 6-continued

| | Composition | | Amount supported (g/L) | | | Test Example 3 | | |
|---|---|---|---|---|---|---|---|---|
| | | | | | | Endurance test Cycling time | CO—NOx | HC 50% purification temperature (° C.) |
| Examples | Inner layer | Outer layer | Pt | Pd | Rh | (hrs) | (%) | 1050° C. |
| Example RC-11 | La1.00Fe0.95Pd0.05o3/La-theta-alumina (La: 4%) (1:1) (24 g) + La0.90Sr0.10Fe0.57Mn0.38Pt0.5o3/La-theta-alumina (La: 4%) (1:1) (20 g) + La-gamma-alumina (La: 4%) (40 g) + BaSO4 (20 g) | Pt/La1.00Fe0.76Mn0.19Rh0.05o3/SrZrO3 (1:2) (45 g) + Pt/Ce0.60zr0.30Y0.10 Oxide (20 g) + La-gamma-alumina (La: 4%) (50 g) | 0.70 | 0.26 | 0.32 | 60 | 90.8 | 346 |
| Example RC-12 | La1.00Fe0.95Pd0.05o3/La-theta-alumina (La: 4%) (2:8) (60 g) + La0.90Ca0.10Fe0.95Pt0.05o3/Zr0.60Ce0.30La0.05Nd0.05 Oxide (2:8) (30 g) + Pt/Ce0.60Zr0.30Y0.1 Oxide (20 g) + La-theta-alumina (La: 4%) (40 g) | La1.00A10.57Mn0.38Rh0.05o3/La-theta-alumina (La: 4%) (1:2) (45 g) + La0.90Ca0.10Fe0.95Pt0.05o3/Zr0.60Ce0.30La0.05Nd0.05 Oxide (2:8) (30 g) + Pt/Ce0.60Zr0.30Y0.10 Oxide (40 g) + La-theta-alumina (La: 4%) (30 g) | 0.78 | 0.26 | 0.34 | 60 | 91.3 | 342 |
| Comparative Example RX-12 | Pd/Ce0.80Zr0.20o2 (45 g) + gamma-alumina (50 g) + BaSO4 (20 g) | Pt-Rh/Ce0.30Zr0.70o2 (75 g) + gamma-alumina (75 g) | 1.50 | 1.50 | 1.30 | 48 | 82.0 | 375 |

TABLE 7

| | Composition | | Amount supported (g/L) | | | Test Example 3 | | |
|---|---|---|---|---|---|---|---|---|
| | | | | | | Endurance test Cycling time | HC 50% purification temperature (° C.) | |
| Eamples | Inner layer | Outer layer | Pt | Pd | Rh | (hrs) | 1050° C. | 1100° C. |
| Example RC-13 | La01.00Fe0.95Pd0.05o3/La-theta-alumina (La: 4%) (1:1) (28 g) + Pt/Ce0.60Zr0.30Y0.10 Oxide (60 g) + theta-alumina (70 g) | Pt-Rh/Zr0.76Ce0.18La0.02Nd0.04 Oxide (30 g) + Pt/Ce0.60Zr0.30Y0.10 Oxide (60 g) + Pt/theta-alumina (70 g) | 0.60 | 0.30 | 0.40 | 40 48 | — 359 | 377 — |
| Example RC-14 | La01.00Fe0.95Pd0.05o3/La-theta-alumina (La: 4%) (1:1) (30 g) + Pt/Ce0.60Zr0.30Y0.10 Oxide (30 g) + theta-alumina (80 g) | Pt-Rh/Zr0.50Ce0.40La0.05Nd0.05 Oxide (30 g) + Pt/Ce0.60Zr0.30Y0.10 Oxide (60 g) + Pt-Rh/theta-alumina (70 g) | 0.78 | 0.33 | 0.55 | 40 48 | — 347 | 368 — |
| Example RC-15 | La01.00Fe0.95Pd0.05o3/Ba-theta-alumina (Ba: 4%) (1:4) (46 g) + Pt/Ce0.60Zr0.30Y0.10 Oxide (45 g) | La1.00Fb0.95Rh0.05o3/theta-alumina (1:3) (38 g) + Pt/Ce0.60Zr0.30Y0.10 Oxide (60 g) | 0.70 | 0.20 | 0.20 | 40 48 | — 361 | 374 — |
| Example RC-16 | La01.00Fe0.95Pd0.05o3/theta-alumina (2:3) (40 g) + Pt/Ce0.60Zr0.30Y0.10 Oxide (30 g) + theta-alumina (80 g) | La0.90Ca0.10Fe0.90Pt0.10o3/theta-alumina (2:3) (3:2) (g) + Pt-Rh/Zr0.70Ce0.25La0.02Nd0.03 Oxide (40 g) + Pt/Ce0.60Zr0.30Y0.10 Oxide (60 g) | 0.70 | 0.35 | 0.50 | 40 48 | — 335 | 363 — |
| Comparative Example RX-13 | La1.00Fe0.95Pd0.05o3/gamma-alumina (1:1) (60 g) + gamma-alumina (30 g) | PT-Rh/Ce0.30Zr0.70o2 (50 g) + gamma-alumina (30 g) | 1.00 | 0.66 | 0.50 | 48 | — 432 | >500 — |

While the illustrative embodiments and examples of the present invention are provided in the above description, such is for illustrative purpose only and it is not to be construed restrictively. Modification and variation of the present invention which will be obvious to those skilled in the art is to be covered in the following claims.

INDUSTRIAL APPLICABILITY

Thus, the exhaust gas purifying catalyst of the present invention can maintain the catalytic activity of the noble metal at a high level over a long time and achieve satisfactory emission control performance, even in an atmosphere of high temperature exceeding 900° C. to 1000° C. It can be advantageously used as an exhaust gas purifying catalyst for automobiles.

The invention claimed is:

1. An exhaust gas purifying catalyst comprising a noble metal, a perovskite-type composite oxide, and at least one of theta-alumina and alpha-alumina;
wherein the perovskite-type composite oxide is represented by the general formula (3):

$$AB_{1-m}N_mO_3 \qquad (3)$$

wherein A represents at least one element selected from the group of rare-earth elements and alkaline earth metals: B represents at least one element selected from the group consisting of Al and transition elements excluding rare-earth elements and noble metals; N represents a noble metal; and m represents an atomic ratio of N satisfying the following relation: 0<m<0.5.

2. The exhaust gas purifying catalyst according to claim 1, wherein the perovskite-type composite oxide containing a noble metal is supported by theta-alumina and/or alpha-alumina.

3. The exhaust gas purifying catalyst according to claim 2, wherein the perovskite-type composite oxide containing a noble metal, which is supported by theta alumina and/or alpha alumina, is prepared by a method comprising incorporating theta-alumina and/or alpha-alumina into a pre-crystallization composition and crystallizing the perovskite-type composite oxide containing a noble metal.

4. The exhaust gas purifying catalyst according to claim 2, which further comprises at least one thermostable oxide selected from the group consisting of zirconia composite oxides represented by the following general formula (1), ceria composite oxides represented by the following general formula (2), theta-alumina, alpha-alumina, gamma-alumina, $SrZrO_3$ and $LaAlO_3$:

$$Zr_{1-(a+b)}Ce_aR_bO_{2-c} \qquad (1)$$

wherein R represents alkaline earth metals and/or rare-earth elements excluding Ce; a represents an atomic ratio of Ce satisfying the following relation: $0.1 \leq a \leq 0.65$; b represents an atomic ratio of R satisfying the following relation: $0 \leq b \leq 0.55$; $[1-(a+b)]$ represents an atomic ratio of Zr satisfying the following relation: $0.35 \leq [1-(a+b)] \leq 0.9$; and c represents an oxygen defect,

$$Ce_{1-(d+e)}Zr_dL_eO_{2-f} \qquad (2)$$

wherein L represents alkaline earth metals and/or rare-earth elements excluding Ce; d represents an atomic ratio of Zr satisfying the following relation: $0.2 \leq d \leq 0.7$; e represents an atomic ratio of L satisfying the following relation: $0 \leq e \leq 0.2$; $[1-(d+e)]$ represents an atomic ratio of Ce satisfying the following relation: $0.3 \leq [1-(d+e)] \leq 0.8$; and f represents an oxygen defect.

5. The exhaust gas purifying catalyst according to claim 4, wherein the zirconia composite oxide having supported thereon Pt and/or Rh, the ceria composite oxide having supported thereon Pt, the theta-alumina having supported thereon Pt and/or Rh, and the gamma-alumina having supported thereon Pt and/or Rh.

6. The exhaust gas purifying catalyst according to claim 1, wherein the perovskite-type composite oxide containing a noble metal is supported by at least one thermostable oxide selected from the group consisting of zirconia composite oxides represented by the following general formula (1), ceria composite oxides represented by the following general formula (2), $SrZrO_3$ and $LaAlO_3$:

$$Zr_{1-(a+b)}Ce_aR_bO_{2-c} \qquad (1)$$

wherein R represents alkaline earth metals and/or rare-earth elements excluding Ce; a represents an atomic ratio of Ce satisfying the following relation: $0.1 \leq a \leq 0.65$; b represents an atomic ratio of R satisfying the following relation: $0 \leq b \leq 0.55$; $[1-(a+b)]$ represents an atomic ratio of Zr satisfying the following relation: $0.35 \leq [1-(a+b)] \leq 0.9$; and c represents an oxygen defect,

$$Ce_{1-(d+e)}Zr_dL_eO_{2-f} \qquad (2)$$

wherein L represents alkaline earth metals and/or rare-earth elements excluding Ce; d represents an atomic ratio of Zr satisfying the following relation: $0.2 \leq d \leq 0.7$; e represents an atomic ratio of L satisfying the following relation: $0 \leq e \leq 0.2$; $[1-(d+e)]$ represents an atomic ratio of Ce satisfying the following relation: $0.3 \leq [1-(d+e)] \leq 0.8$; and f represents an oxygen defect.

7. The exhaust gas purifying catalyst according to claim 6, wherein the perovskite-type composite oxide containing a noble metal, which is supported by at least one thermostable oxide, is prepared by a method comprising incorporating a thermostable oxide into a pre-crystallization composition and crystallizing the perovskite-type composite oxide containing a noble metal.

8. The exhaust gas purifying catalyst according to claim 1, wherein the perovskite-type composite oxide containing a noble metal is mixed with theta-alumina and/or alpha-alumina.

9. The exhaust gas purifying catalyst according to claim 8, further comprising at least one thermostable oxide selected from the group consisting of zirconia composite oxides represented by the following general formula (1), ceria composite oxides represented by the following general formula (2), gamma-alumina, $SrZrO_3$ and $LaAlO_3$:

$$Zr_{1-(a+b)}Ce_aR_bO_{2-c} \qquad (1)$$

wherein R represents alkaline earth metals and/or rare-earth elements excluding Ce; a represents an atomic ratio of Ce satisfying the following relation: $0.1 \leq a \leq 0.65$; b represents an atomic ratio of R satisfying the following relation: $0 \leq b \leq 0.55$; $[1-(a+b)]$ represents an atomic ratio of Zr satisfying the following relation: $0.35 \leq [1-(a+b)] \leq 0.9$; and c represents an oxygen defect,

$$Ce_{1-(d+e)}Zr_dL_eO_{2-f} \qquad (2)$$

wherein L represents alkaline earth metals and/or rare-earth elements excluding Ce; d represents an atomic ratio of Zr satisfying the following relation: $0.2 \leq d \leq 0.7$; e represents an atomic ratio of L satisfying the following relation: $0 \leq e \leq 0.2$; $[1-(d+e)]$ represents an atomic ratio of Ce satisfying the following relation: $0.3 \leq [1-(d+e)] \leq 0.8$; and f represents an oxygen defect.

10. The exhaust gas purifying catalyst according to claim 1, wherein N in general formula (3) is at least one selected from the group consisting of Rh, Pd, and Pt.

11. The exhaust gas purifying catalyst according to claim 1, wherein the perovskite-type composite oxide represented by the general formula (3) is at least one selected from the group consisting of Rh-containing perovskite-type composite oxides represented by the following general formula (4), Pd containing perovskite-type composite oxides represented by the following general formula (5), and Pt containing perovskite-type composite oxides represented by the following general formula (6):

$$A_{1-p}A'_pB_{1-q}Rh_qO_3 \quad (4)$$

wherein A represents at least one element selected from the group consisting of La, Nd, and Y; A' represents Ce and/or Pr; B represents at least one element selected from the group consisting of Fe, Mn, and Al; p represents an atomic ratio of A' satisfying the following relation: $0 \leq p < 0.5$; and q represents an atomic ratio of Rh satisfying the following relation: $0 < q \leq 0.8$, $$AB_{1-r}Pd_rO_3 \quad (5)$$

wherein A represents at least one element selected from the group consisting of La, Nd, and Y; B represents at least one element selected from the group consisting of Fe, Mn, and Al; and r represents an atomic ratio of Pd satisfying the following relation: $0 < r < 0.5$, $$A_{1-s}A'_sB_{1-t-u}B'_tPt_uO_3 \quad (6)$$

wherein A represents at least one element selected from the group consisting of La, Nd, and Y; A' represents at least one element selected from the group consisting of Mg, Ca, Sr, Ba, and Ag; B represents at least one element selected from the group consisting of Fe, Mn, and Al; B' represents at least one element selected from the group consisting of Rh and Ru; s represents an atomic ratio of A' satisfying the following relation: $0 < s \leq 0.5$; t represents an atomic ratio of B' satisfying the following relation: $0 \leq t < 0.5$; and u represents an atomic ratio of Pt satisfying the following relation: $0 < u \leq 0.5$.

12. The exhaust gas purifying catalyst according to claim 1, wherein the theta-alumina and/or alpha-alumina is represented by the following general formula (7):

$$(Al_{1-g}D_g)_2O_3 \quad (7)$$

wherein D represents La and/or Ba; and g represents an atomic ratio of D satisfying the following relation: $0 \leq g \leq 0.5$.

13. The exhaust gas purifying catalyst according to claim 1, further comprising a coating layer supported by a catalyst carrier,
wherein the coating layer includes an outer layer constituting its surface layer, and an inner layer arranged inside the outer layer, and
the outer layer and/or the inner layer comprises both at least one of theta-alumina and alpha-alumina, and the perovskite-type composite oxide containing a noble metal.

14. The exhaust gas purifying catalyst according to claim 13, wherein the inner layer comprises theta-alumina and/or alpha-alumina each supporting the perovskite-type composite oxide containing a noble metal.

15. The exhaust gas purifying catalyst according to claim 13, wherein the inner layer comprises at least one thermostable oxide supporting the perovskite-type composite oxide containing a noble metal.

16. The exhaust gas purifying catalyst according to claim 13, wherein the inner layer comprises the Pd-containing perovskite-type composite oxide.

17. The exhaust gas purifying catalyst according to claim 13, wherein the outer layer comprises the Rh-containing perovskite-type composite oxide.

18. The exhaust gas purifying catalyst according to claim 13, wherein the Pt-containing perovskite-type composite oxide is contained in the inner layer, the outer layer, or both.

19. The exhaust gas purifying catalyst according to claim 13, wherein the noble metal contained in the outer layer is Rh and/or Pt, and the noble metal contained in the inner layer is at least Pd.

20. The exhaust gas purifying catalyst according to claim 13, wherein the inner layer comprises the ceria composite oxide having supported thereon theta-alumina and Pt, and the outer layer comprises at least one thermostable oxide selected from the group consisting of the zirconia composite oxide having supported thereon Pt and Rh, the ceria composite oxide having supported thereon Pt, and theta-alumina supporting Pt and Rh.

21. The exhaust gas purifying catalyst according to claim 1, which further comprises sulfates, carbonates, nitrates, and/or acetates of Ba, Ca, Sr, Mg, or La.

* * * * *